United States Patent
Wrightman

(10) Patent No.: US 8,615,963 B2
(45) Date of Patent: *Dec. 31, 2013

(54) LOG WALL CONNECTOR SYSTEM

(75) Inventor: Robert A. Wrightman, Bracebridge (CA)

(73) Assignee: Robert A. Wrightman, Bracebridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,283

(22) Filed: Feb. 1, 2012

(65) Prior Publication Data

US 2012/0198781 A1    Aug. 9, 2012

Related U.S. Application Data

(63) Continuation-in-part of application No. 12/368,131, filed on Feb. 9, 2009, now abandoned, which is a continuation-in-part of application No. 11/892,870, filed on Aug. 28, 2007, now Pat. No. 8,371,080.

(60) Provisional application No. 61/027,228, filed on Feb. 8, 2008.

(51) Int. Cl.
*E04B 1/00* (2006.01)
*E04G 21/00* (2006.01)
*E04G 23/00* (2006.01)

(52) U.S. Cl.
USPC ........ 52/741.13; 52/233; 52/590.1; 52/591.1; 52/293.1

(58) Field of Classification Search
USPC ............... 52/233, 282.1, 282.2, 282.4, 586.1, 52/586.2, 585.1, 590.1, 741.13, 313, 52/591.1, 293.1; 446/106; 403/231, 388
See application file for complete search history.

(56) References Cited

U.S. PATENT DOCUMENTS 1,813,455 A     8/1929 Lawton
1,898,297 A  *  2/1933 Fox ............................. 446/122

(Continued)

FOREIGN PATENT DOCUMENTS

CA    1264644    1/1990
CA    1273468    9/1990
CA    2002665   12/1991

OTHER PUBLICATIONS

"Distinctive Homes—Log, Timberframe, Conventional Log Sided and More.." Catalogue published by True North Log Homes. Inc. 2007 p. 200 (photocopy of page is enclosed showing prior cross sections of logs).

(Continued)

*Primary Examiner* — Chi Q Nguyen
(74) *Attorney, Agent, or Firm* — John R. S. Orange; Blake, Cassels & Graydon LLP

(57) ABSTRACT

A building structure comprises a post having a vertically extending longitudinal face. A plurality of horizontal logs extends from said longitudinal face and has an end face in abutment with said longitudinal face. The post having an undercut channel in said longitudinal face and extends along said post. At least one of said end faces has a recess aligned with said undercut channel, and a spline assembly extends between said post and said log to secure said log to said post. The spline assembly includes a key located in and extends between said channel and said recess and an insert in one of said undercut channel and said recess. The insert co operates with said key to facilitate relative sliding movement therebetween.

25 Claims, 58 Drawing Sheets

(56) References Cited

U.S. PATENT DOCUMENTS

| | | | |
|---|---|---|---|
| 2,291,712 A * | 8/1942 | Hatton | 52/272 |
| 2,498,551 A | 2/1950 | Jonsrud | |
| 3,166,802 A | 1/1965 | Schmidgail | |
| 3,189,950 A | 6/1965 | Johnson | |
| D203,663 S | 2/1966 | Blum et al. | |
| 3,381,428 A | 5/1968 | Sillman | |
| 3,440,784 A | 5/1969 | Onjukha | |
| 3,552,079 A | 1/1971 | Mortensen | |
| 4,035,977 A * | 7/1977 | Fischer | 52/653.1 |
| 4,109,409 A * | 8/1978 | Fischer | 446/127 |
| 4,115,969 A * | 9/1978 | Napier | 52/233 |
| 4,126,977 A | 11/1978 | Chisum | |
| 4,279,108 A | 7/1981 | Collister, Jr | |
| 4,438,614 A * | 3/1984 | Raith et al. | 52/580 |
| 4,512,131 A * | 4/1985 | Laramore | 52/586.1 |
| 4,567,701 A | 2/1986 | Biggs et al. | |
| 4,599,837 A | 7/1986 | Wrightman | |
| 4,742,657 A * | 5/1988 | Veech | 52/233 |
| 4,840,003 A | 6/1989 | Lucas et al. | |
| 4,901,489 A | 2/1990 | Garber | |
| 4,938,263 A | 7/1990 | Wrightman | |
| 4,962,914 A * | 10/1990 | Taylor | 256/72 |
| 5,020,289 A | 6/1991 | Wrightman | |
| 5,060,432 A * | 10/1991 | Christian | 52/233 |
| 5,265,390 A * | 11/1993 | Tanner | 52/233 |
| 5,325,645 A | 7/1994 | Wrightman | |
| 5,403,109 A | 4/1995 | Johnson et al. | |
| 5,577,356 A * | 11/1996 | Hubbard et al. | 52/233 |
| 5,584,154 A * | 12/1996 | Koepke et al. | 52/456 |
| 5,778,950 A | 7/1998 | Wrightman | |
| 5,799,452 A | 9/1998 | Moore | |
| 5,823,700 A | 10/1998 | Poworoznek | |
| 5,864,997 A * | 2/1999 | Kelly | 52/282.2 |
| 6,050,033 A | 4/2000 | Wrightman | |
| 6,186,691 B1 | 2/2001 | Rudolf-Bauer | |
| 6,272,802 B1 * | 8/2001 | Berberich | 52/233 |
| 6,363,672 B1 | 4/2002 | Baker | |
| 6,418,680 B1 * | 7/2002 | Calkins | 52/233 |
| D467,010 S | 12/2002 | Wrightman | |
| 7,223,045 B2 | 5/2007 | Migli | |
| 8,371,080 B2 * | 2/2013 | Wrightman | 52/233 |
| 2005/0268563 A1 | 12/2005 | Wrightman | |

OTHER PUBLICATIONS

"True North Log Homes Inc. Plan book" (photocopies of the two pages are enclosed showing True North's patented technologies.).

* cited by examiner

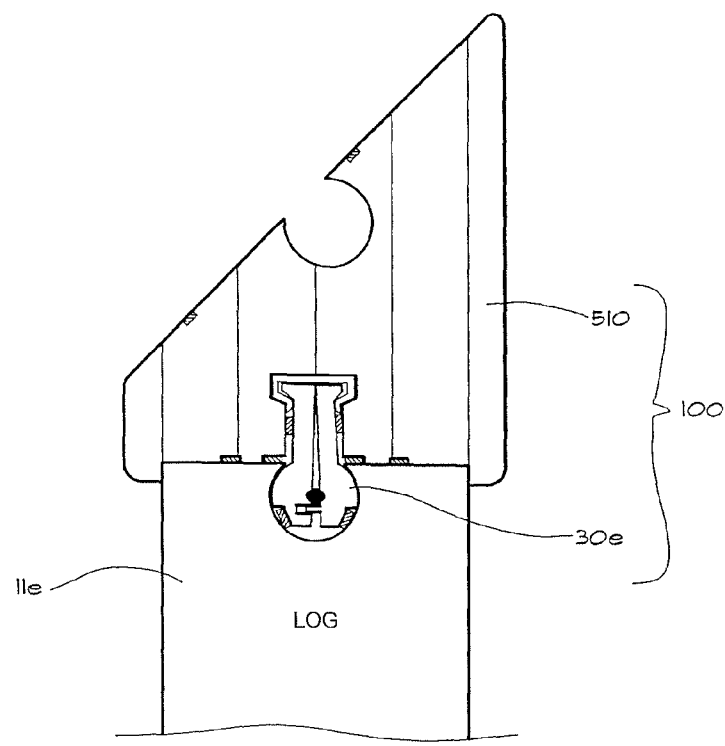
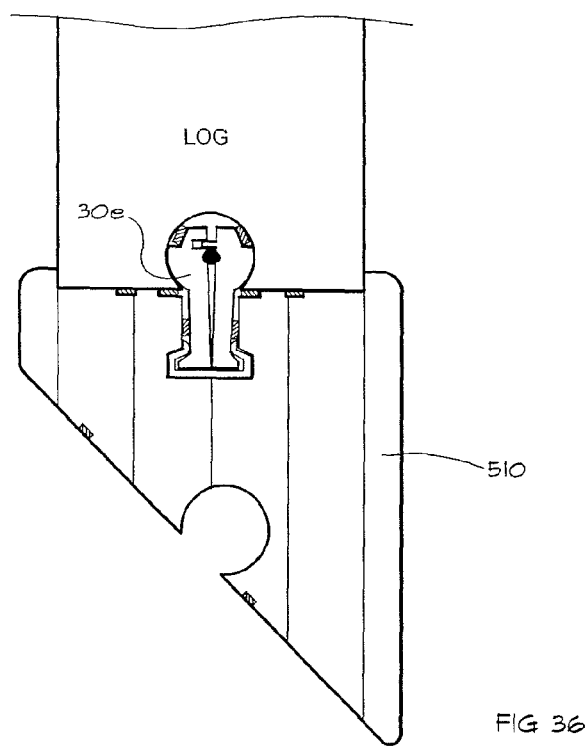
FIG 36

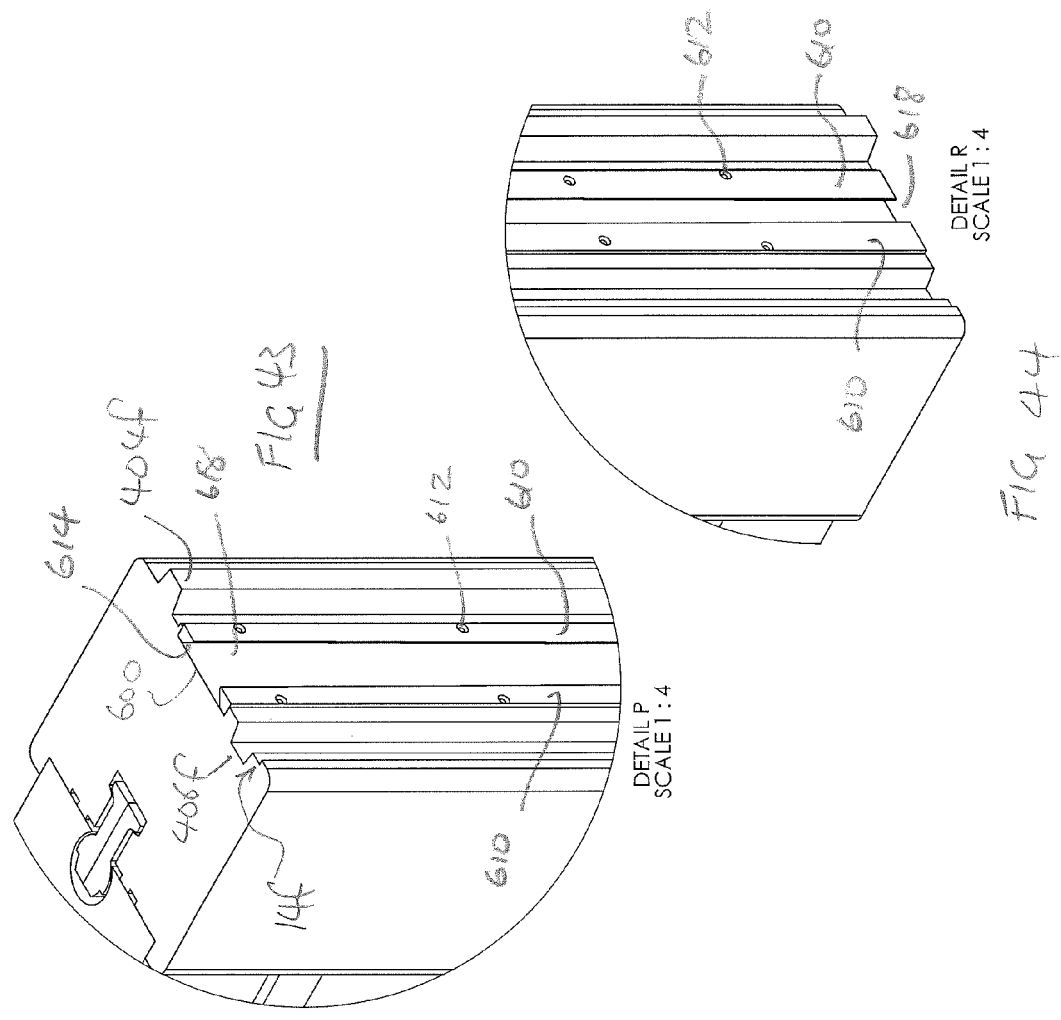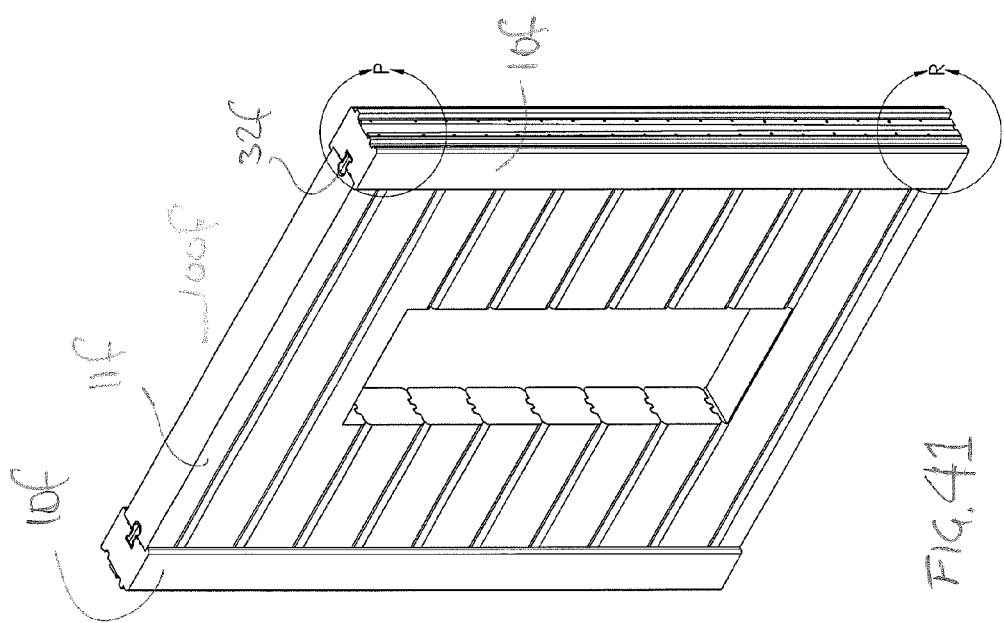

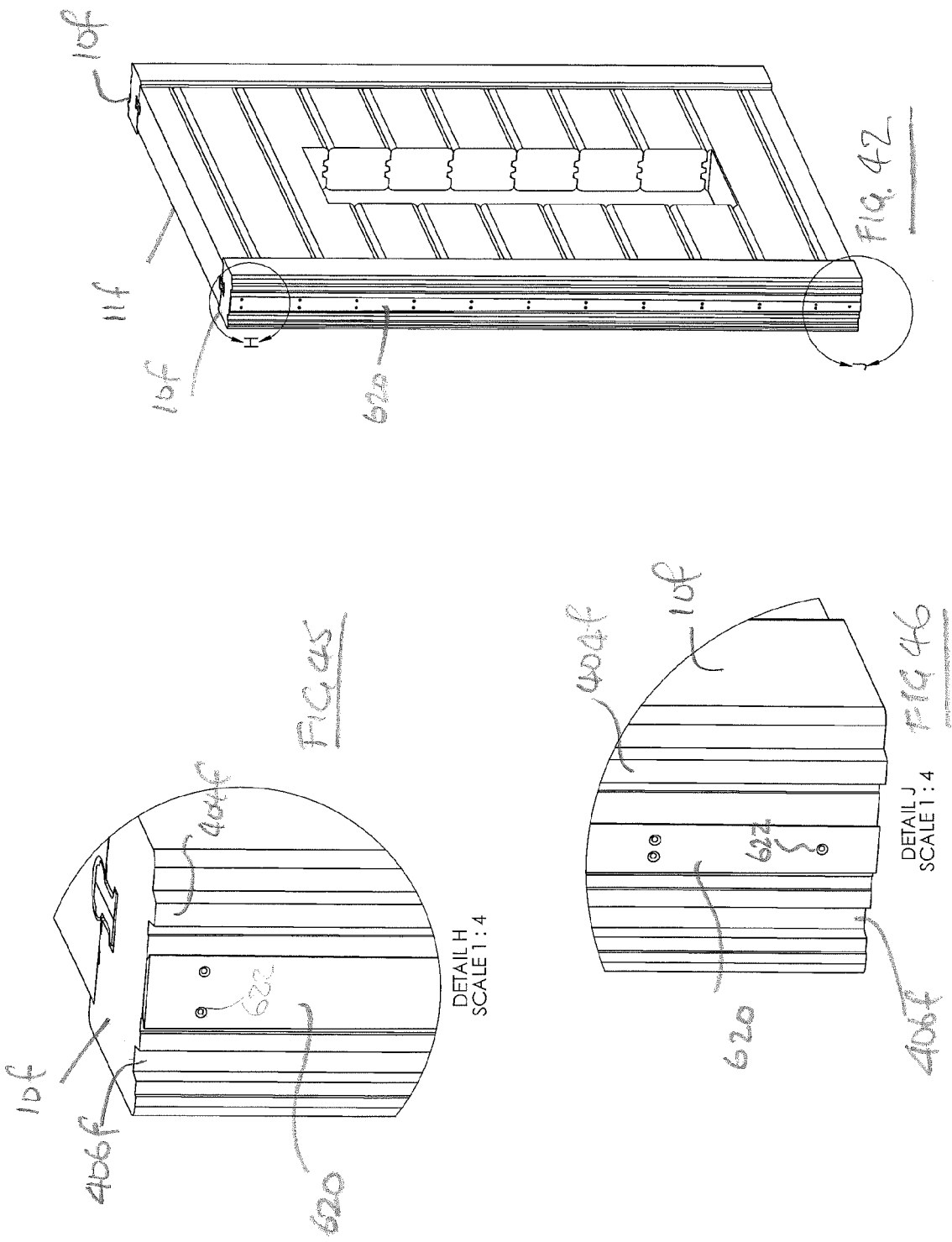

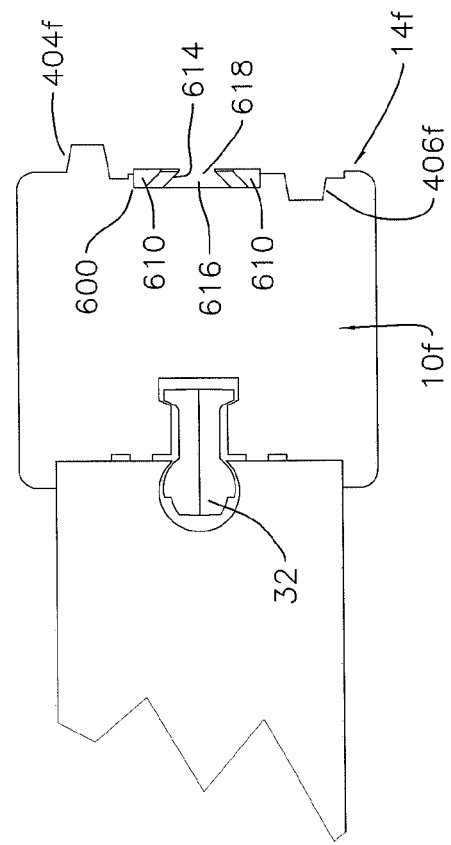
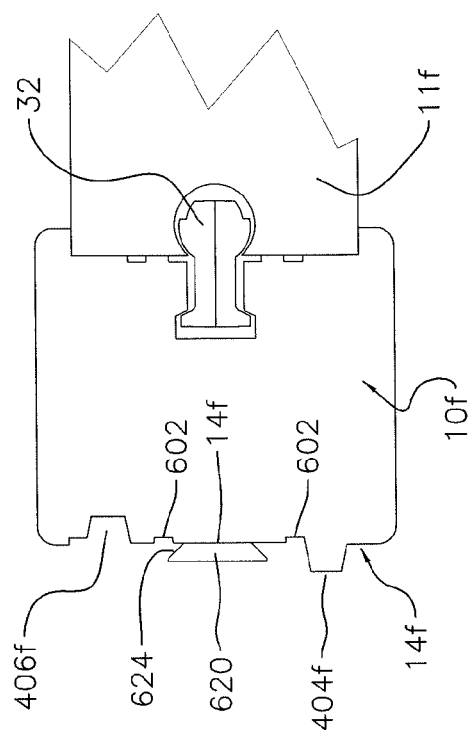
FIG 47

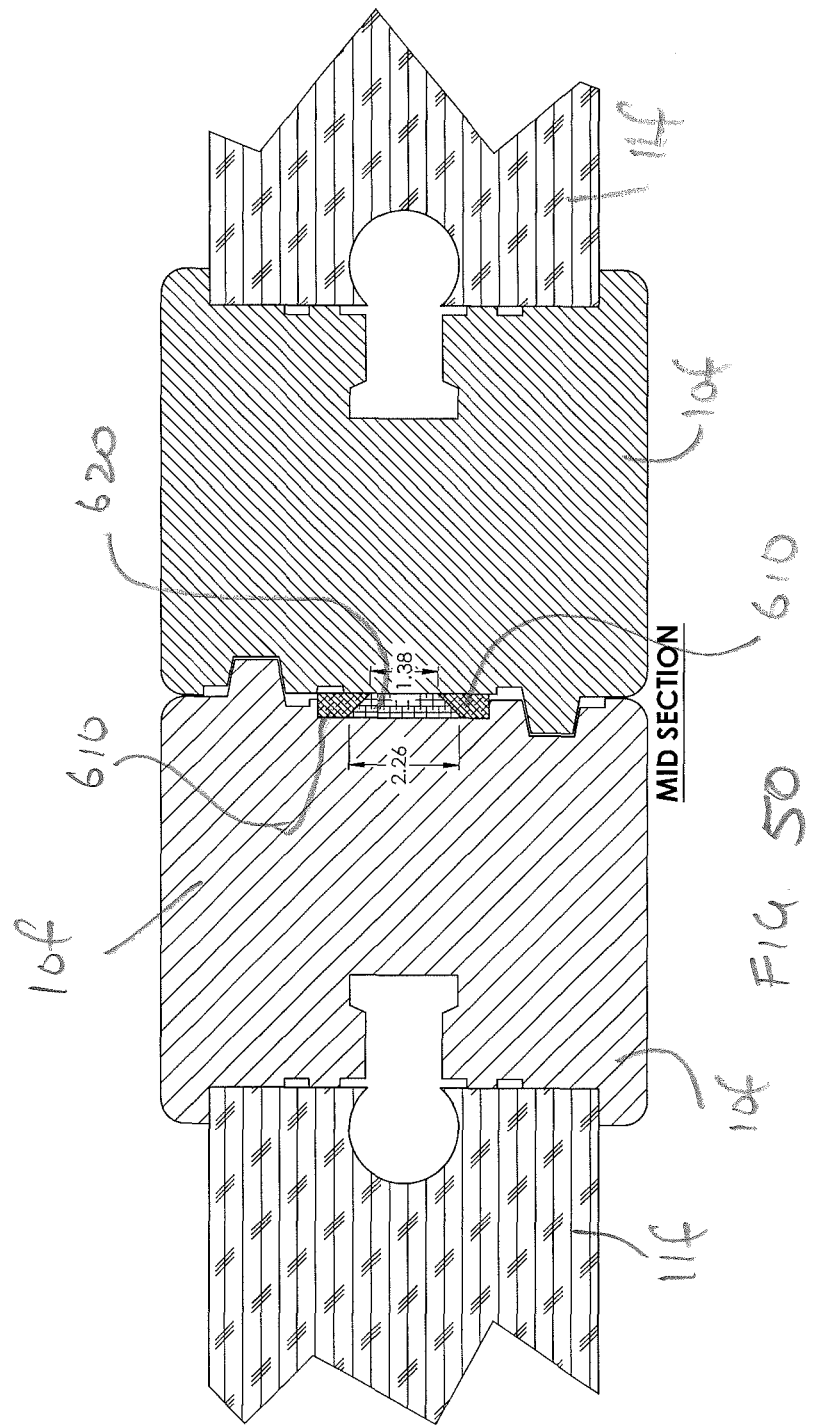

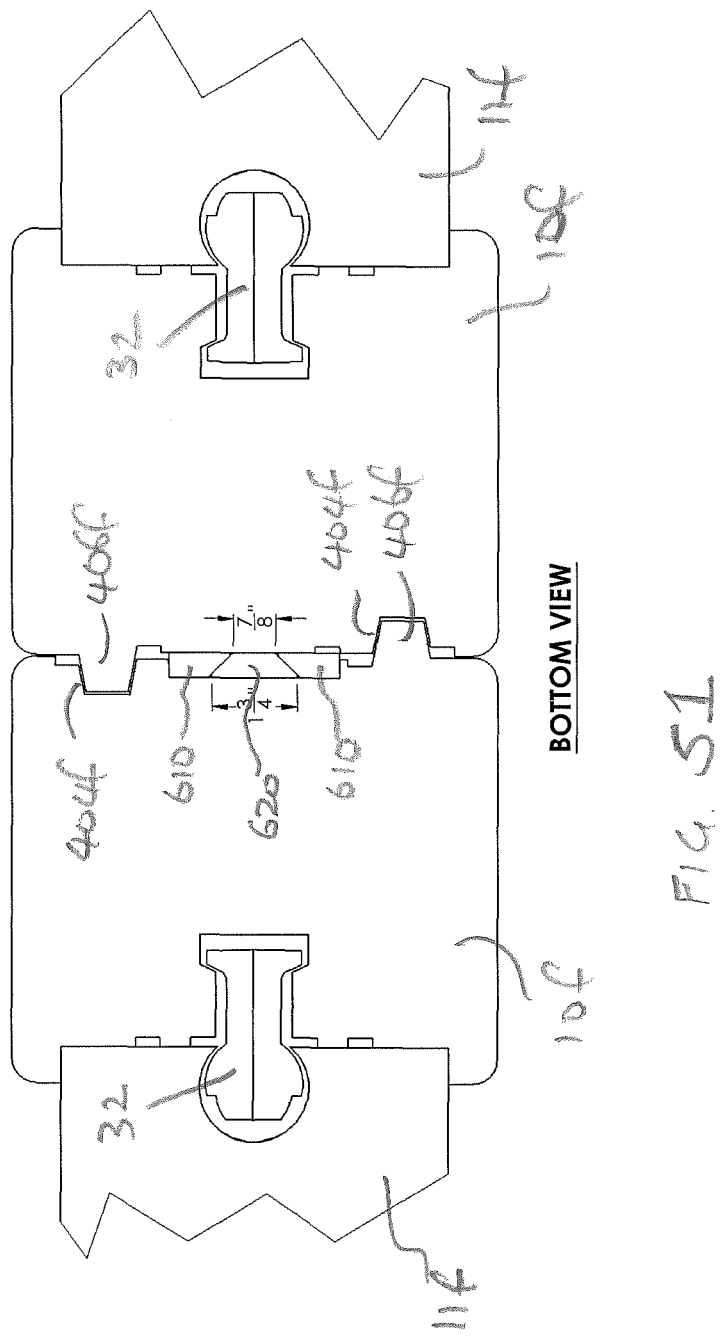

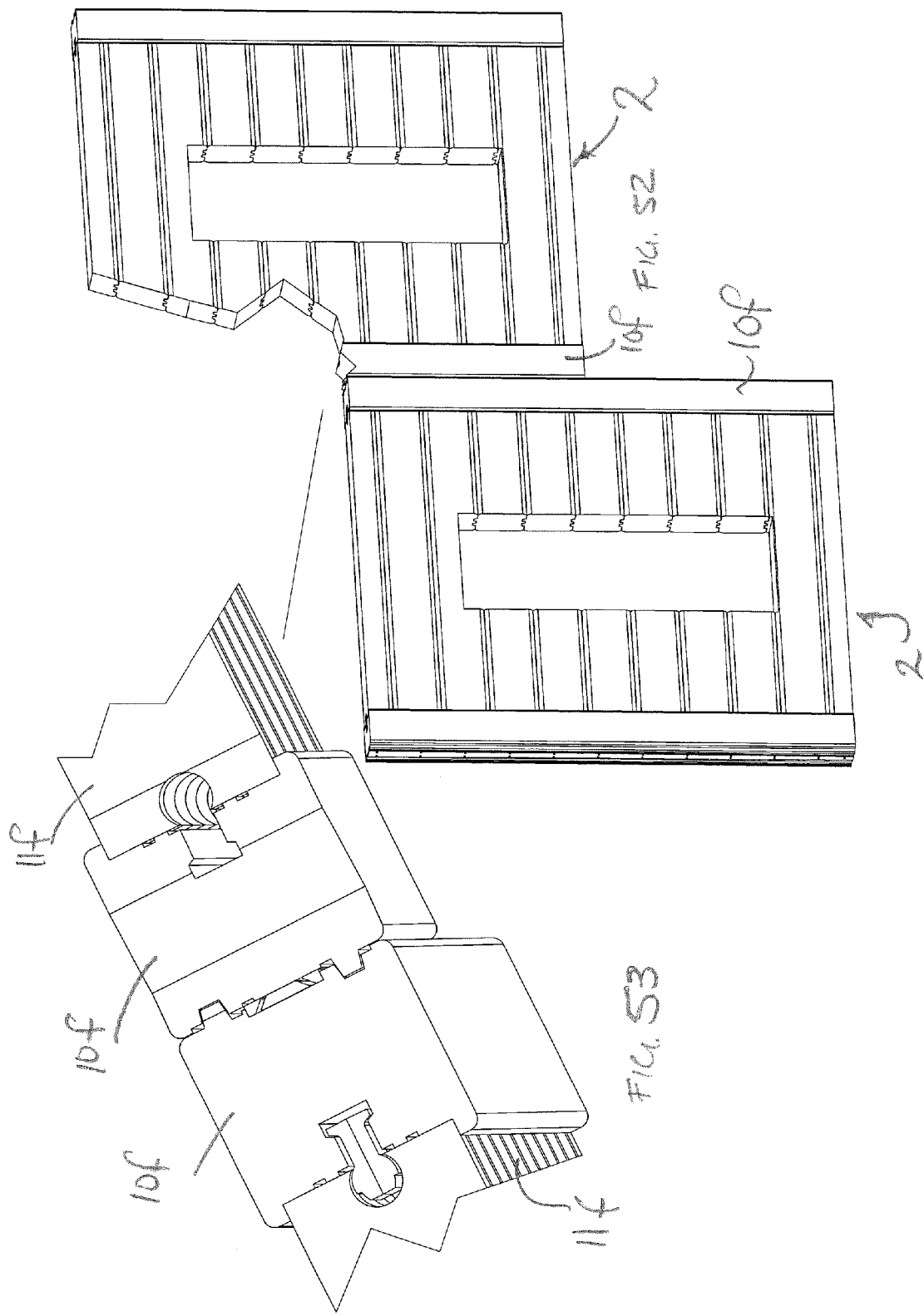

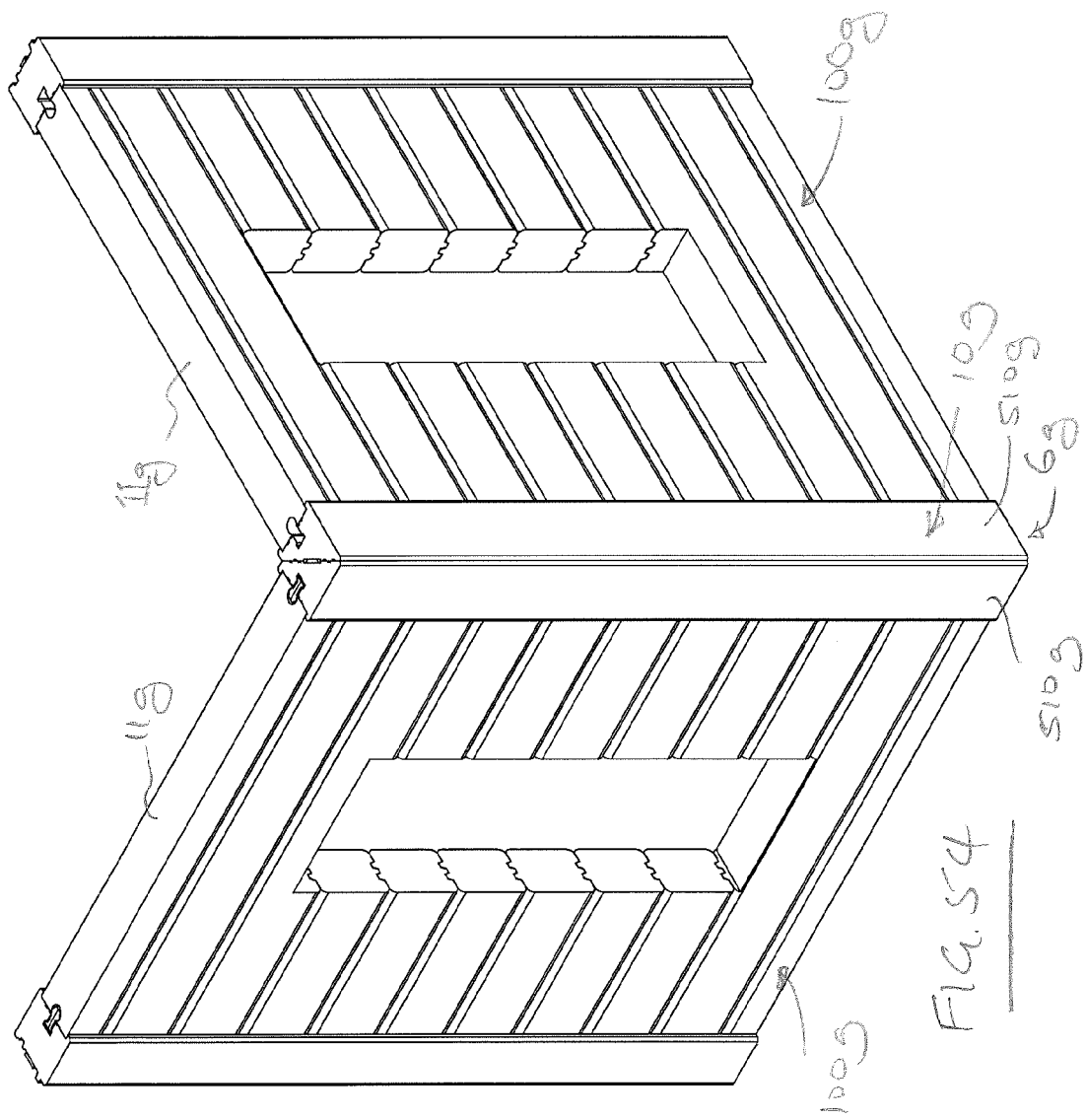

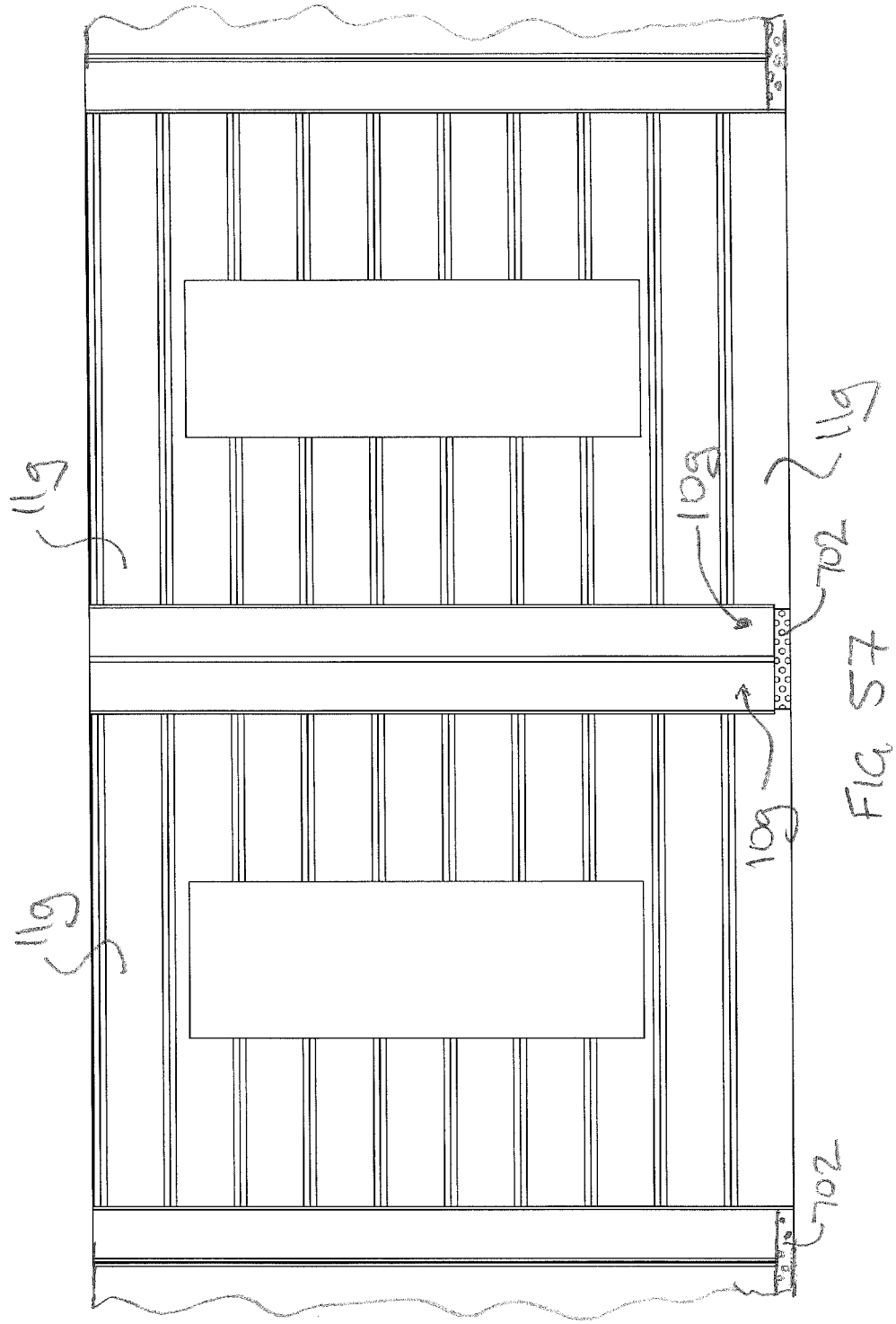

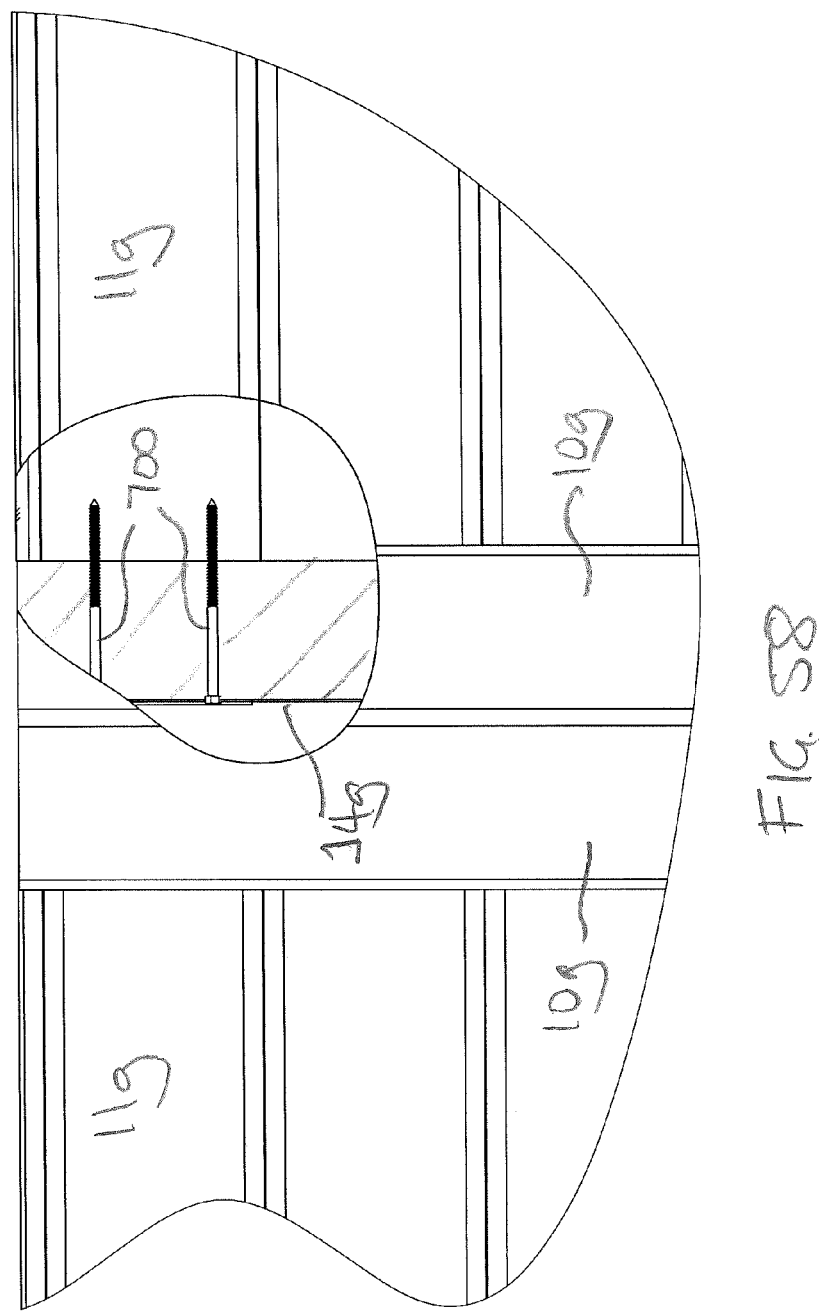

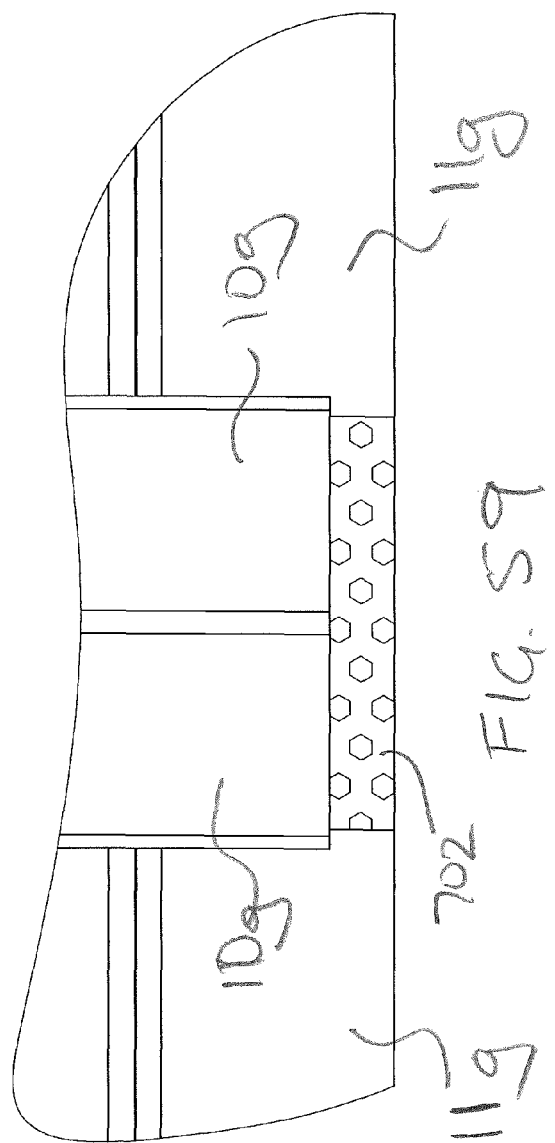

LOG WALL CONNECTOR SYSTEM

CROSS-REFERENCE TO RELATED APPLICATIONS

This application is a continuation-in-part of U.S. application Ser. No. 12/368,131 filed on Feb. 9, 2009, which is a continuation-in-part of U.S. application Ser. No. 11/892,870 filed on Aug. 28, 2007 and which also claims priority from U.S. Provisional Application No. 61/027,228 filed on Feb. 8, 2008, all of which are incorporated herein by reference.

BACKGROUND OF THE INVENTION

The present invention relates generally to wall structures and in particular to log wall structures.

Log construction has been known for many decades as typified by the log cabin. For many years the logs have been notched so that at a corner, logs forming one wall of a structure can be laid on top of and at an angle alternating with logs from an intersecting wall. Although a number of materials may be used to form the "logs" used as wall members, including various types of composite materials, the wall members are typically milled from wood. The term "logs" will be used throughout this disclosure to include all types of materials that simulate a horizontal wooden log and includes different cross sections, either machined, hand-hewn or in a natural state.

The assembly of buildings from logs has been performed using traditional techniques. Where hand hewn logs are used, the builder individually fits each log to ensure a proper fit. Whilst this is traditionally done at the final site of the building it has become more common to assemble the shell of the building at a convenient remote location and then disassemble the logs for transportation. The building is then reassembled at the intended site and finished.

Log buildings using manufactured logs have the logs machined and cut at the factory to provide the desired floor plan. The logs are then transported to the site where the building is assembled.

In practical use, traditional construction is usually limited to right angle corners because of the complexity of the angled notches required for non-right angle corners. More recently, posts have been introduced that can be milled with longitudinal faces at a range of desirable angles such that wall members having square-cut ends can be attached by spikes to the posts to form right-angle or non-right angle corners.

To form a tight connection between the logs and the posts, split key members have been used that engage cooperating undercut recesses in the end of the log and a face of the post. In U.S. Pat. No. 6,050,033 there is disclosed a spline arrangement in which the log and post are connected by a key formed by a pair of wedges. The key is expandable and secures the log to the post. A first section of the key member is fitted into place to engage the recesses in the post and the log and then a second section of the key member is inserted and tapped into place beside the first section of the key member. The cross-sections of the split key member are wedge-shaped and tighten the joint as the second portion of the key member is tapped into place.

It is necessary to ensure that the interconnecting butt joints are tight and provide an effective seal, but at the same time accommodate relative movement between logs whilst maintaining the seal. This is particularly an issue in wooden log construction because of the shrinkage of the logs as they dry. This causes the logs to settle and move vertically down. However, in some circumstances the connection of the key to both the log and the post as shown in U.S. Pat. No. 6,050,033 may inhibit such movement and as a result a gap is created between adjacent logs in the log walls.

Similar considerations apply where a pair of walls intersect, such as where an internal wall meets an external wall. This may occur between the locations of the posts and a secure butt joint between the intersecting walls is required.

It is an object of the present invention to obviate or mitigate the above disadvantages.

SUMMARY OF THE INVENTION

According to one aspect of the invention, a building structure comprises a vertically extending longitudinal face, a plurality of horizontal logs extending from said longitudinal face and having an end face in abutment with the longitudinal face. An undercut channel is provided in the longitudinal face and extends along the face. At least one of the end faces has a recess aligned with the undercut channel and a spline assembly extends between the longitudinal face and the log to secure the log to the post. The spline assembly includes a key located in and extending between the undercut channel and the recess and a slide member in one of the undercut channel and the recess. The slide member co-operates with the key to facilitate relative sliding movement of the logs and the post.

A further aspect of the invention provides a spline assembly to secure a log to a face of a log wall of a building. The spline assembly includes a slide member for insertion into an undercut channel in a vertical face and a key for insertion into said slide member and a recess in said log to extend between said log and inhibit separation thereof.

A still further aspect of the invention provides a method of assembling a log to a vertically extending face comprising the steps of providing an undercut channel in a longitudinal face, inserting a slide member in the undercut channel providing a recess in the log, aligning the recess with the slide member undercut channel, inserting a key into the key slide to extend between the post and the log, and securing the key to the recess, whereby relative movement between the log and the post is accommodated by relative sliding movement between the key slide and the key.

The face may be provided as a face of the post or as a face of an intersecting wall.

A further aspect of the invention is the provision of a building having walls formed from one or more wall sections. At least one of the wall sections has a plurality of logs interconnected at opposite ends by a respective post. A spline assembly secures the posts to the logs. The wall section is secured to an adjacent wall section by spline assemblies connecting the posts of the adjacent wall sections.

BRIEF DESCRIPTION OF THE DRAWINGS

The principles of the various aspects of the invention may better be understood by reference to the accompanying illustrative drawings which depict features of examples of embodiments of the invention, and in which:

FIG. 36 is a plan view of a section of wall formed using the components of FIG. 35.

FIG. 41 is a perspective view of an alternative embodiment of wall section.

FIG. 42 is a perspective view from the opposite end of the wall section to FIG. 41.

FIG. 43 is a detailed perspective view of the portion of the wall section within detail P.

FIG. 44 is a detailed perspective view of the wall portion within the circle P of FIG. 41.

FIG. 45 is a detailed perspective view of a portion of the wall section within circle H of FIG. 42.

FIG. 46 is a detailed perspective view of the portion of the wall section within the circle J of FIG. 42.

FIG. 47 is a plan view of the wall section of FIG. 41.

FIG. 50 is a section on the line BB of FIG. 48.

FIG. 51 is a section on the line CC of FIG. 48.

FIG. 52 is a perspective view showing a pair of wall sections of FIG. 41 during assembly.

FIG. 53 is a detailed perspective view from above of the connection between the wall sections in the position shown in FIG. 52.

FIG. 54 is a perspective view of a corner assembly.

FIG. 57 is a front elevation of an alternative wall configuration.

FIG. 58 is an enlarged view, partly in section, of an upper portion of the wall FIG. 57; and FIG. 59 is an enlarged view of a lower portion of the wall of FIG. 57.

DETAILED DESCRIPTION OF THE INVENTION

Figure 1:
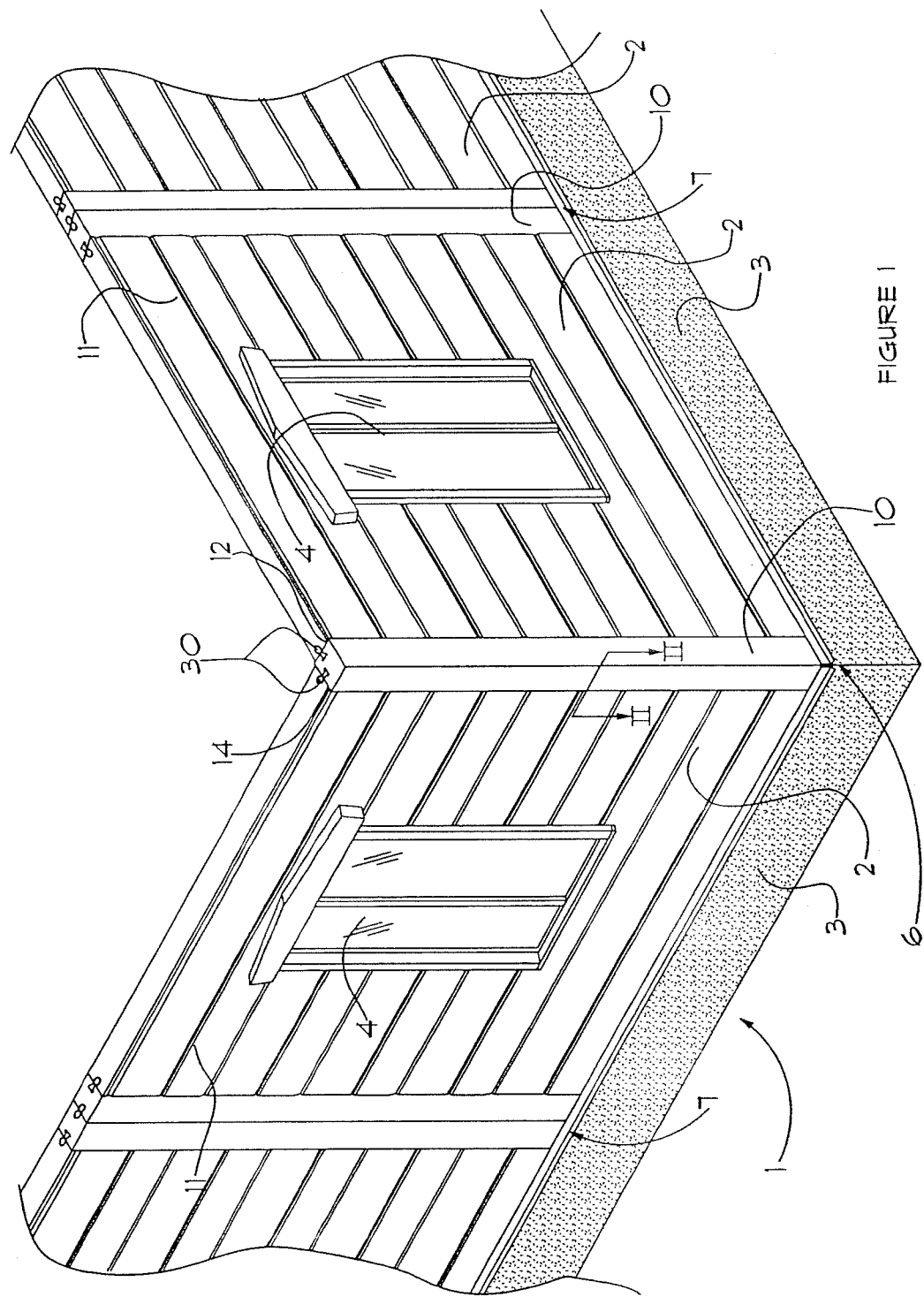
FIG. 1 is a perspective view of a building.

The description that follows and the embodiments described therein are provided by way of illustration of examples of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

Referring therefore to FIG. 1, a building 1 includes log walls 2 that intersect at a corner 6. The log walls 2 are supported on a foundation wall 3, that may be poured concrete or laid cement block, and have openings for windows 4. The log walls 2 will support a roof or additional framed storey in a conventional manner. Each of the log walls 2 is formed from logs 11 that are laid horizontally one on top of the other and are secured to posts 10 to form an integral structure. The posts 10 may be located at corners 6 and at intermediate locations 7 along the log walls 2, depending on the overall plan of the building 1.

Figure 4:
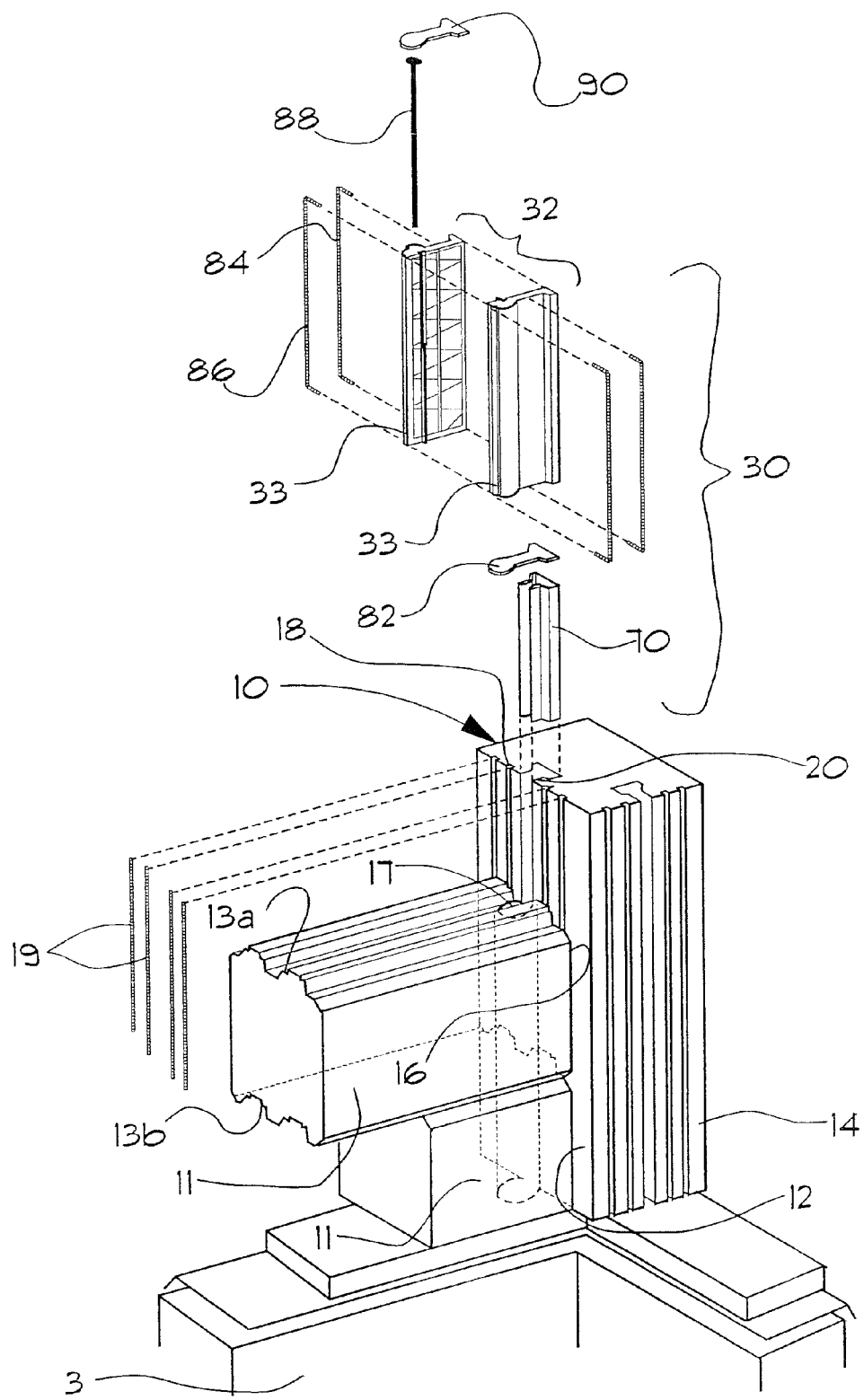
FIG. 4 is an exploded perspective view of the components shown in FIG. 3.

Each of the logs 11 is machined to an uniform cross section and have complementary tongues and grooves formed on abutting upper and lower faces 13a, 13b (FIG. 4). A sealant, typically in the form of a mastic tape, or foam tape is located between the tongue and groove and compressed by the log to form an effective seal. The particular form of tongue and groove forms no part of the present invention and a variety of configurations may be used, such as that shown in U.S. Pat. No. 5,020,289.

It will be appreciated that the log walls 2 extend along the periphery of the building 1 and the logs 11 are cut to the required length to conform to the desired floor plan.

Each of the posts 10 extends vertically the height of the log wall 2 and each post 10 has a pair of generally planar faces 12, 14, that are disposed at the required included angle. Where the post 10 is located at the corner 6 of the building 1, typically, the planar faces 12, 14 intersect at right angles but other included angles can be provided, as shown in FIG. 7. Where the posts are at intermediate locations the planar faces 12, 14 are oppositely directed.

Figure 2:
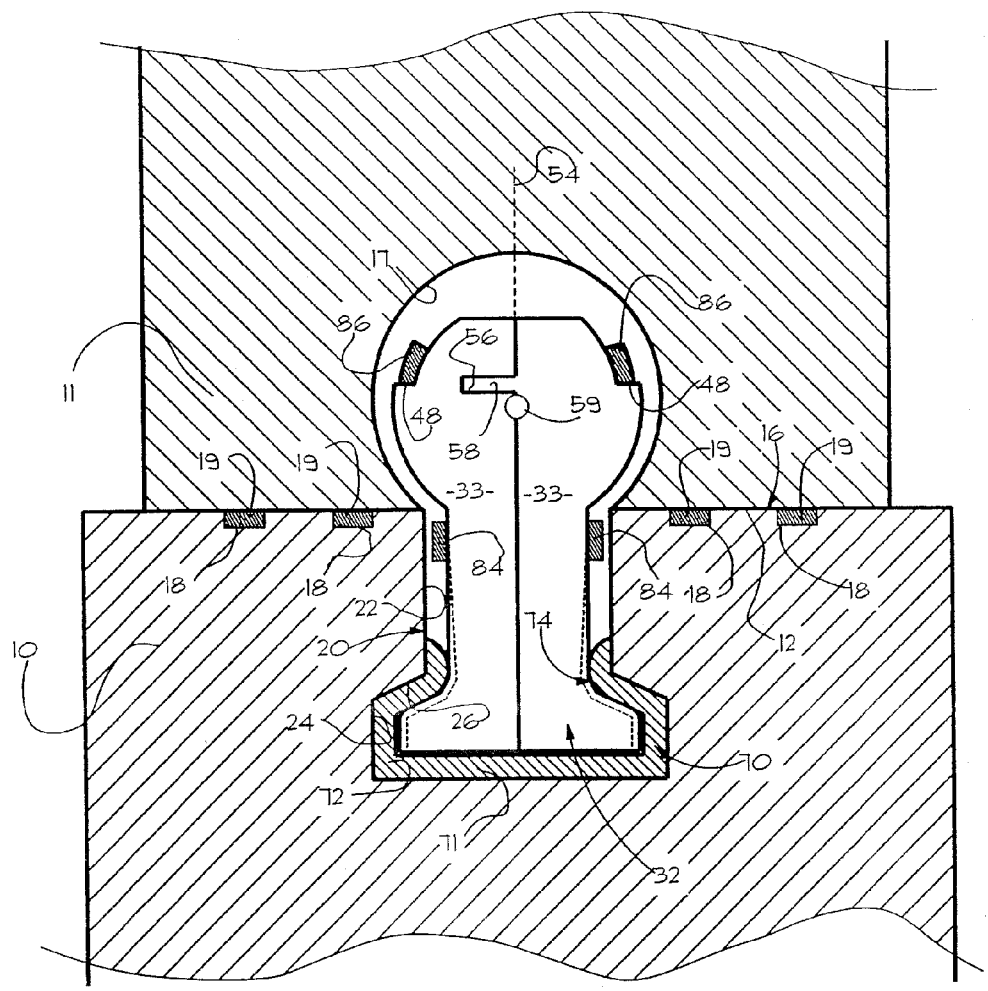
FIG. 2 is a view on the line II-II of FIG. 1 showing components as assembled.

As can best be seen in FIG. 2 and FIG. 4, which illustrates a corner 6, each of the logs 11 has an end face 16 that extends between the upper and lower faces 13a, 13b to butt against one of the planar faces 12, 14 of the post 10. The end face 16 has a part cylindrical slot 17 extending between the upper and lower faces 13a, 13b of the log 11 and intersecting the end face 16 so as to define a re-entrant recess in the end face 16.

Sealant slots 18 are provided along the length of each of the planar faces 12, 14 of post 10. The sealant slots 18 are dimensioned to accept sealant materials, typically in the form of butyl or impregnated foam tapes 19 that are exposed to the end face 16 when a log 11 is butted against post 10.

Each of the planar faces 12, 14 has an undercut channel 20 extending along the length of the post 10. The undercut channel 20 has a parallel sided body portion 22 which opens to an enlarged socket 24. Inclined flanks 26 connect the body portion 22 to the enlarged socket 24. The width of the body portion 22 corresponds to that of the opening of part cylindrical slot 17 at the end face 16.

The logs 11 are held against the respective planar face 12, 14 by the spline assembly generally indicated at 30 in FIG. 4. The spline assembly 30 includes a key 32 and a slide member, referred to as key slide 70. The key 32 has a pair of key members 33 that are identical to one another and have a length slightly less than the corresponding height of the log 11. For example, with a log of nominal 12" height, the key 32 will typically be 10" in length.

Figure 5:
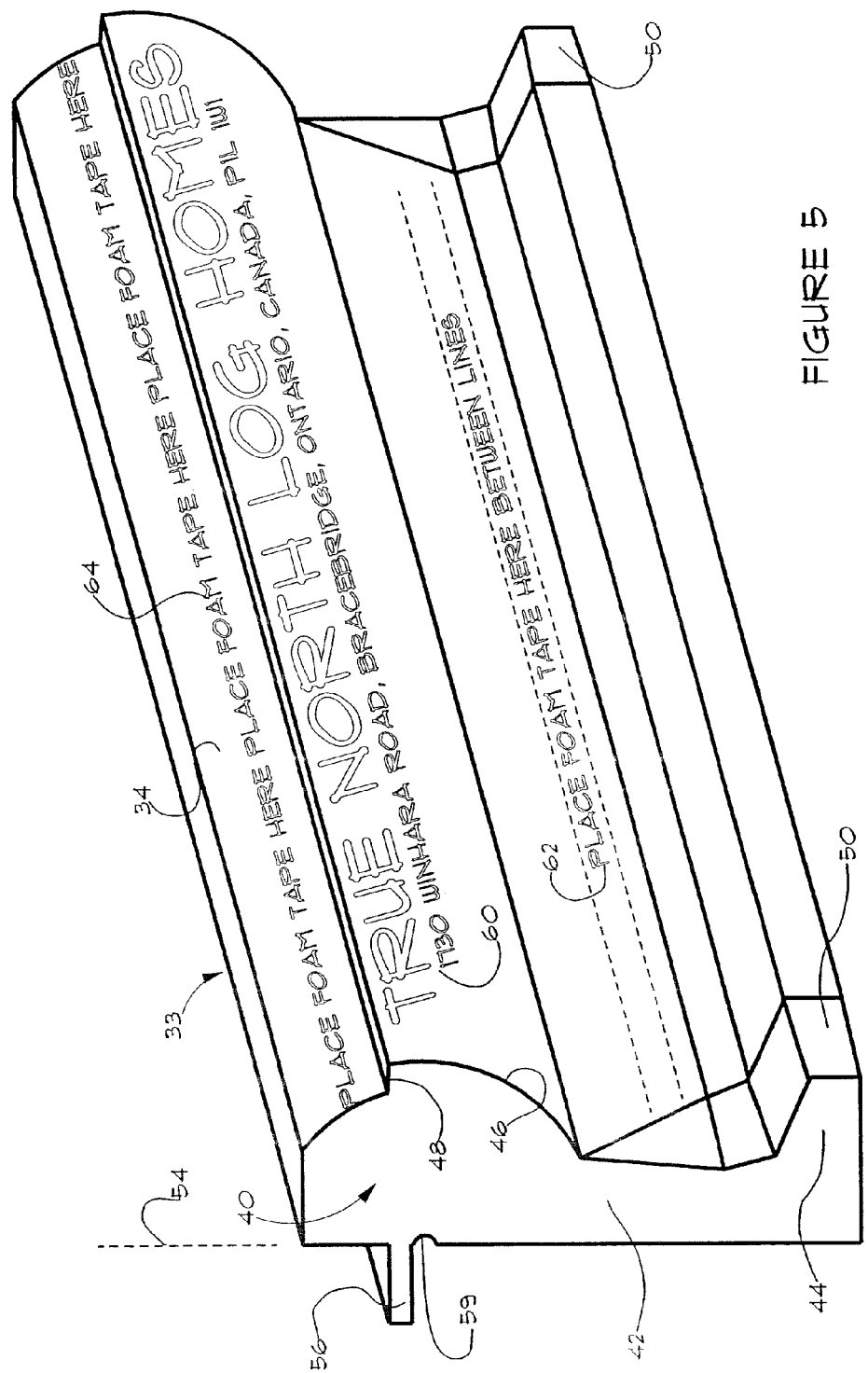
FIG. 5 is a perspective view of a key member used in the embodiment of FIGS. 1 to 4.
Figure 6:
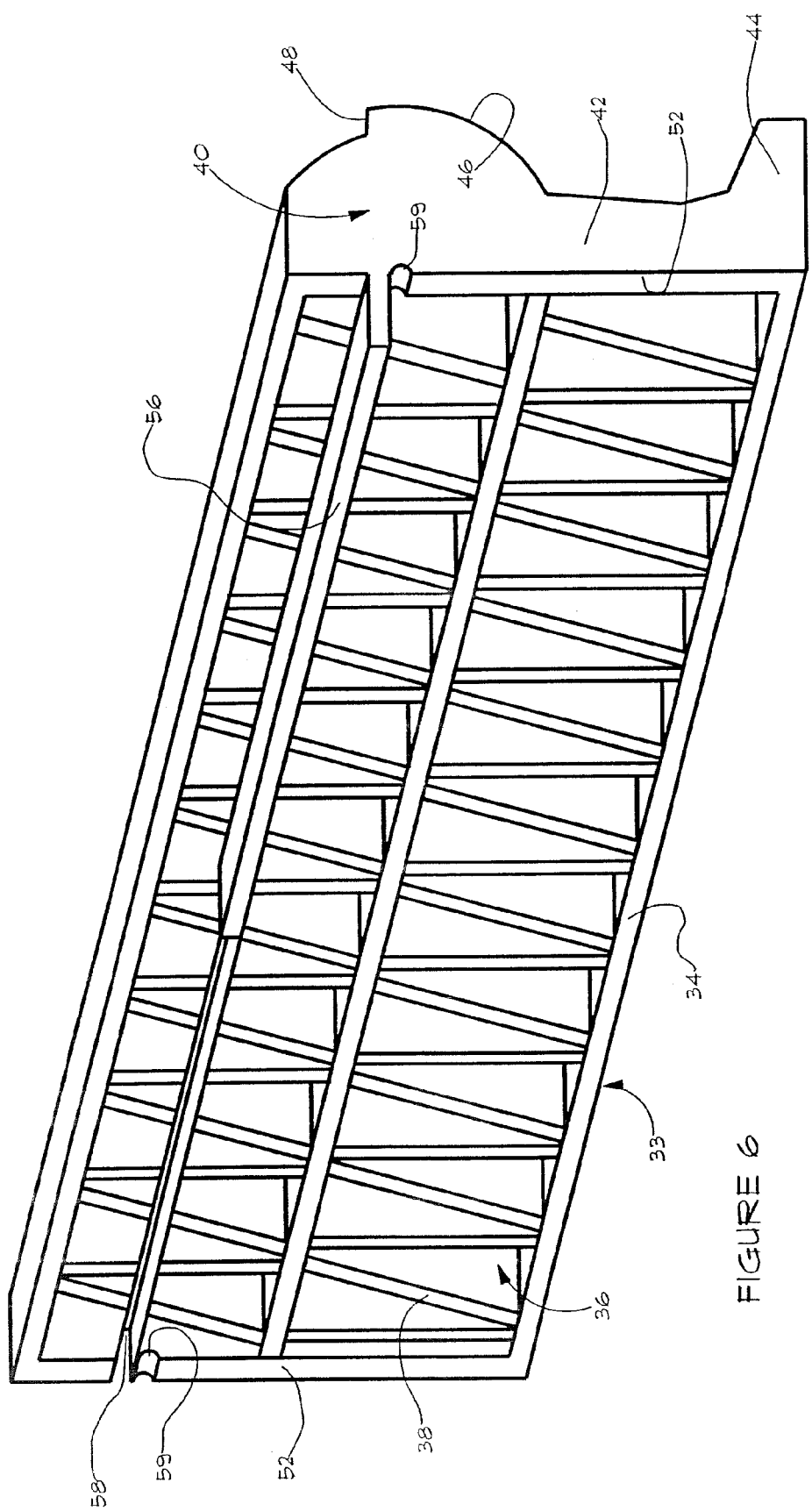
FIG. 6 is a rear perspective of the key member of FIG. 5.

The key members 33 are best seen in FIGS. 5 and 6. Each key member 33 is molded from a plastics material and has an outer shell 34 with a hollow interior 36 with reinforcing ribs 38 integrally molded with the outer shell 34. In cross section, each of the key members 33 is similar to one half of the void formed between the part cylindrical slot 17, undercut channel 20 and the key slide 70 so that a pair of key members 33 may be inserted within the void.

Each of the key members 33 has an enlarged head 40 connected by a neck 42 to a flared shoulder 44. The enlarged head 40 has an arcuate undersurface 46 terminating in radial step 48. Each end of the key members 33 has a tapered terminal section 50 on the neck 42 and the flared shoulder 44 to facilitate insertion in to the key slide 70. End walls 52 enclose the shell at each end up to a median plane 54. A flange 56 projects outwardly from the median plane 54 at one end and extends one half the length of the key member 33. A slot 58 having a depth slightly greater than that of the flange 56 is molded into the key member 33 in alignment with the flange 56 over the balance of the length of the key member 33. A notch 59 is formed in each end wall 52 beside the flange 56 and slot 58 respectively.

The flange 56 and slot 58 are arranged such that when two key members 33 are placed back to back, that is with the interior of the shells 34 facing one another, the flange 56 of one is received in the slot 58 of the other, so a continuous barrier is provided along the length of the key members 33. It will be noted from FIG. 5 that the arcuate undersurface 46 has embossments 60 molded along its length. The embossments 60 are in the form of letters in the embodiment shown that project slightly above the arcuate undersurface 46. Similar embossments 62, 64 are molded on the neck 42 and above the radial step 48.

Figure 8:
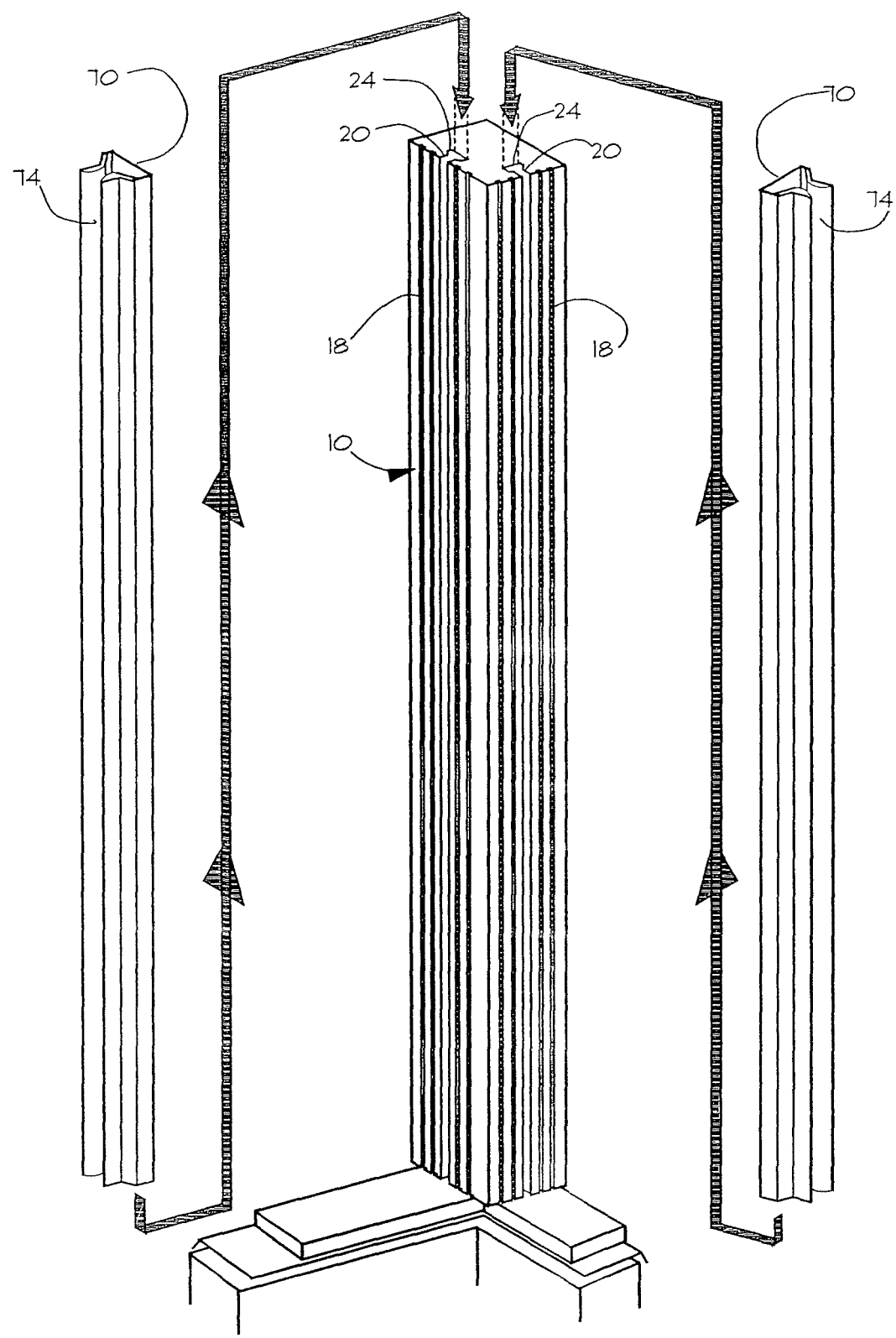
FIG. 8 is an exploded view of components used at a corner of the building of FIG. 1.

As can best be seen in FIGS. 2, 4 and 8, the slide member or key slide 70, is provided to promote relative sliding movement between a log and the post. As shown, the key slide 70 of the spline assembly 30 is an elongate channel member arranged to be a sliding fit within the enlarged socket 24 of the undercut channel 20. The key slide 70 generally extends the full height of the post 10 as a continuous member, although it could made from multiple shorter pieces arranged end to end, and is inserted into the enlarged socket 24 of undercut channel 20 after machining of the post 10. The key slide 70 is dimensioned to have contact with the parallel sided body portion 22 of the undercut channel 20, inclined flanks 26 and enlarged socket 24 in its free body state so as to be retained within the undercut channel 20 during transport of the post 10 and subsequent assembly of the log walls 2 and the post 10.

Figure 3:
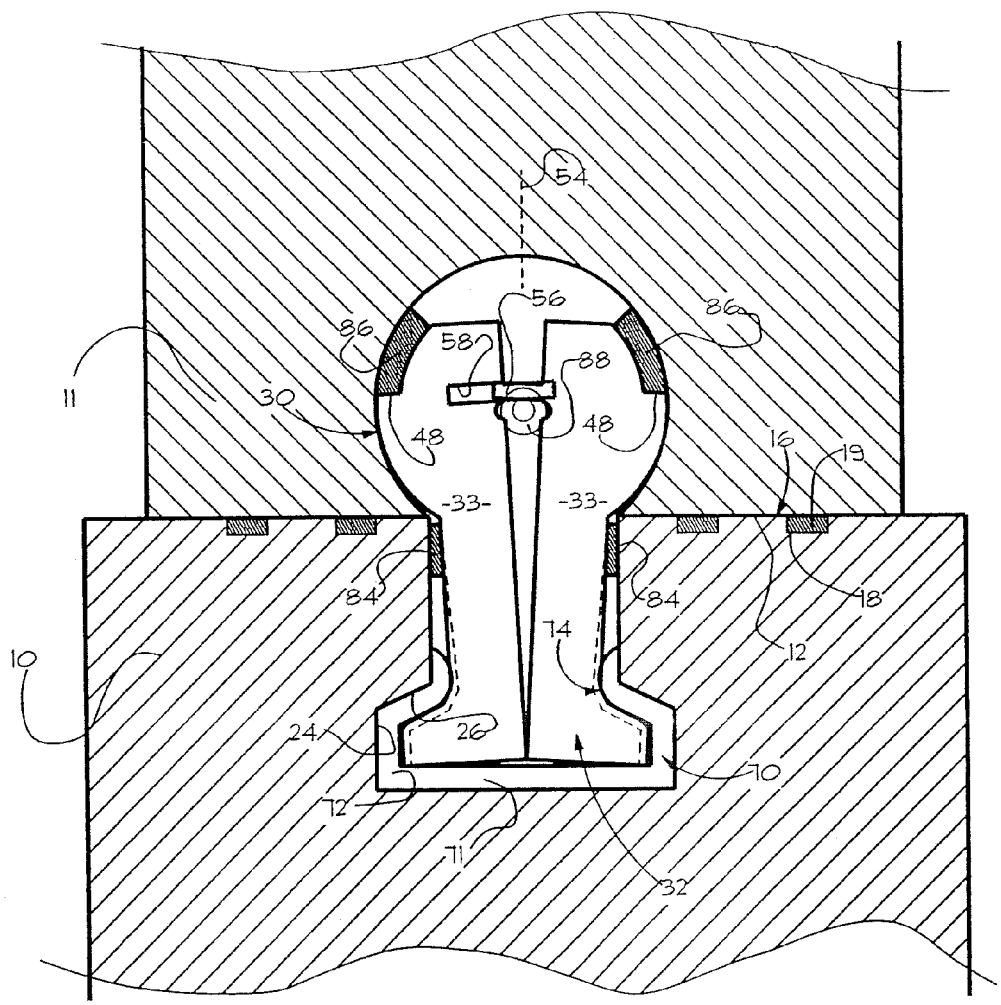
FIG. 3 is a view similar to FIG. 2 with the components in a expanded position.

As can best be seen in FIGS. 2, 3 and 8, the key slide 70 has an outer surface that conforms substantially to the enlarged socket 24. The key slide 70 has a base 71 with upstanding walls 72 projecting from opposite sides of the base 71. The upstanding walls 72 project to form a throat 74 that extends into the body portion 22 with the inwardly directed surfaces of the throat 74 radiussed so as to provide a rolling contact between the junction of the neck 42 and the flared shoulder 44 of each of the key members 33 (FIG. 3). The key slide 70 is of substantially uniform thickness so as to be a snug sliding fit within the enlarged socket 24 and allow the neck 42 and flared shoulder 44 of key 32 to be a sliding fit within the key slide 70.

The key slide 70 is formed of a suitable material having the requisite thermal insulation qualities, low surface friction, hardness and durability. A thermo-plastic material such as polyethylene or polypropylene is suitable. Polypropylene has a relatively low surface friction to facilitate insertion and to provide a smooth sliding surface between the key 32 and the key slide 70.

The assembly of the log walls 2 shown in FIG. 1 is best seen with reference to the sequence represented in FIG. 7 where the walls intersect at an obtuse angle, rather than right angle. Initially, a flashing F is secured to the foundation wall 3 and two rows of butyl tape 80 are applied toward the exterior of the building. The paper covering found on the butyl tape 80 is left in situ to allow for slight adjustment of the initial course of logs 11.

Figure 7A:
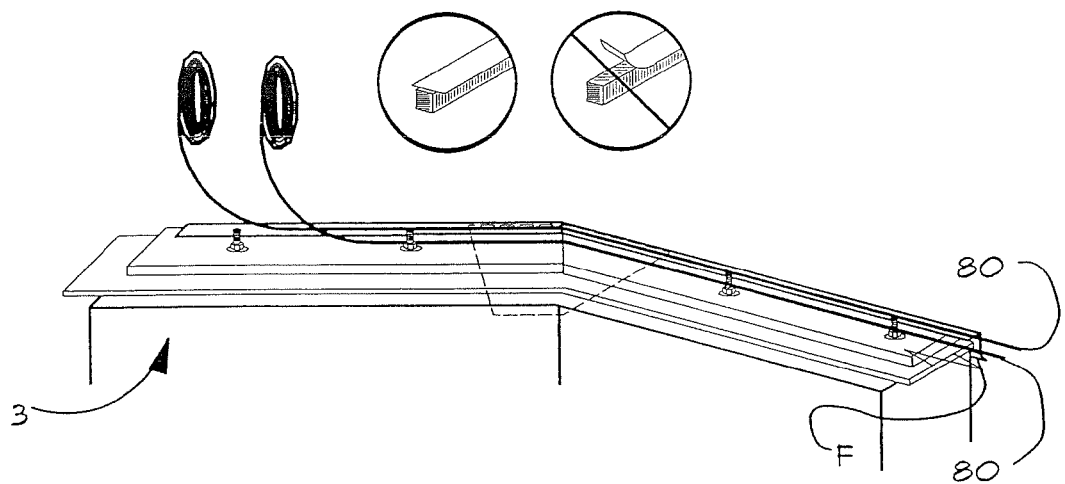
FIG. 7(a)-(k) is a schematic representation of the steps of assembling the building of FIG. 1.
Figure 7B:
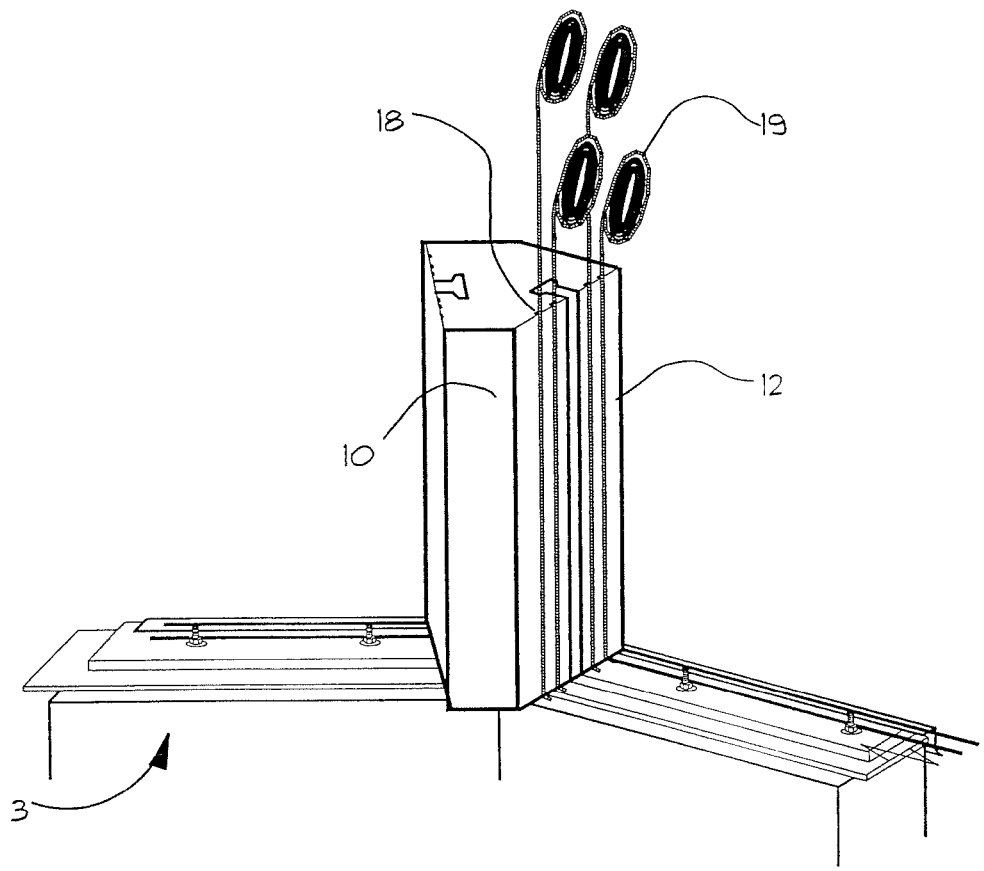

With the two rows of butyl tape 80 installed on the flashing F, the post 10 with the key slide 70 inserted in the channel 20 is placed on the foundation wall 3 and foam tape 19 inserted into each of the sealant slots 18 on one planar face 12 of the post 10 (FIG. 7b). The surface of the foam tape 19 immediately adjacent the work area is revealed by removal of the paper covering, which progresses along the length of the post 10 as the log wall 2 is assembled.

Figure 7C:
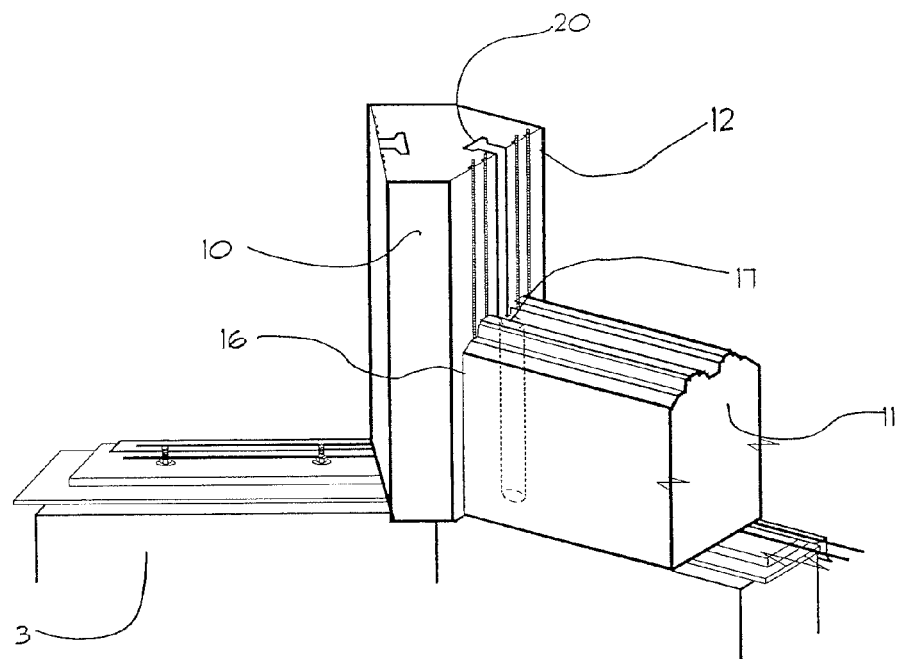
Figure 7D:
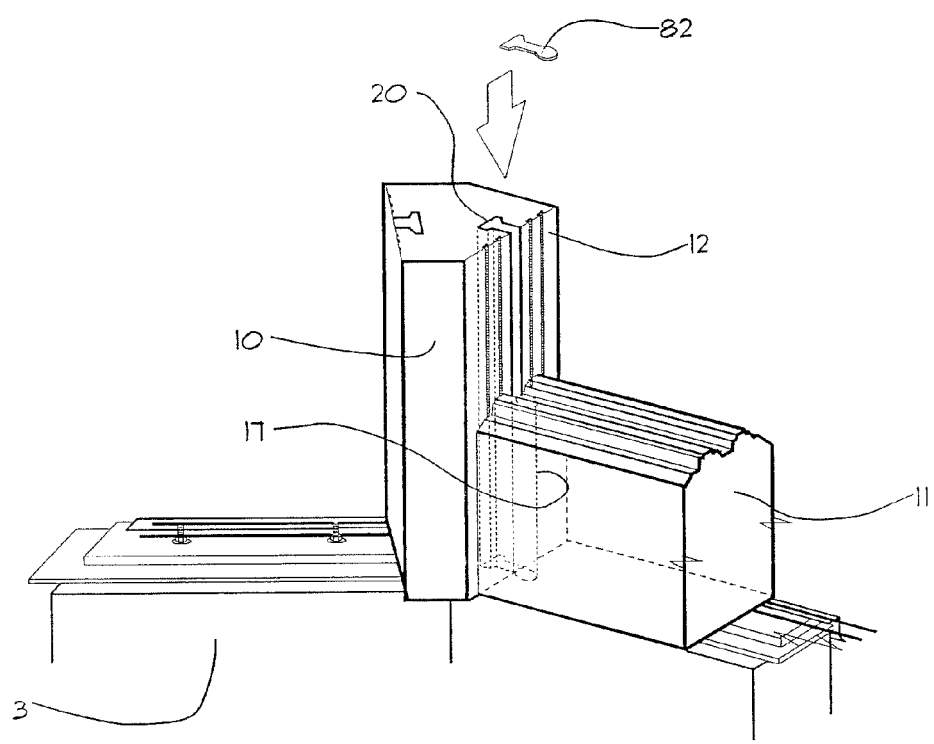

The initial log 11 is then placed against the post 10 with the end face 16 in abutment with the planar face 12 (FIG. 7c). In this position, the part cylindrical slot 17 is aligned with the undercut channel 20. An asphalt impregnated foam pad 82 conforming to the shape of the part cylindrical slot 17 and undercut channel 20 is inserted from the top of the log 11 (FIG. 7d) and pushed down in the part cylindrical slot 17 until it reaches the top of the foundation wall 3.

Figure 7E:
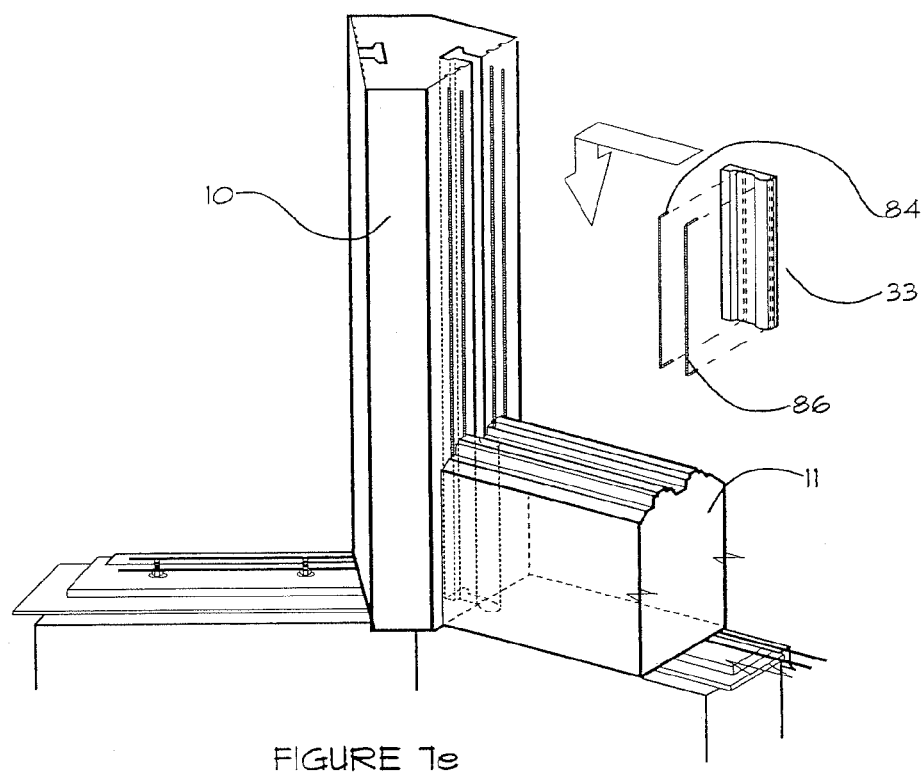
Figure 7F:
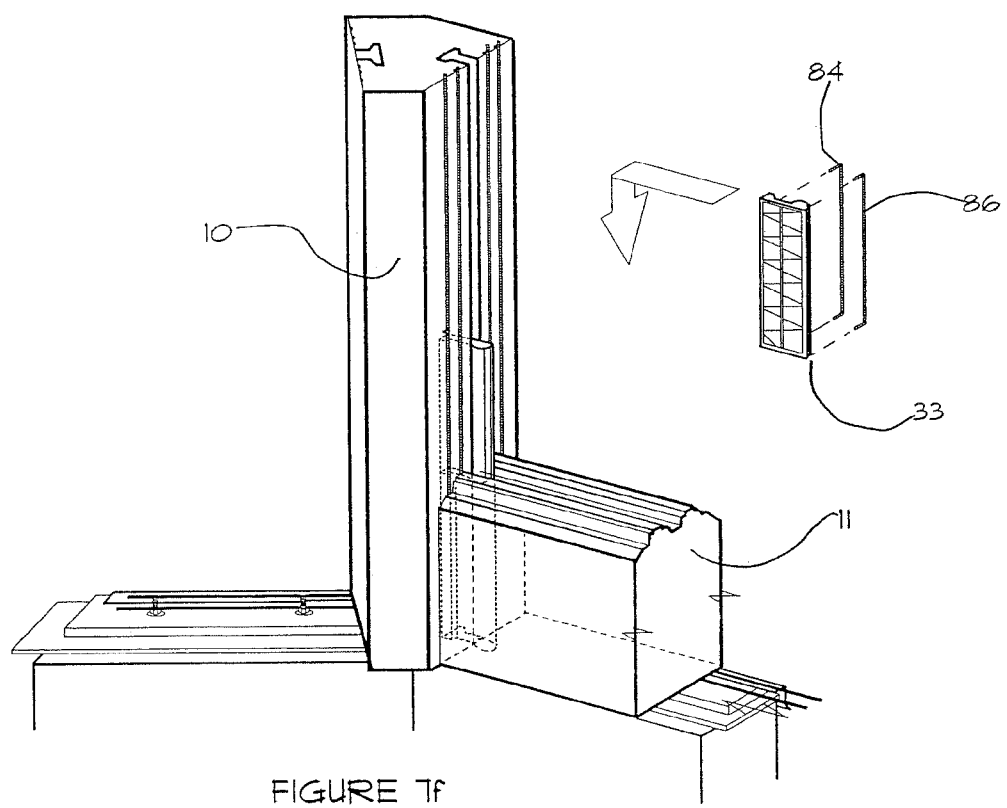
Figure 7G:
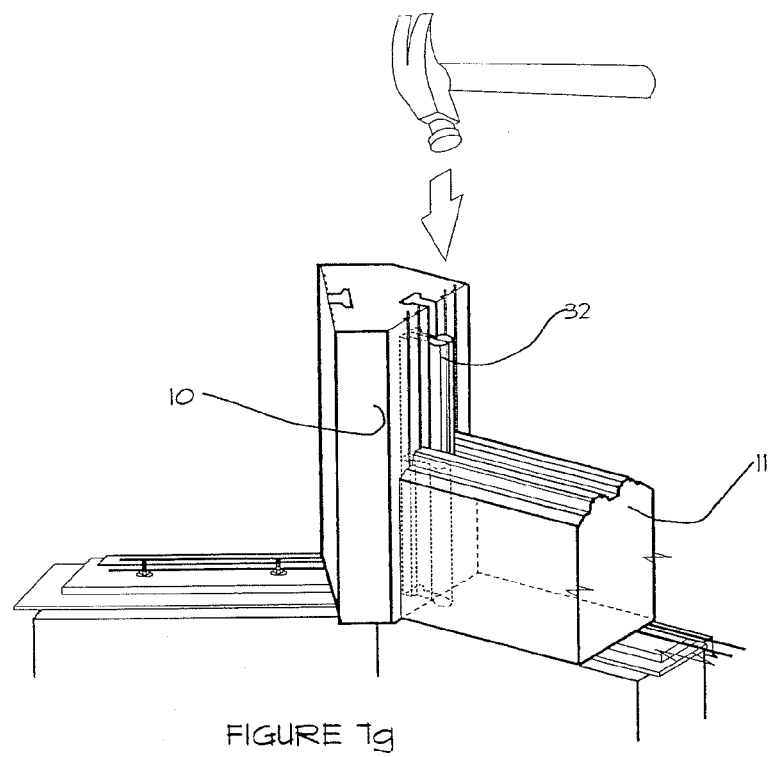

To secure the log 11 to the post 10, a key member 33 is inserted, as shown in FIGS. 7e to 7g. Prior to insertion of the key member 33 lengths of sealant tape 84, 86 are applied to the neck 42 directly on embossment 62 and to the enlarged head 40 directly on embossment 64 of each key member 33

(FIG. 5). The sealant tape 84, 86, is not initially in engagement with the parallel sided body portion 22 or the part cylindrical slot 17 during insertion and the sealant tape 84, 86 therefore remains in situ during insertion of the key member 33. The sealant tape 84,86 is held in situ during insertion by the inherent adhesiveness of the surface of the sealant tape 84,86 that is against the key member and by engagement with the embossments 62,64 molded on the surface of the outer shell 34. When initially placed on the key member 33, the sealant tape 84, 86 is in a compressed state as it has been removed from a roll of tape and progressively expands to its free body state. Each of the key members 33 is inserted into the key slide 70 in post 10 individually such that the flared shoulder 44 may pass through the throat 74 of the key slide 70 (FIGS. 7e and 7f). The first of the key members 33 is inserted with the flange 56 lower most. The other of the key members 33 may then be inserted into the key slide 70 above the first key member 33 and the two key members 33 slid together axially. The flange 56 on one key member 33 is received in the slot 58 of the other key member 33 as the key members 33 slide together to form the key 32.

Figure 7H:
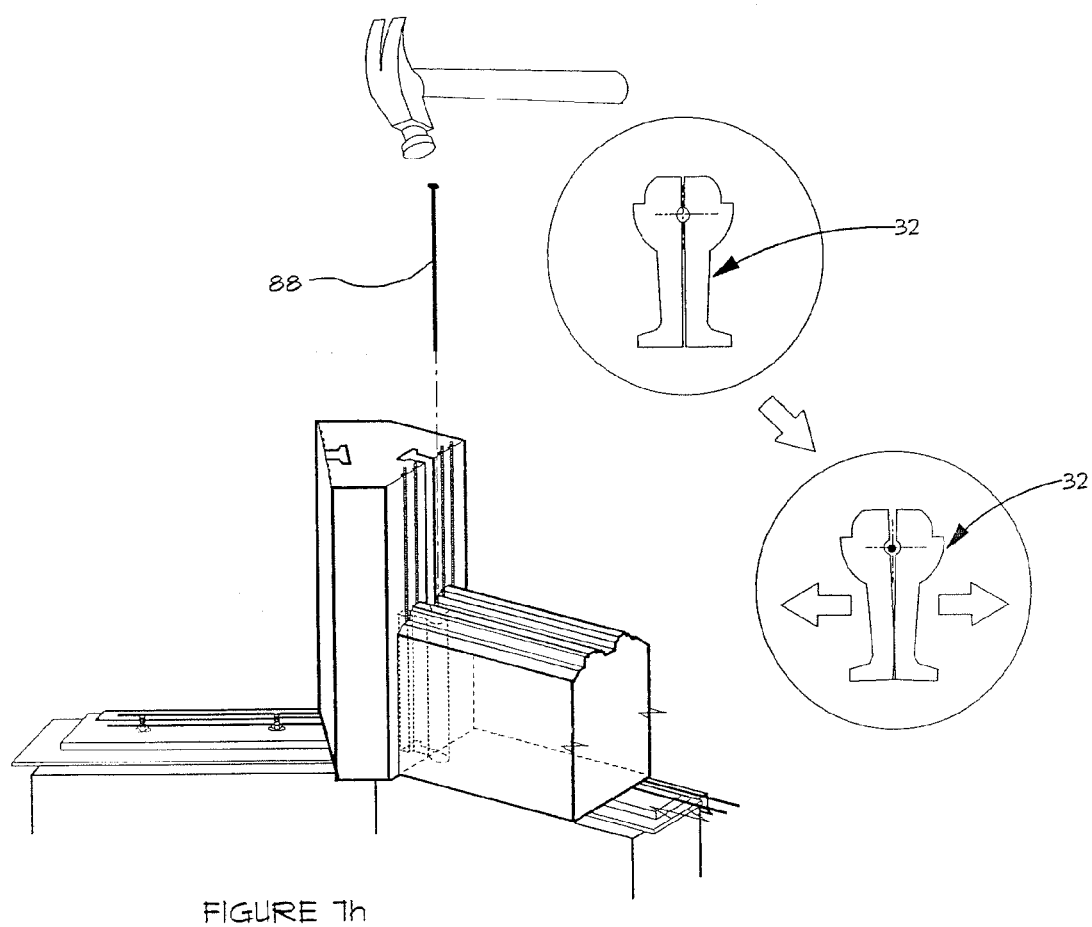

With the key members 33 assembled, they form the key 32 and may be pushed as a unit into the part cylindrical slot 17 (FIG. 7g) until they are flush with the bottom of the grooves provided in the top surface 13a of the log 11. At this time, the sealant 84, 86 has not expanded to its free body state, thereby avoiding contact with the walls of the part cylindrical slot 17 or parallel sided body portion 22 of the undercut channel 20. The key members 33 and key slide 70 are dimensioned such that the key 32 may slide relatively easily along the key slide 70 and into the part cylindrical slot 17. Typically a clearance in the order of ⅛ of an inch on the diameter is provided between the arcuate undersurface 46 and the cylindrical wall of the part cylindrical slot 17. However, the flared shoulders 44 extend laterally into key slide 70 within the enlarged socket 24 so as to inhibit removal of the key 32. With the key 32 correctly positioned, the key members 33 are forced apart within the part cylindrical slot 17 by insertion of a spike 88 along the length of the key member 33 (FIG. 7h). The spike 88 is inserted into the notch 59 provided adjacent the flange 56 and acts as a wedge to separate the key members 33. The enlarged head 40 is dimensioned to prevent removal from the part cylindrical slot 17 in the locked condition as seen in FIG. 3. The flanges 56 act as a barrier to prevent lateral movement of the spike 88 from between the key members 33 and to cause a uniform spreading of the key 32 within the part cylindrical slot 17. The relatively small surface area of the reinforcing ribs 38 reduces the friction on the spike 88 and reduces the downward force transferred to the key members 33 by the spike 88. The initial spreading of the key 33 members also brings the embossments 60 in to engagement with the walls of part cylindrical slot 17 to inhibit further upward or downward movement.

Figure 7I:
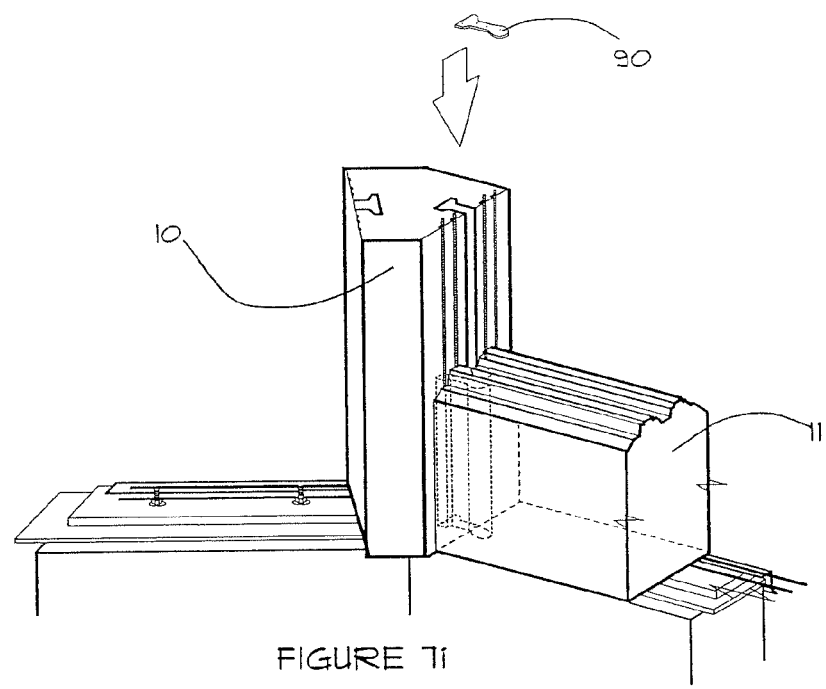

The spike 88 separates the key members 33 within the part cylindrical slot 17 but the inner edges of the flared shoulders 44 within the key slide 70 remain in contact with one another. As can be seen from a comparison between FIGS. 2 and 3, spreading of the key members 33 causes a rolling action about the curved surfaces of the throat 74 of the key slide 70 so as to provide essentially an outward force that is readily resisted by the material in the post 10, as opposed to a torque acting so as to break off the material at the body portion 22 of the undercut channel 20. At the same time, the sealant tape 84, 86 expands and is compressed against the enlarged head 40 and part cylindrical slot 17 as well as the neck 42 and undercut channel 20 to provide a continuous uniform seal within the undercut channel 20 and part cylindrical slot 17 respectively. The spreading of the key members 33 as shown in FIG. 3 causes the log 11 to be drawn tightly against the face of the post 10 causing the foam tape 19 in sealant slots 18 to be similarly compressed to faun a continuous seal. An asphalt impregnated foam pad 90 is then placed onto the top of the key 32 to ensure a proper seal between adjacent key 32 (FIG. 7i). However, the reduced spreading within the key slide 70 in combination with the low friction material of the key slide 70 facilitates sliding movement of the key 32 down the key slide 70.

Figure 7J:
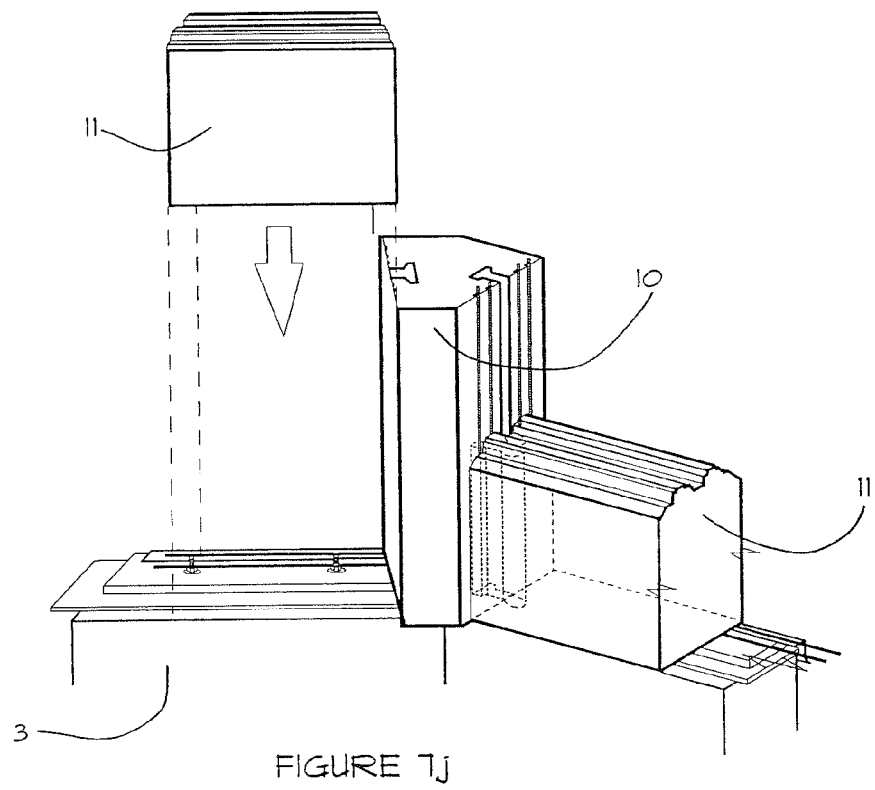
Figure 7K:
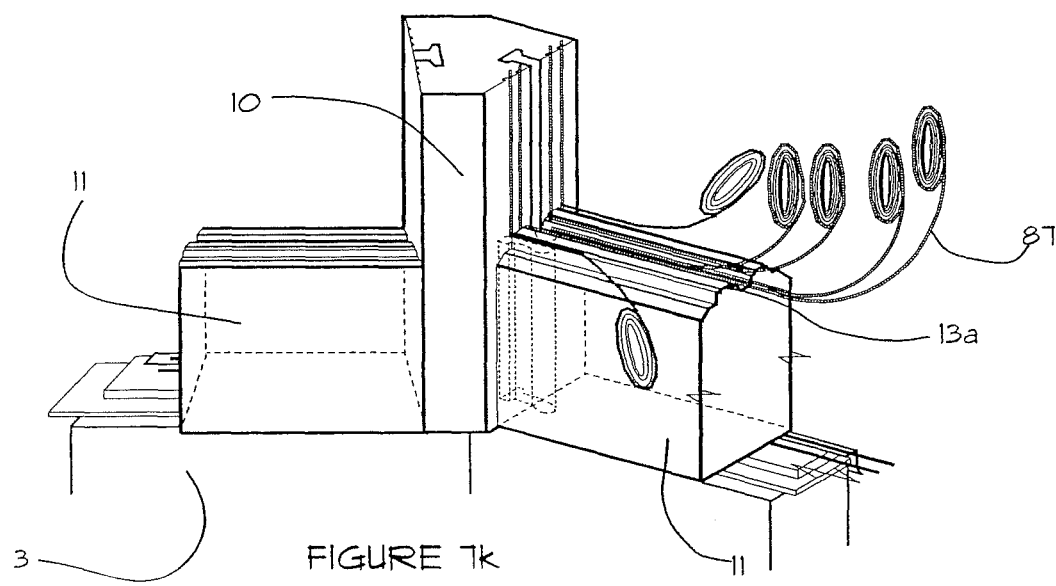

With the initial log in situ, a similar procedure is followed with the log on the opposite planar face 12 of the post 10 to provide the first row of logs 11 (FIG. 7j-7k). The upper surface 13a of the log 11 is then prepared by applying sealant strips 87 to the sealant grooves on the upper surface 13a of each log 11 and the next log 11 placed in position. The key 32 is then inserted as described above and the process continues up each side of the post 10 until the full height of the log wall 2 has been attained.

During assembly, the weight of each of the logs 11 is sufficient to induce sliding between the key 32 and the key slide 70 to accommodate downward vertical sliding movement of the logs 11 and compression of the sealant strips 87. Optionally, a thru-bolt may be inserted vertically through the log walls 2 and tensioned to force the logs 11 together. As the logs dry, the weight of the logs 11 and the tension in the thru bolt if used, is sufficient to force the key 32 to slide within the key slide 70 and maintain a sealed relationship with the adjacent log 11 and the post 10. The engagement of the embossments 60 with the part cylindrical slot 17 ensures the key 32 moves with the logs 11 and slides within the key slide 70.

Thus, the spline assembly 30 provides a relatively low friction slide member in the post 10 that permits key 32 to slide in a controlled manner within the key slide 70. The key 32 is secured to respective ones of the logs 11 by expansion of the key members 33 so as to move with the logs 11 relative to the post 10. In this manner, the integrity of the log walls 2 is maintained by inhibiting gaps from opening between the logs 11. As well as maintain a seal between planar face 12 and the end face 16.

The above embodiment is described in the context of securing a vertical post 10 to logs 11 to form a corner 6. A similar arrangement may be used where a pair of log walls intersect at a location other than where a post 10 is provided. Typically this would be where an interior log wall intersects an exterior log wall although it will be appreciated that the technique may be used to interconnect two exterior walls or two interior walls.

Figure 9:
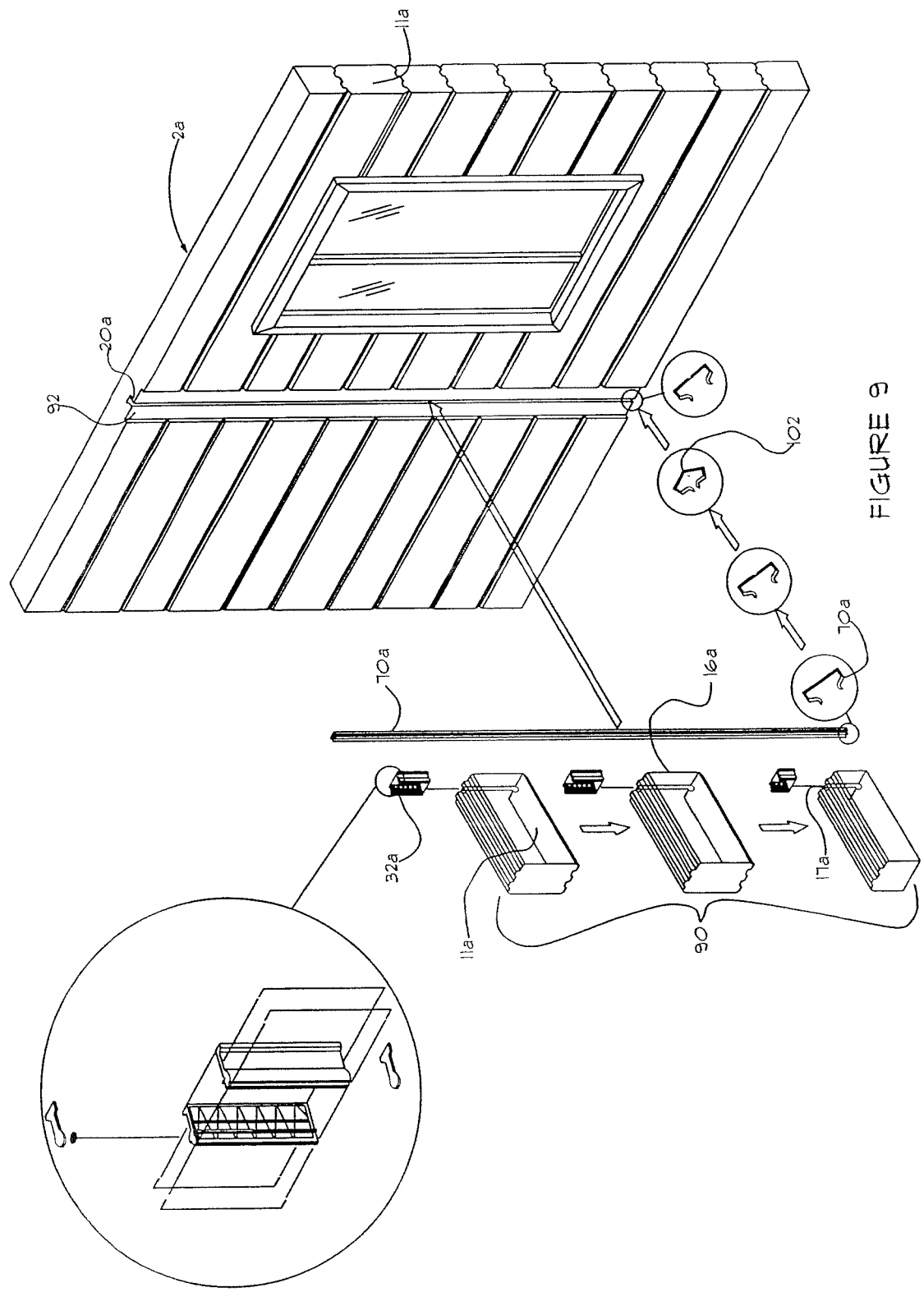
FIG. 9 is an exploded perspective view of an alternative embodiment of the building.
Figure 10:
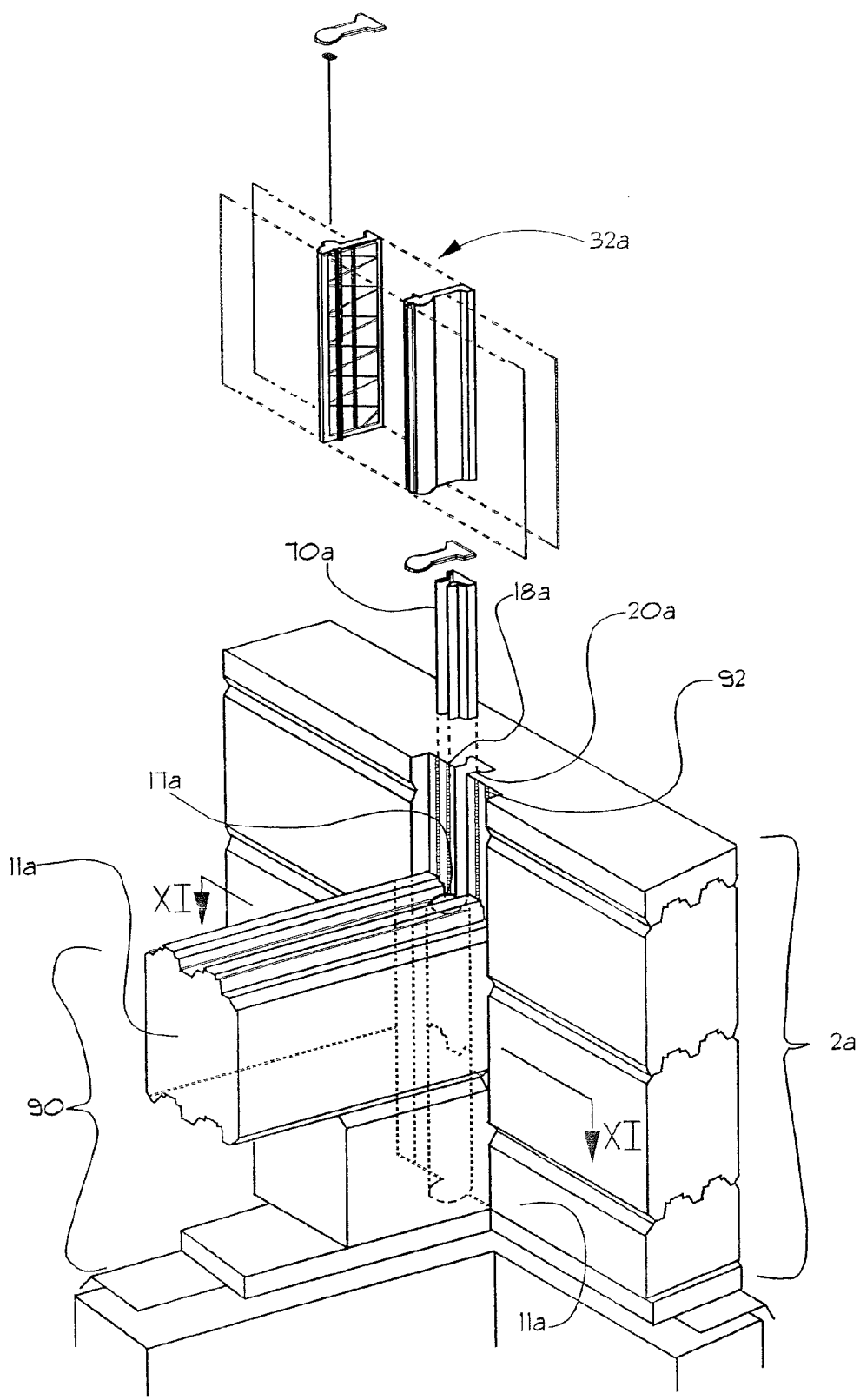
FIG. 10 is an enlarged view of the assembly shown in FIG. 9.
Figure 11:
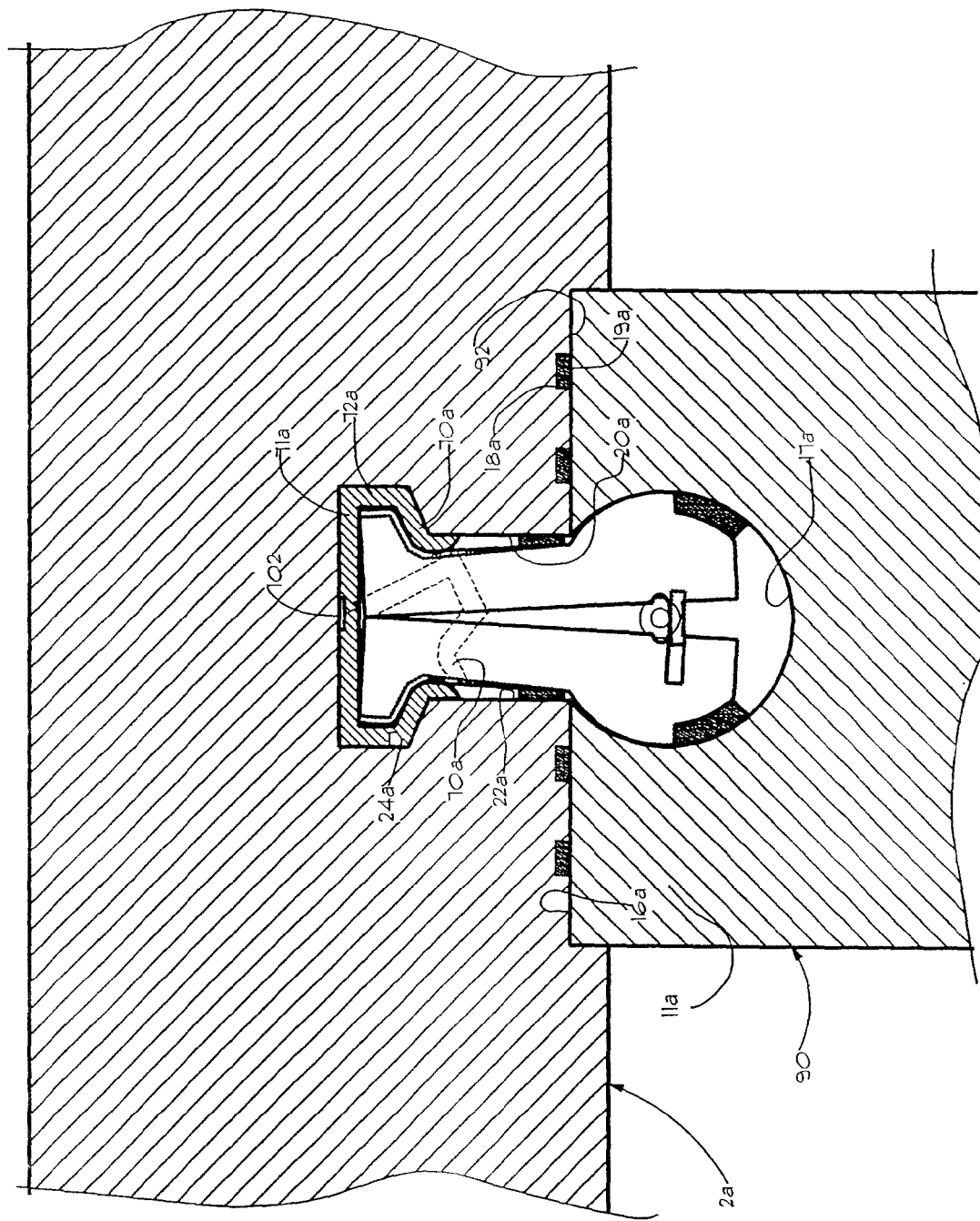
FIG. 11 is a view in the direction of arrow XI-XI of FIG. 10.

Referring therefore to FIGS. 9 through 11, in which like components are identified with like reference numerals to the embodiment of FIGS. 1 through 8 but with a suffix "a" added for clarity, an intersecting log wall 90 made from logs 11a is perpendicular to the length of the logs 11a of an exterior log wall 2a. A vertical recess 92 is formed in the exterior log wall 2a extending the full height of the intersecting log wall 90. Typically this will be the full height of the log wall 2a, but in some applications the intersecting wall 90 may terminate at less than the full height of the exterior wall 2a. The recess 92 has a minimum width corresponding to the width of the logs 11a of the intersecting wall 90 and has a depth sufficient to extend into the log 11a beyond any surface formations such as bevels formed on the edge of the logs 11a.

An undercut channel 20a is cut in the logs 11a at the base of the recess 92 and has a profile corresponding to that of the channel 20 formed in the post 10 described above with respect to FIGS. 1 through 8. Similarly, end faces 16a of the logs 11a of the interior wall 90 are formed with part cylindrical slots 17a that, when assembled, are aligned with the undercut channel 20a.

In the preferred embodiment, a key slide 70a is inserted into the enlarged socket 24a of the undercut channel 20a to receive a key 32a. The key slide 70a may be inserted from the top of the wall 2a if space permits. However, to facilitate assembly of the intersecting wall 90 after the exterior walls 2a are capped with a roof or second storey, the key slide 70a is modified to facilitate insertion into the enlarged socket 24a. As can be seen from FIGS. 9 and 11, base 71a has a central groove 102 that provides a living hinge at the midpoint of the base 71a. The groove 102 permits the base 71a to be folded at the hinge and thereby reduce the lateral extent of the key slide 70a so it may pass through the body portion 22a of the undercut channel 20a. Once inserted, the base 71a may be unfolded and force the wall 72a of the key slide 70a into the enlarged socket 24a.

With the key slide 70a inserted in the enlarged socket 24a of the undercut channel 20a, the intersecting wall 90 may be assembled by positioning the end faces 16a of the logs 11a against the base of the recess 92. The keys 32a may then be inserted to bridge the undercut channel 20a and part cylindrical slots 17a and expanded to lock the keys 32a in situ as described above. It will be understood that the foam tapes 19a may be placed in the sealant slots 18a in the recess 92 of the logs 11a and the keys 32a in a similar manner to that described above to ensure an air tight connection between the walls.

The recess 92 may be formed in individual logs 11a of wall 2a prior to assembly or may be routed after the exterior walls 2a have been assembled. This latter arrangement increases the flexibility of modifying the building after its initial assembly although the routing of the recess 92, the sealant slots 18a and the undercut channel 20a during manufacture of the logs 11a is to be preferred.

It will also be appreciated that where the intersecting wall 90 is intended as an interior wall, maintaining a seal between adjacent logs is not as critical as where it is an exterior wall. In this case, the key slide 70a may be omitted allowing for the direct connection between the wall 2a and the wall 90 using the keys 32a.

A further application of the connection between the post 10 and logs 11 forming a wall 2 is shown in the embodiment of FIGS. 12-17, in which like components will be identified with like reference numerals with a suffix "b" added for clarity.

Figure 12:
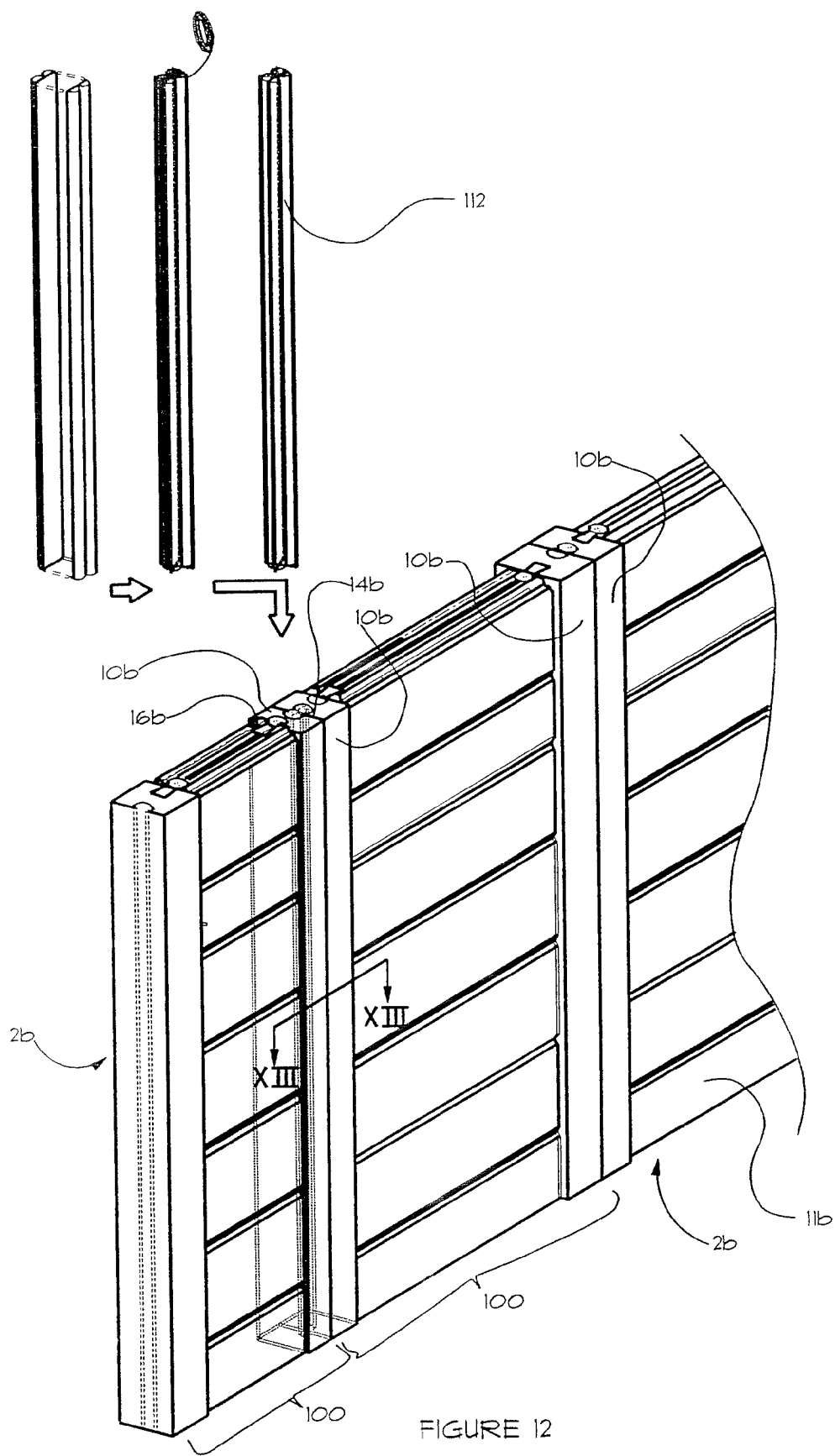
FIG. 12 is a exploded perspective view of a further embodiment of building structure.
Figure 22:
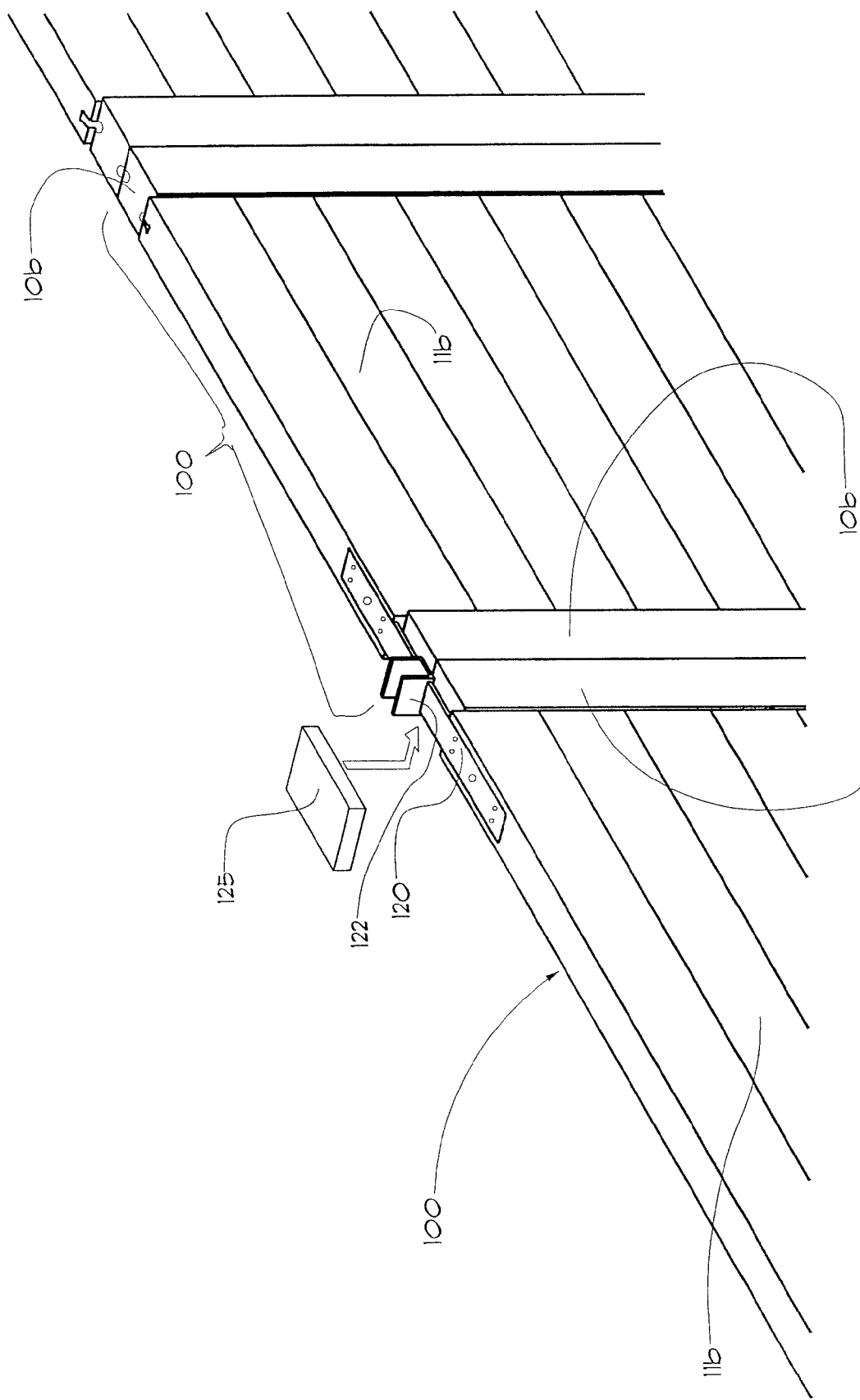
FIG. 22 is a view similar to FIG. 12 showing a further step in the assembly of a building.

In the embodiment of FIGS. 12-17, the connection is formed at an intermediate location 7 on the wall, as shown in FIG. 1. Referring therefore to FIG. 12, the wall 2b is formed by a pair of log wall sections 100 are each formed from logs 11b connected at each end to a post 10b using the key 32b as described above with respect to FIGS. 1-8. Each of the wall sections thus comprises a pair of posts 10b with logs 11b extending between them and secured thereto. The wall sections 100 may be connected end to end to one another when an extended wall 2b is required for the building 1. As can be seen in FIG. 22, each wall section 100 is assembled with the logs 11b extending slightly above the post 10b to allow for shrinkage as the logs 11b dry. Where thru bolts are used they may be installed during assembly of the section 100 to enhance the integrity of the wall section.

Figure 13:
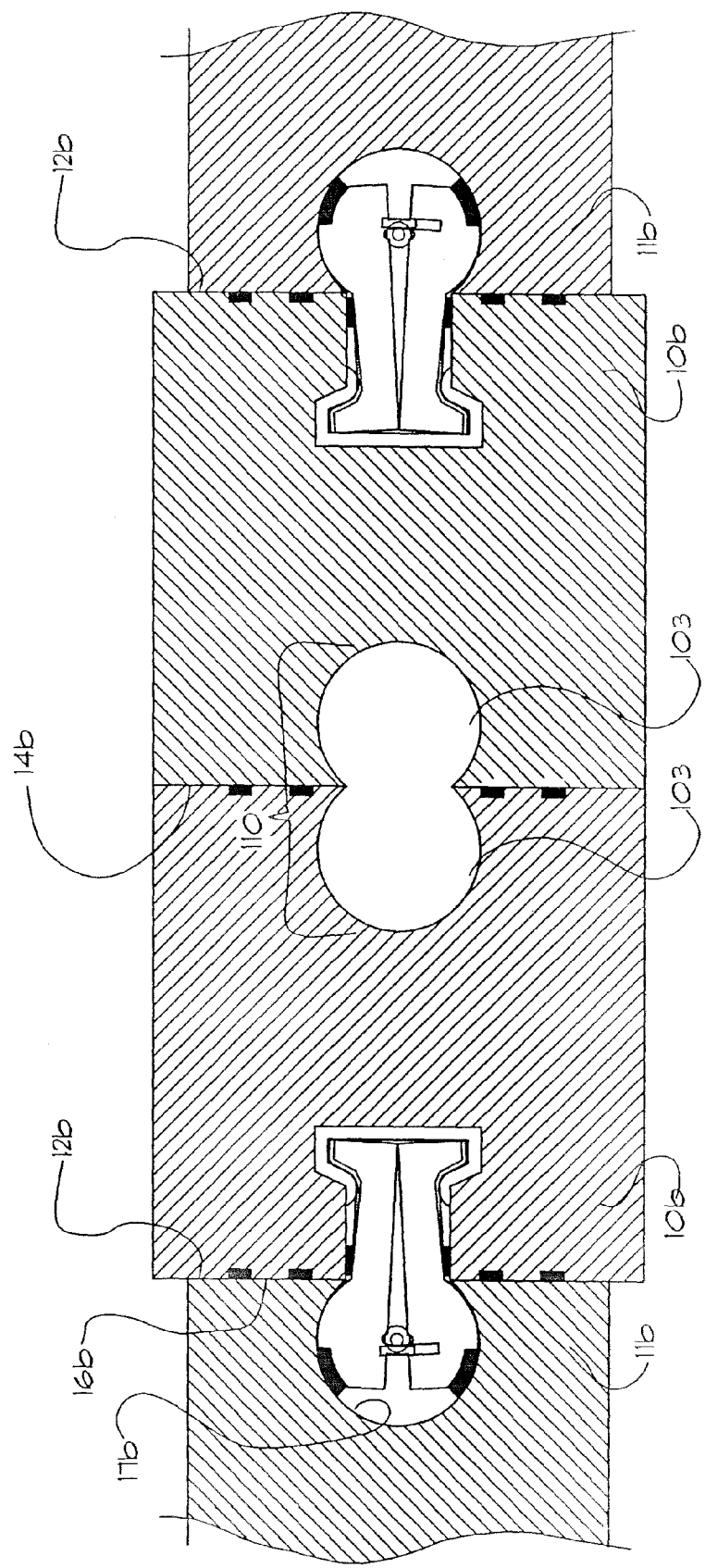
FIG. 13 is a plan view of FIG. 12 in the direction of arrow XIII-XIII.
Figure 14:
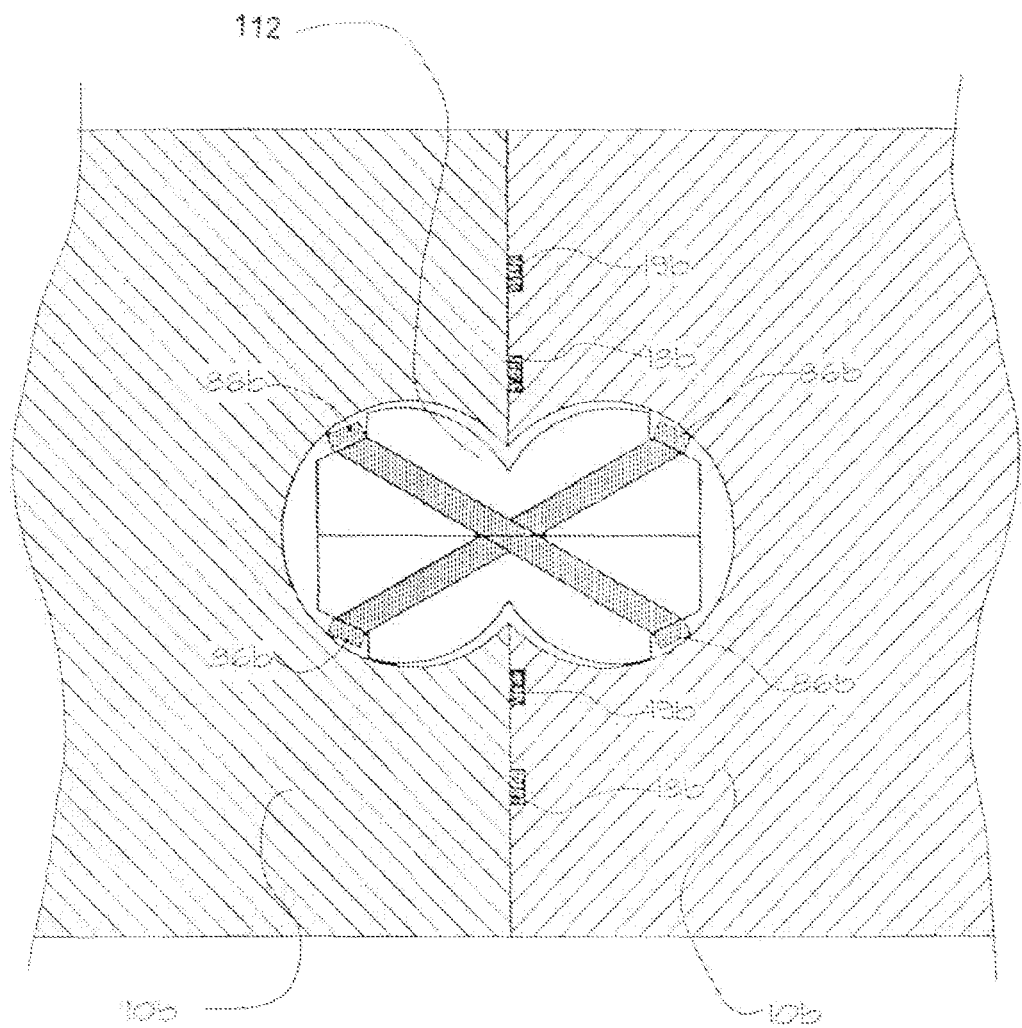
FIG. 14 is a plan view similar to FIG. 13 showing a further step in the assembly of the building.
Figure 15:
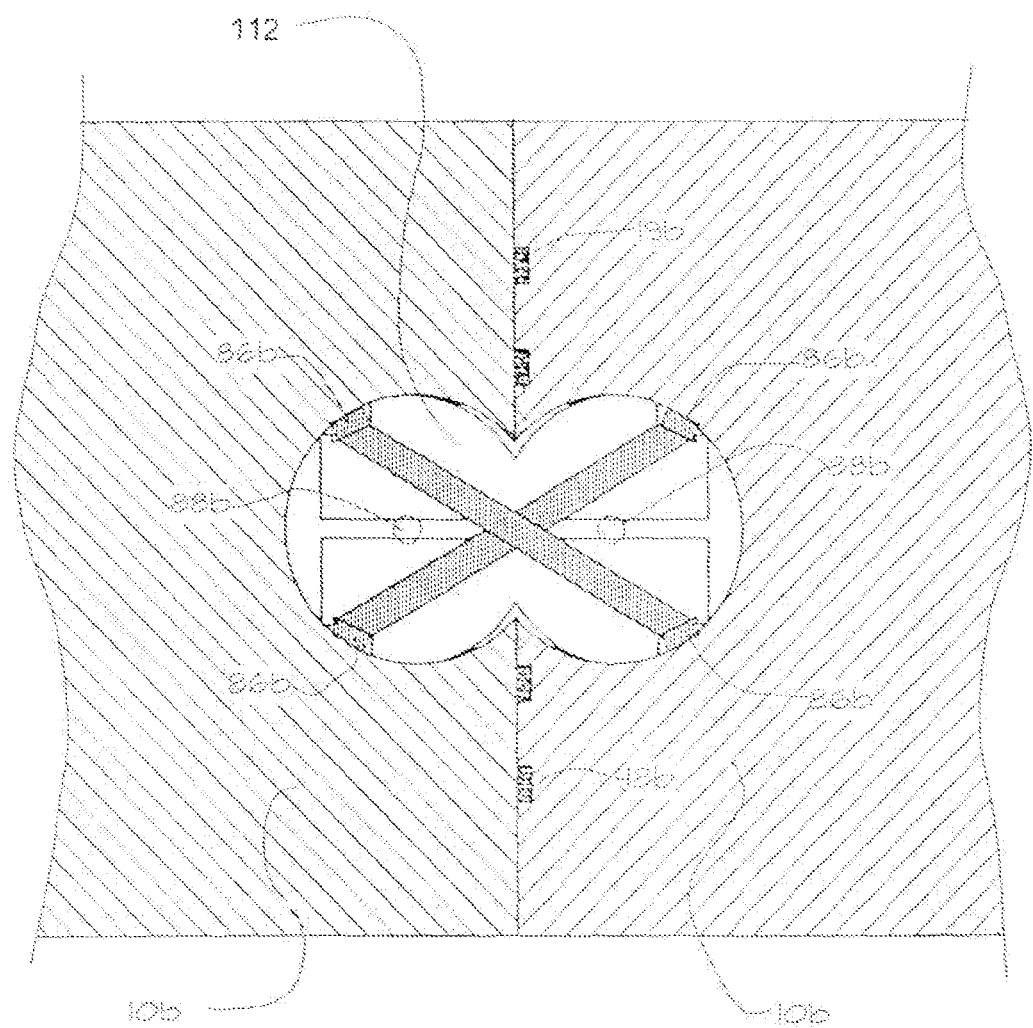
FIG. 15 is a view similar to FIG. 14 showing a yet further step in the assembly of the building.
Figure 16:
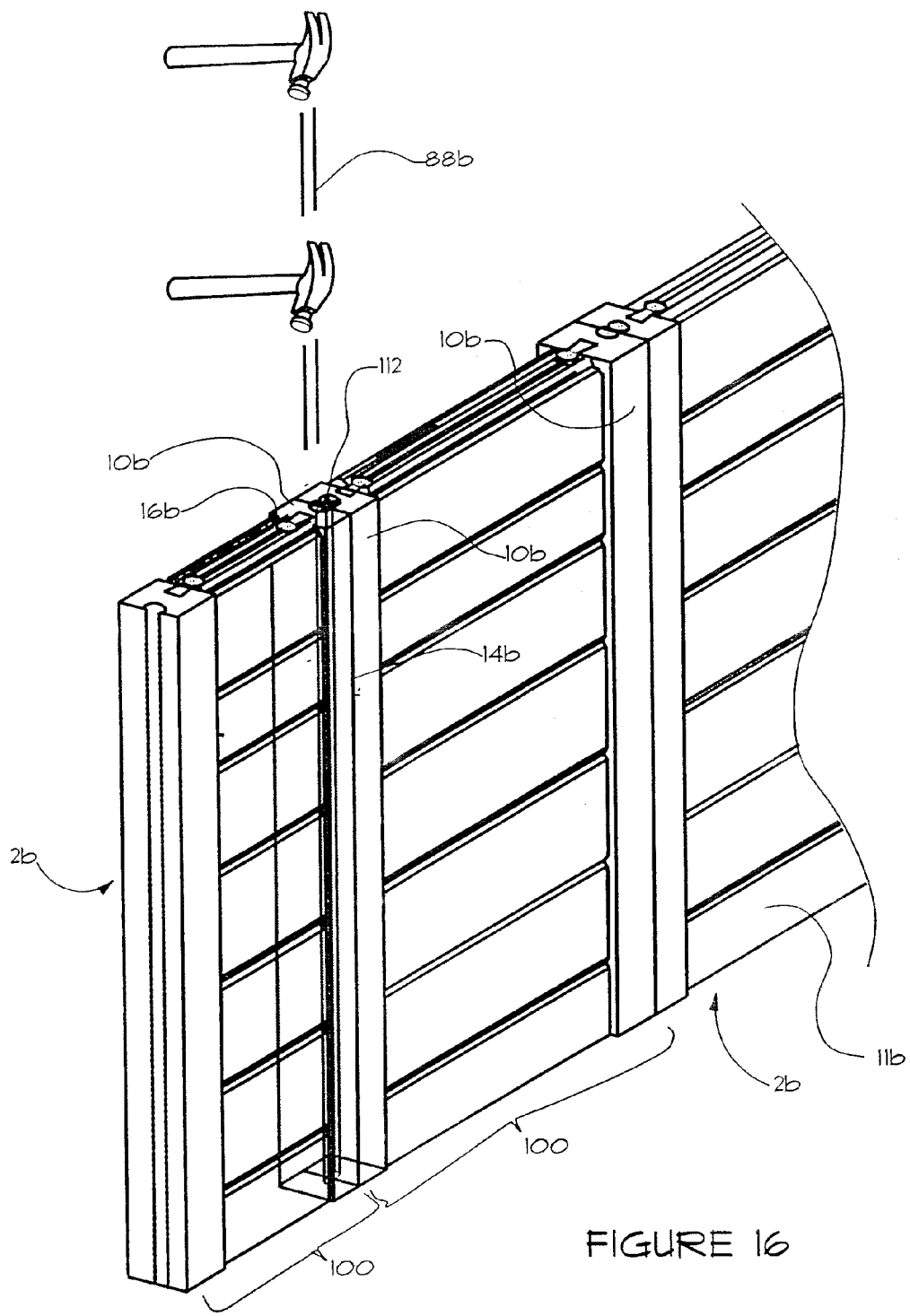
FIG. 16 is a view similar to FIG. 15 showing a still further step in the assembly of the building.

As shown in FIG. 13 each of the posts 10b has a planar face 12b that abuts the end face 16b of the logs 11b and an oppositely directed planar face 14b that is designed to abut a corresponding face 14b of a post 10b of an adjacent wall section 100. The planar face 14b of post 10b is formed with a part cylindrical slot 103 (similar to the part cylindrical slot 17b formed in the planar face 16b in log 11b) so that when the faces 14b abut, the part cylindrical slots 103 are aligned and define a waisted void 110 having a "figure of 8" cross section.

To secure the posts 10b to one another, an elongate "figure of 8" shaped key 112 is inserted into the void 110. The elongated key 112 can best be seen in FIGS. 17 and 18.

The elongated key 112 is formed from two identical key members 113 that extend the full length of the post 10b. Each of the key members 113 has a pair of enlarged heads 40b extending to either side of a waisted central portion 114 so that, in cross section, each of the key members 113 is similar to one half of the waisted void 110 fanned between the abutting part cylindrical slots 103 in the posts 10b.

Figure 17:
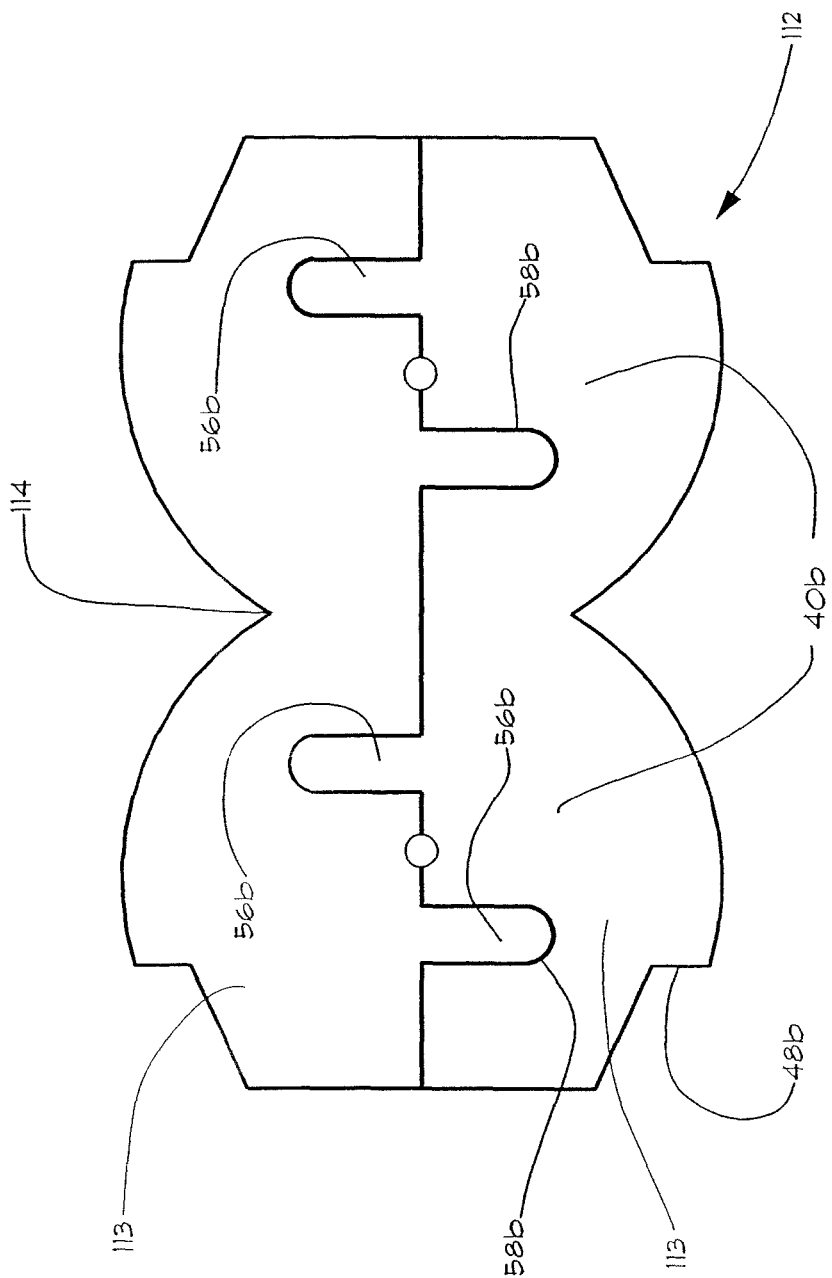
FIG. 17 is an enlarged plan view of a component used in the building of FIGS. 12 to 16.

A pair of flanges 56b project outwardly from the key members 113 and a pair of slots 58b having a depth slightly greater than that of the flange 56b are molded into each of the key members 113. As shown in FIG. 17, the key members 113 may be placed back to back with the flanges 56b of one of the key members engaging the slots 58b of the other of the key members. Each of the enlarged heads 40b is formed with a radial step 48b. The key members 113 are preferably extruded from a plastics material and so have a uniform cross section. Alternatively, the key members may be formed from wood or plywood without flanges.

Figure 18:
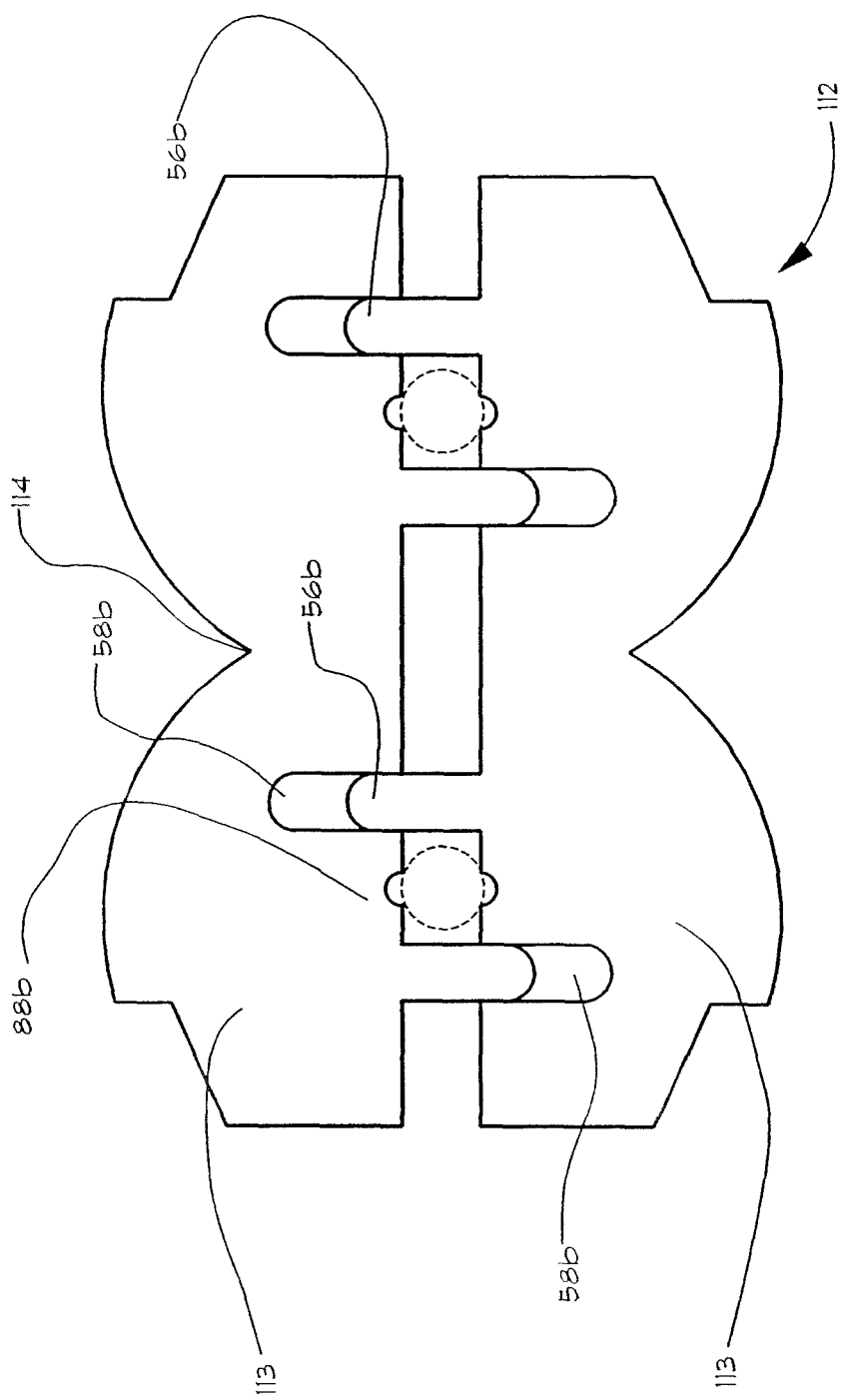
FIG. 18 is a view similar to FIG. 17 showing the component of FIG. 17 in an expanded position.

To assemble the wall 2b from wall sections 100, the sections 100 are placed end to end, as shown in FIG. 12, with the faces 14b of posts 10b in alignment. Sealant tape 19b is applied in the sealant slots 18b on the face of one of the posts 10b to form an effective seal as the faces 14b are drawn together. The key members 113 are prepared, by applying the sealant tape 86 to the enlarged head 40b above the radial step 48b and the key 112 is inserted between the posts 10b with the sealant tape in a compressed state. Once inserted, spikes 88b are inserted between the key members 113 and driven downward as shown on FIG. 16 to separate the key members 113 and thereby spread key 112 as shown in FIG. 18. Whilst it is theoretically possible to insert two elongated single spikes 88b along the entire length of the key 112, in practice, it is easier to insert a series of spikes 88b end to end. To facilitate the insertion of such spikes 88b, each of the spikes 88b is formed without a head and with a countersink to receive the pointed end of a subsequent spike 88b. Therefore, the spikes 88b may be inserted progressively between key members 113, to spread the key 112 over the entire length of the post. The outer surface of the spikes 88b may be coated with a lubricant, such as a "wax" if required, to facilitate insertion over the entire length of the key 112. The key members 113 may be extruded from a relatively low friction material. The spreading of the key 112 causes the posts 10b to be drawn toward one another and abut along the opposed faces 14b.

It will be appreciated that it is not necessary to form the key members 113 as a single component and shorter lengths of key member 113 may be stacked in the void 110 without jeopardizing the integrity of the connection between the posts 10b. However, the insertion of multiple spikes 88b suggests that a continuous key members 113 is to be preferred.

With the wall sections 100 aligned and connected to one another, as shown in FIG. 22, the rigidity of the exterior wall 2b is increased by placement of straps 120 across the posts 10b. The steel straps 120 extend along the upper surface of the logs 11b and are secured by nails or screws to the logs 11b to inhibit a hinging action about a vertical axis at the posts 10b. Clearance is provided between the strap 120 and the upper end of the posts 10b, to facilitate log wall shrinkage and settlement. A foam pad 125 is placed between the strap and the post 10b to inhibit air movement over the top of the post.

The strap 120 may also provide a support for additional structural members, such as a joist or rafter. A yoke 122 attached to strap 120 may be dimensioned to receive standard section lumber and provides a nailing point to secure the structural member. The yoke 122 is maintained in alignment with the upper surface of the logs 11*b* as they shrink by virtue of the strap 120.

Figure 19:
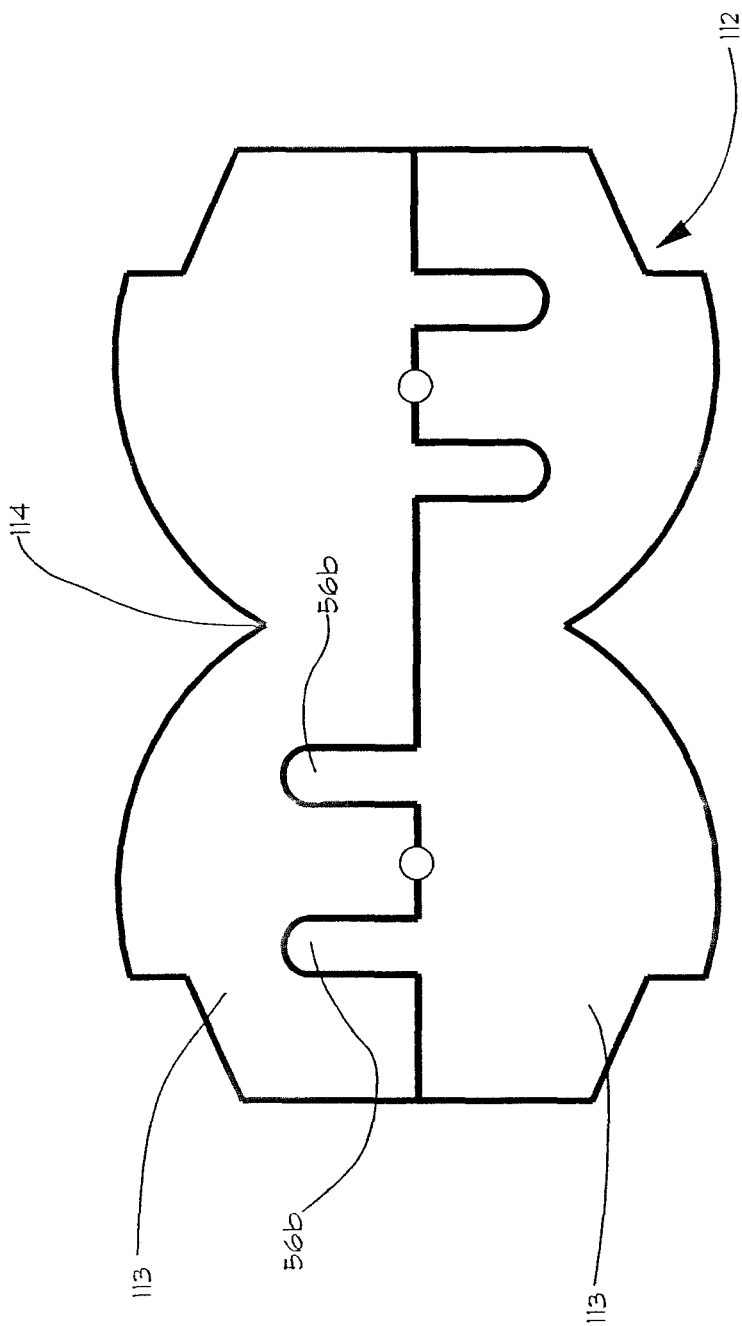
FIG. 19 is a view similar to FIG. 17 of an alternative embodiment of the component.
Figure 20:
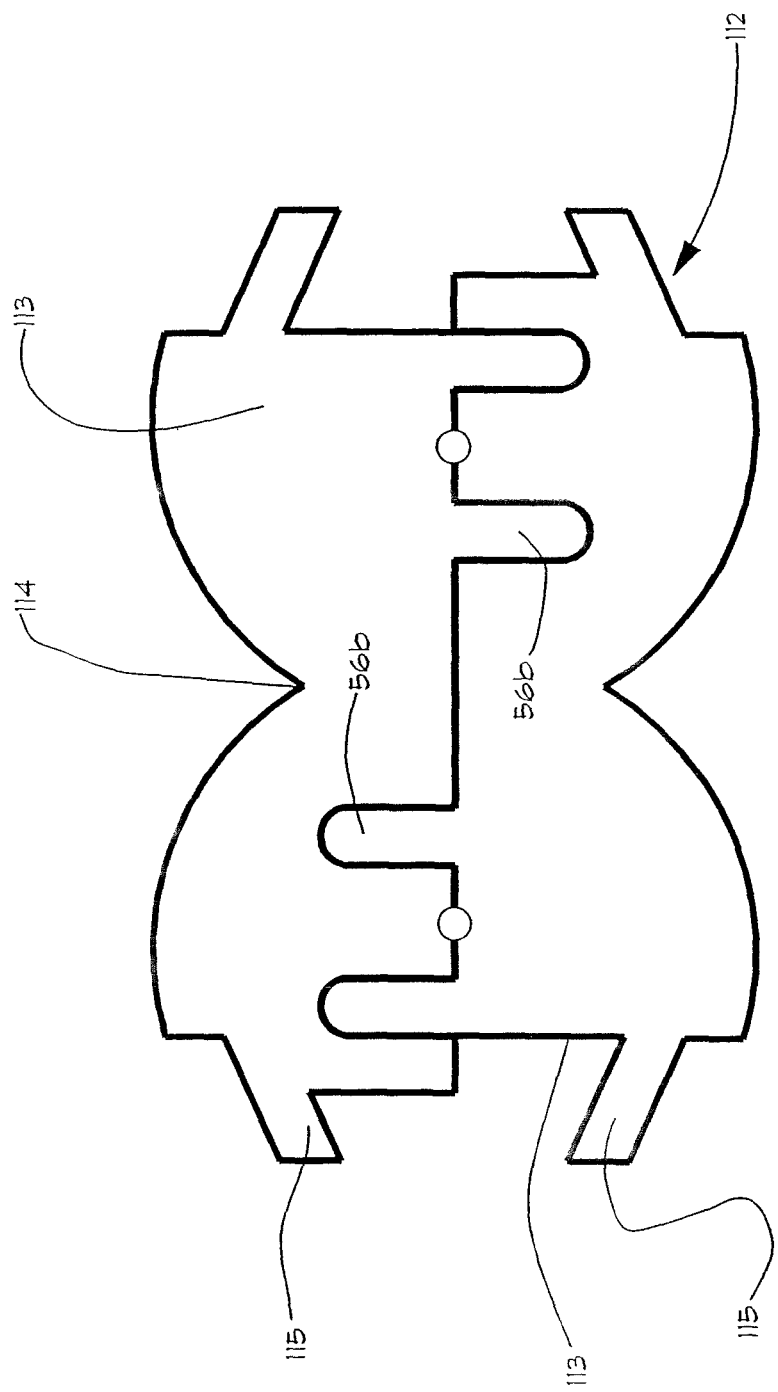
FIG. 20 is a view similar to FIG. 17 of a further embodiment of the component shown in FIG. 17.
Figure 21:
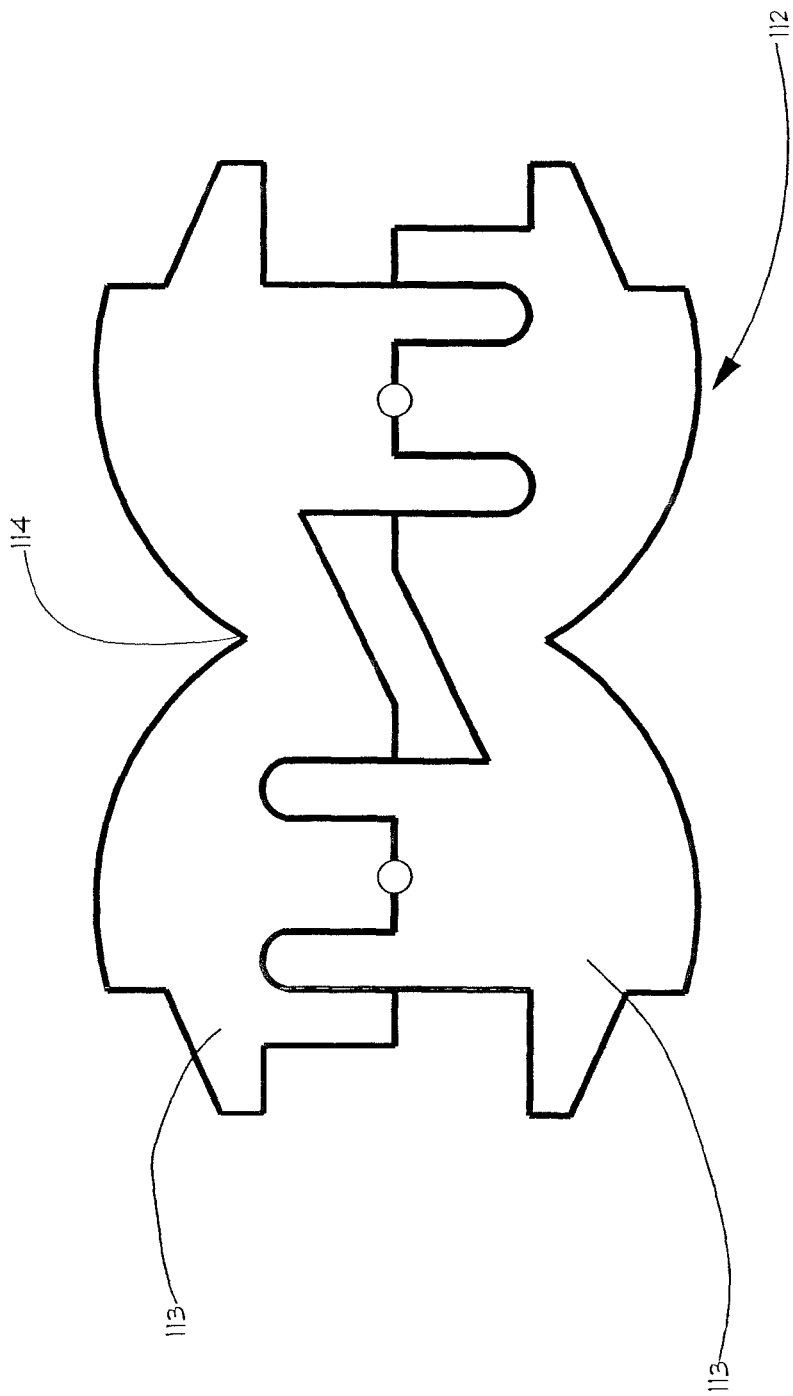
FIG. 21 is a still further alternative embodiment of the component shown in FIG. 17.

Alternative embodiments of the key 112 are shown in FIGS. 19, 20 and 21. In the embodiment of FIG. 19, each of the key members 113 has a pair of flanges 56*b* to one side of the waisted central portion 114 and a pair of grooves 58*b* to the other side. This still permits the key members 113 to be placed back to back and to constrain the spikes 88*b*.

In the embodiment of FIG. 20, the end face of the body is offset with projecting flanges 115 that serve to define an air cavity between the post 10*b* and the key member 113. This enhances the insulative properties to reduce heat transfer across the posts 10*b*.

Similarly, in the embodiment of FIG. 21, the key members 113 are formed to provide a void between them when assembled to provide a further air cavity in the key 112.

In some buildings, it is necessary to integrate conventional frame construction with log construction. The connection system described above can be adapted for these circumstances, as illustrated in FIGS. 23 to 26.

Figure 23:
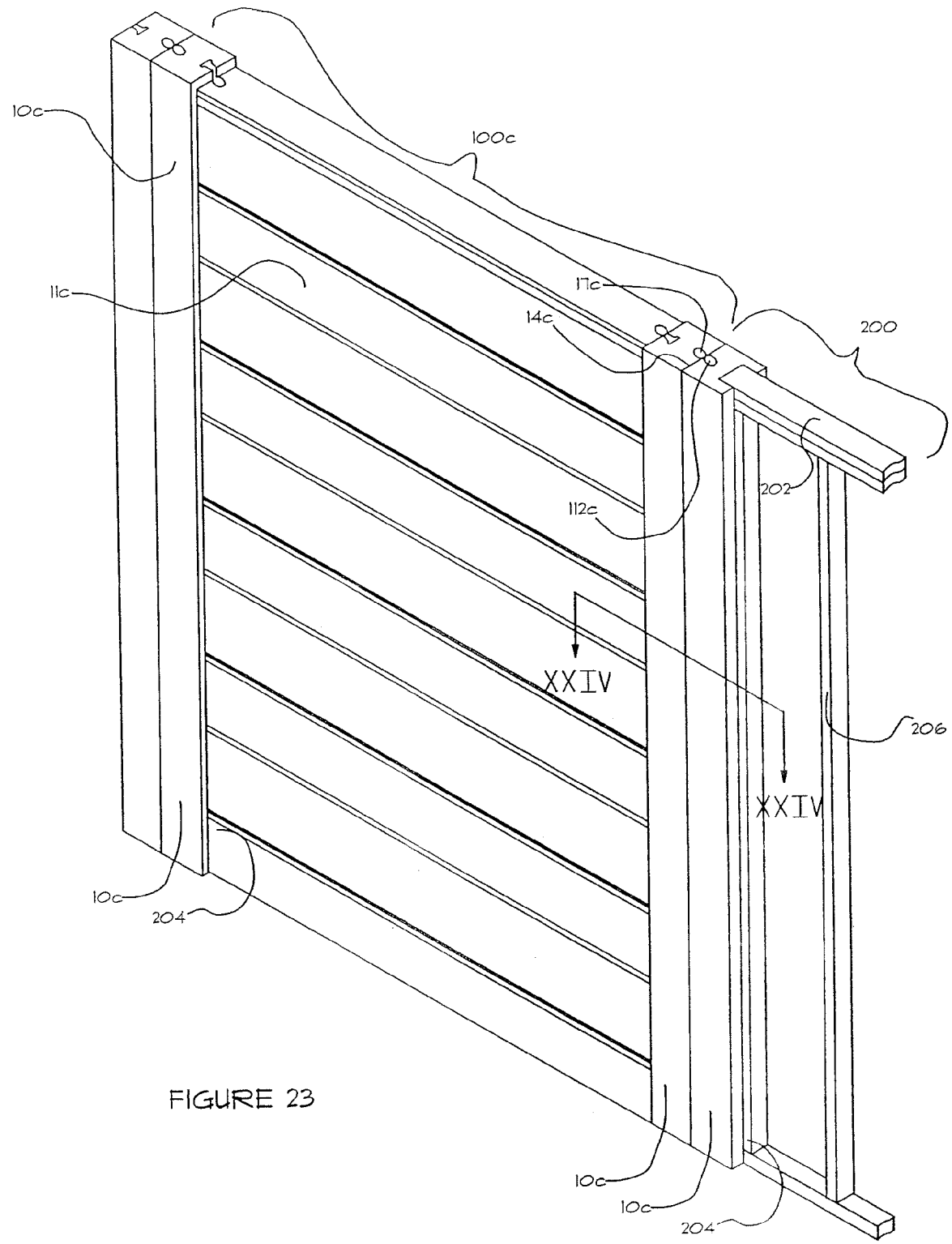
FIG. 23 is a perspective view of a further embodiment of a building.
Figure 24:
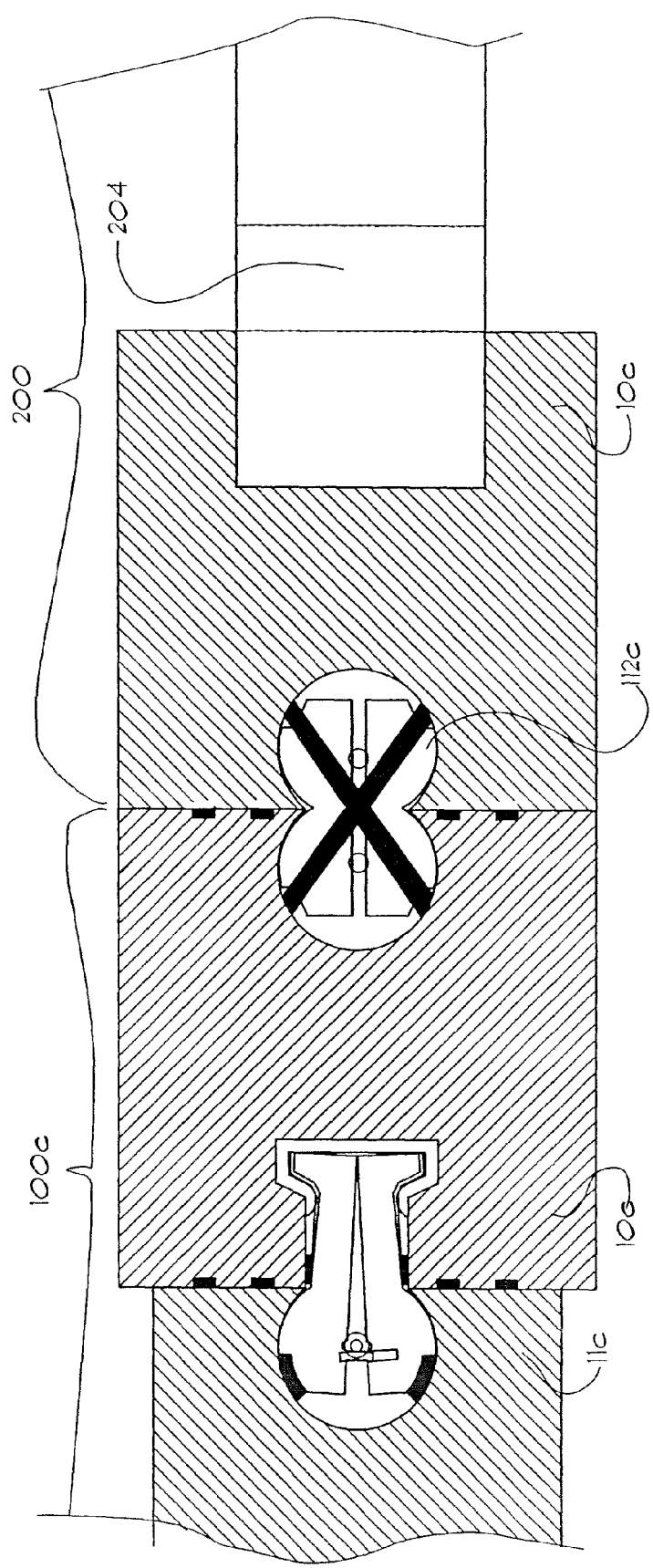
FIG. 24 is a view on the line XXIV-XXIV of FIG. 23.

Referring firstly to the embodiment of FIGS. 23 and 24, in which like reference numerals will denote like components with a suffix 'c' added for clarity, a wall section 100*c*, formed by posts 10*c* and logs 11*c*, is connected to a framed wall section 200 of conventional construction and having a top plate 202 and studs 204, 206 and a post 10*a*. It will of course be appreciated that the framed wall section 200 includes the additional components normally associated with frame construction, such as a bottom plate, lintels and the like.

The end stud 204 is nailed to a post 10*c*, that has a part cylindrical slot 17*c* along the face 14*c*. The posts 10*c* of the wall section 100*c* and framed wall section 200 are aligned with the respective faces 14*c* in abutment and a key 112*c* inserted to connect the wall section 100*c* to wall section 200.

Figure 25:
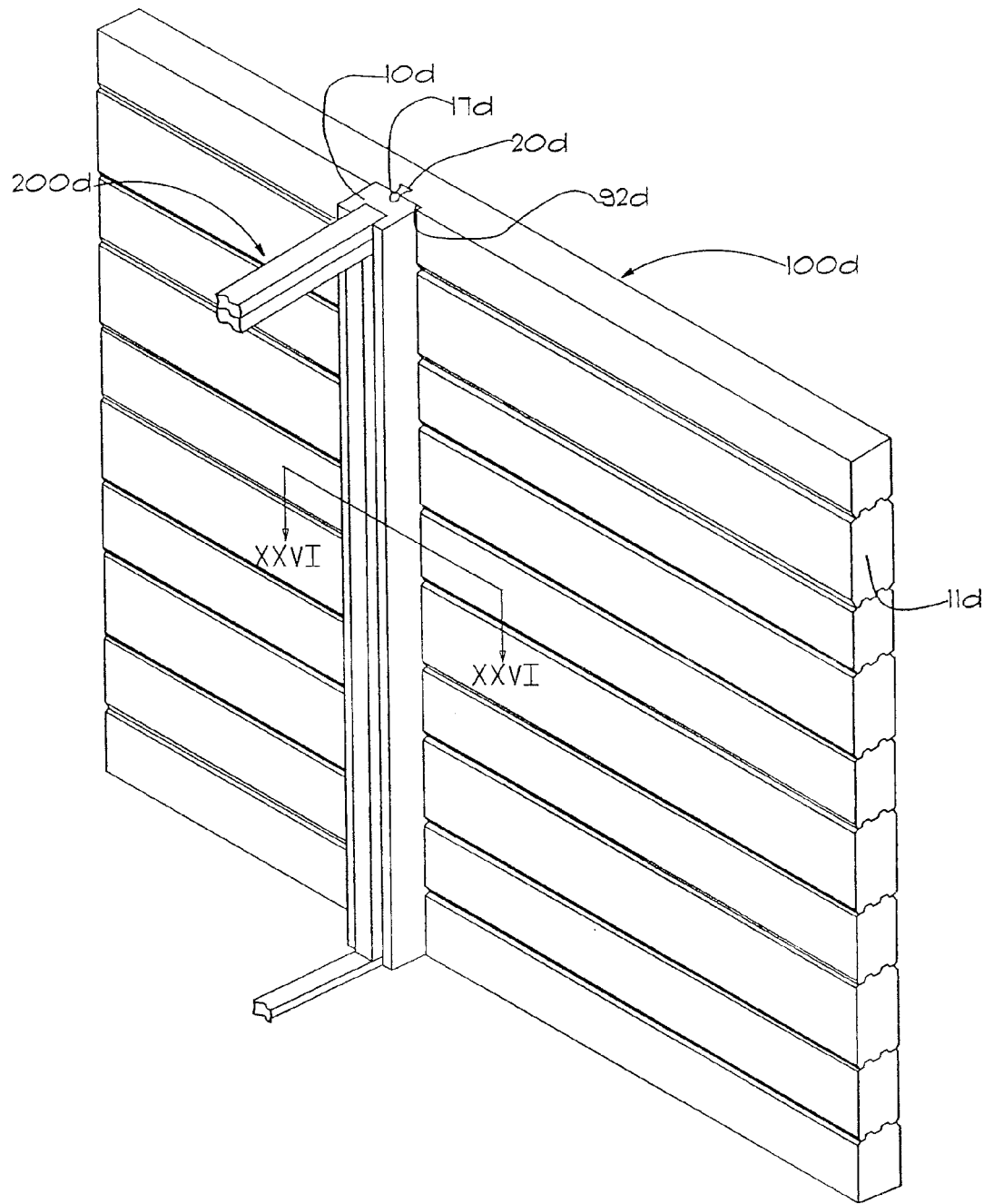
FIG. 25 is a perspective view of a yet further embodiment of building.
Figure 26:
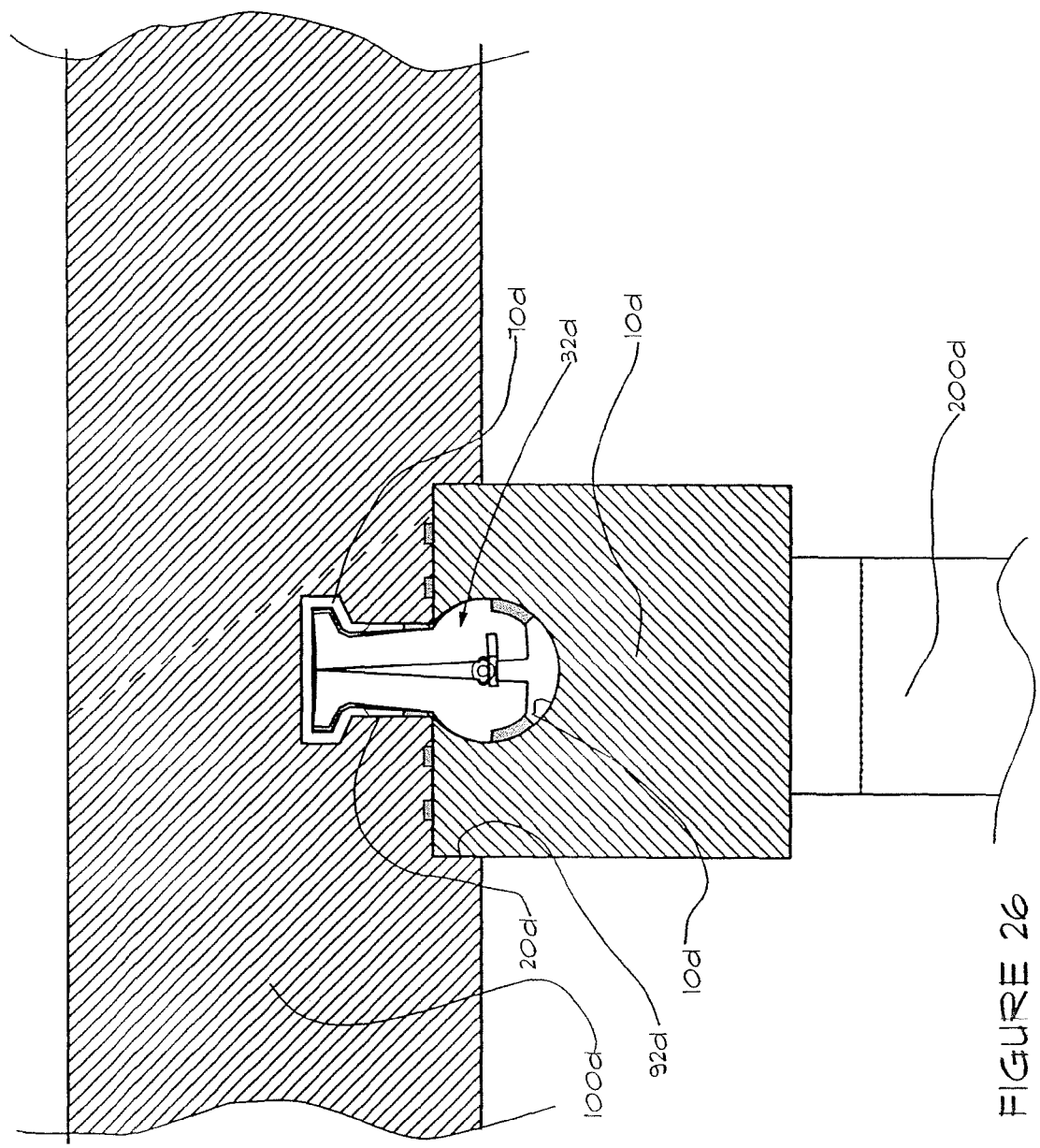
FIG. 26 is a view on the line XXVI-XXVI of FIG. 25.

In the embodiment of FIGS. 25 and 26, an elongated keyspline 32*d* and keyslide 70*d* is used to connect a framed wall section 200*d* to a post 10*d*. The wall section 100*d* has a recess 92*d* corresponding in width to the width of the post 10*d*. An undercut channel 20*d* is formed in each of the base of recess 92*d* and a part cylindrical slot 17*d* formed in the post 10*d*. A key 32*d* is inserted and spread to secure the wall sections 100*d*, 200*d*, to one another.

If required, a post 10 may be secured to the wall section 100 as shown in FIGS. 25 and 26 to stiffen the wall along its length. In this case, a stud wall 200 would not be utilised so as to minimise the protrusion in to the room.

It will be seen from the above that embodiments are provided to form a corner between a post and two walls, to connect walls that intersect between posts and to connect walls end to end.

Figure 27:
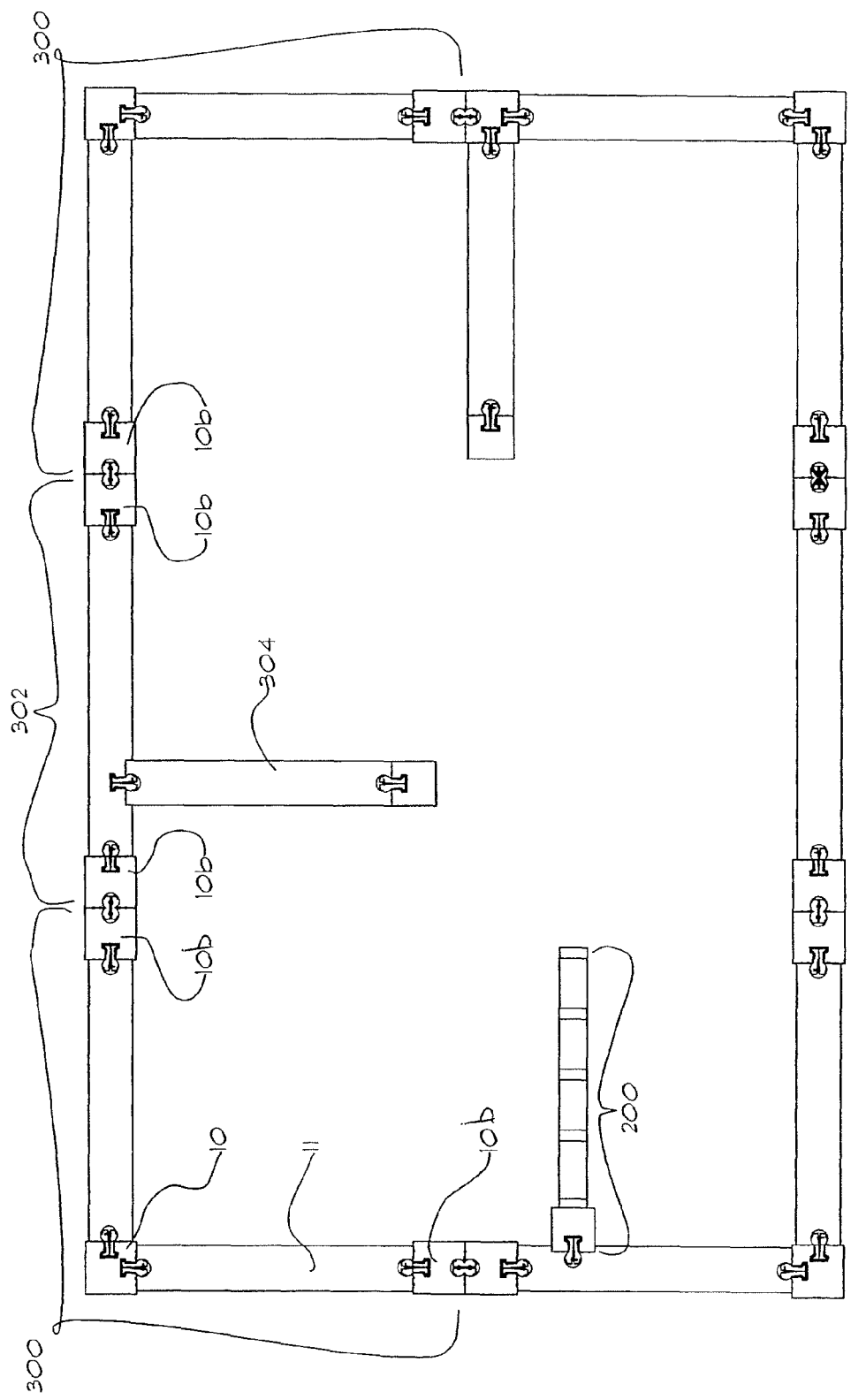
FIG. 27 is a schematic plan view of a building assembled from the embodiments shown in the proceeding figures.

The arrangement of connections between the post and logs may be integrated into a single building as illustrated schematically in FIG. 27 to permit a panelised construction technique to be used. In this arrangement, a corner unit indicated at 300 consists of a post 10 with logs 11 connected to its oppositely directed faces 12, 14. The logs 11 extend to and are secured at opposite ends to a face of the posts 10*b* that is directed toward the post 10 in the manner shown in FIGS. 1-4 so that the unit 300 defines a panelised corner unit. The intermediate wall indicated at 302 is formed by a wall section 100 constructed as shown in FIGS. 12 to 16 and has a pair of posts 10*b* with a logs 11*b* extending between opposed faces.

The post 10*b* of the wall section 100 is joined to the post 10*b* of the corner unit 300 using the formations in the form of recesses 17 and keys 112 to form an integral exterior wall 2. A further corner unit 300 is connected at the opposite end of the wall section 100. The exterior periphery of the building shown in FIG. 27 may thus be built from four corner units 300 and a pair of wall sections 100, which may be either log or frame construction.

An interior wall 304 may be joined to the exterior wall section 100 using the connection as shown in FIGS. 9 through 11. A further connection in the exterior wall is made at the post 10 connecting the two corner units 300 using a connection similar to that shown in either FIGS. 9 through 12 or FIGS. 13 through 18.

It will be seen that the arrangement of self contained wall units permits a panelised building to be assembled from previously constructed wall units each of which utilizes formations in the posts and a key to connect logs to posts or post to post or log walls to log walls or framed walls to log wall. In each case, provision is made for proper sealing between the keys and the logs to maintain the integrity of the walls and where key slides are used, relative movement between the logs is facilitated.

A further embodiment particularly suitable for providing a panelized construction technique is shown in FIGS. 28 through 40, although it will be appreciated that the components illustrated in these figures may be utilized in the construction of a non-panelized building as illustrated for example, in FIG. 7.

Figure 28:
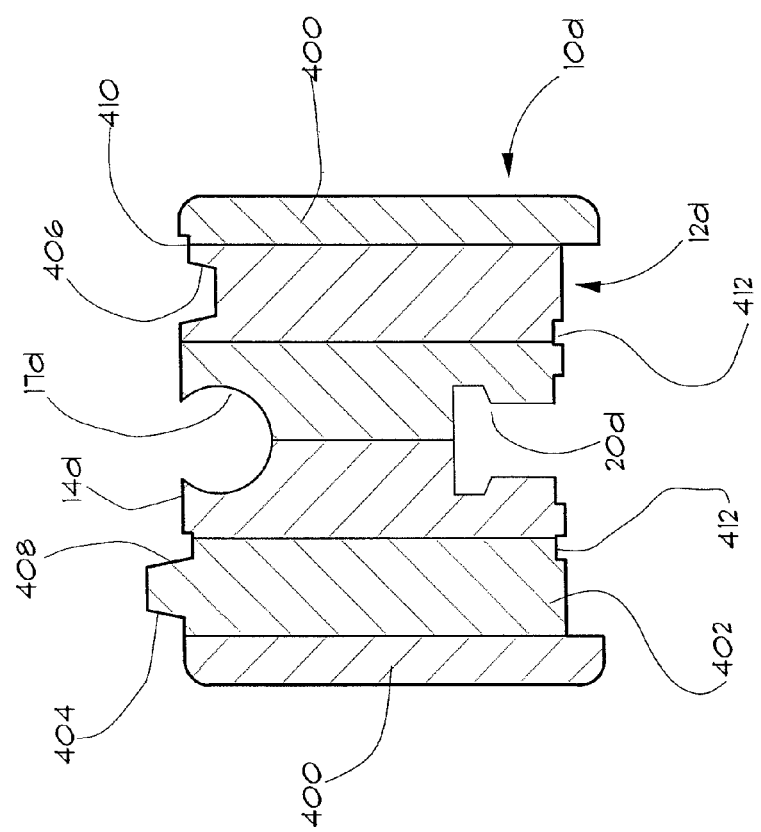
FIG. 28 is a section through an alternative embodiment of post used in the building structures in the proceeding figures.

Referring to FIG. 28, the post 10*d* is formed from laminations of different lumber for stability and economy of manufacturer. As shown in FIG. 28 outer laminations 400 are machined from a premium quality wood, such as a white pine or cedar, and the balance of the laminations 402 are machined from a lower premium wood, such as construction grade spruce/pine/fur. The faces 12*d*, 14*d* extend between the laminations 400 and have formations machined in them to provide the re-entrant part cylindrical recess 17*d* in the face 14*d* and the undercut channel 20*d* in the face 12*d*. The face 14*d* is also machined to have an upstanding tongue 404 to one side of the recess 17*d* and a complimentary groove 406 to the opposite side. Sealant grooves 408, 410 are provided adjacent the tongue 404 and groove 406 respectively. The sealant grooves 412 are also provided on the face 12*d* to either side of the channel 20.

Figure 29:
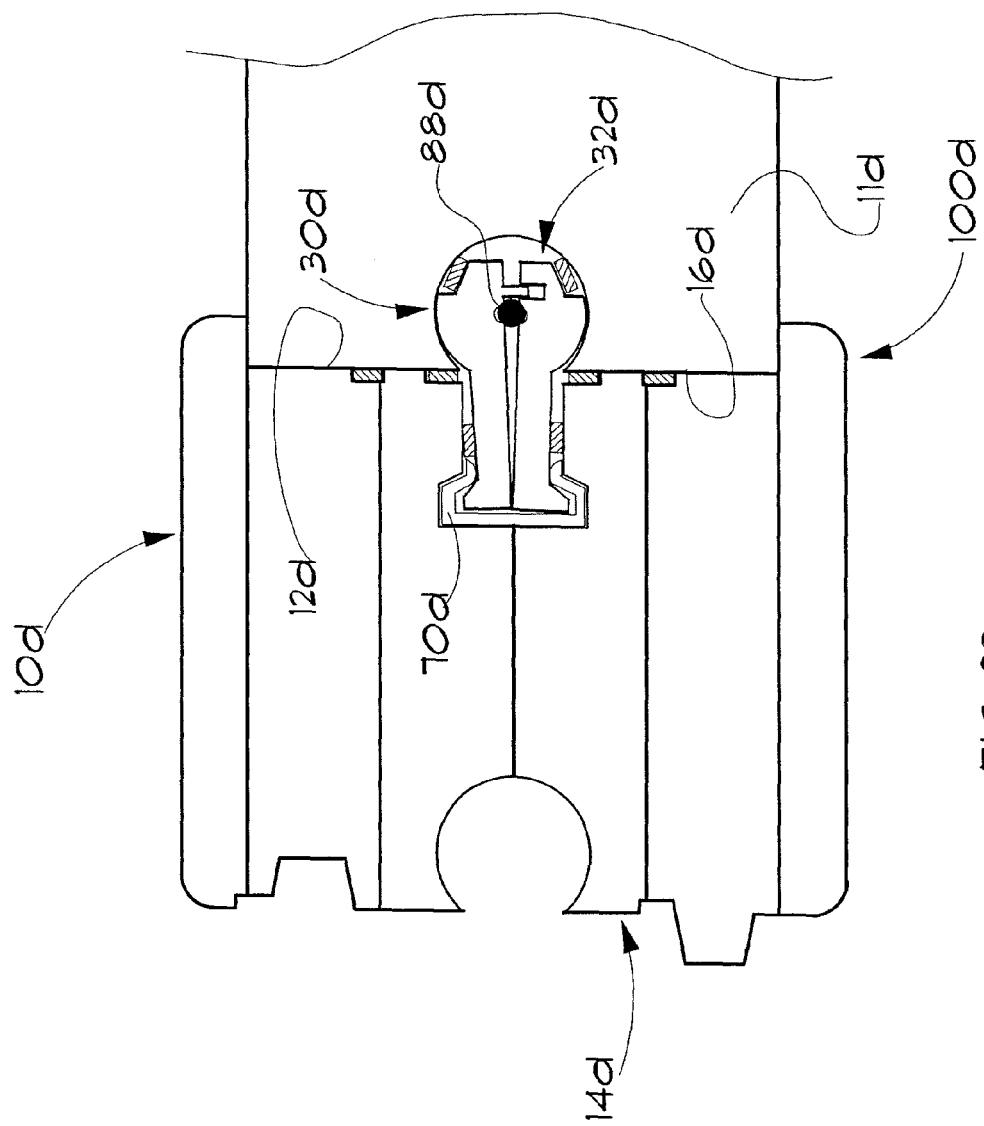
FIG. 29 is a plan view of the post of FIG. 28 assembled into a wall structure.

The post 10*d* is secured to logs 11*d* by a spline assembly 30*d* as shown in FIG. 29. A key slide 70*d* is inserted into the channel 20*d* and the key 32 inserted after placement of the end face 16*d* of each of the logs 11*d* against the face 12*d*. The key 32*d* is expanded by means of the spike 88*d* as described above to secure the logs 11*d* to the post 10*d*. A post 10*d* may be connected at opposite ends of the log 11*d* such that the logs 11*d* and posts 10*d* form a self contained wall unit 100*d*.

To facilitate transportation of the units 100, the lower most log 11*d* is secured to the posts 10*d* by screws driven through the post and into the log. This inhibits the relative movement between the lowermost post and log while still permitting such movement with the balance of the logs.

Where tie bolts are used, as described above, they are inserted and provide convenient locations to permit hoisting of the wall units during transportation and assembly.

Figure 30:
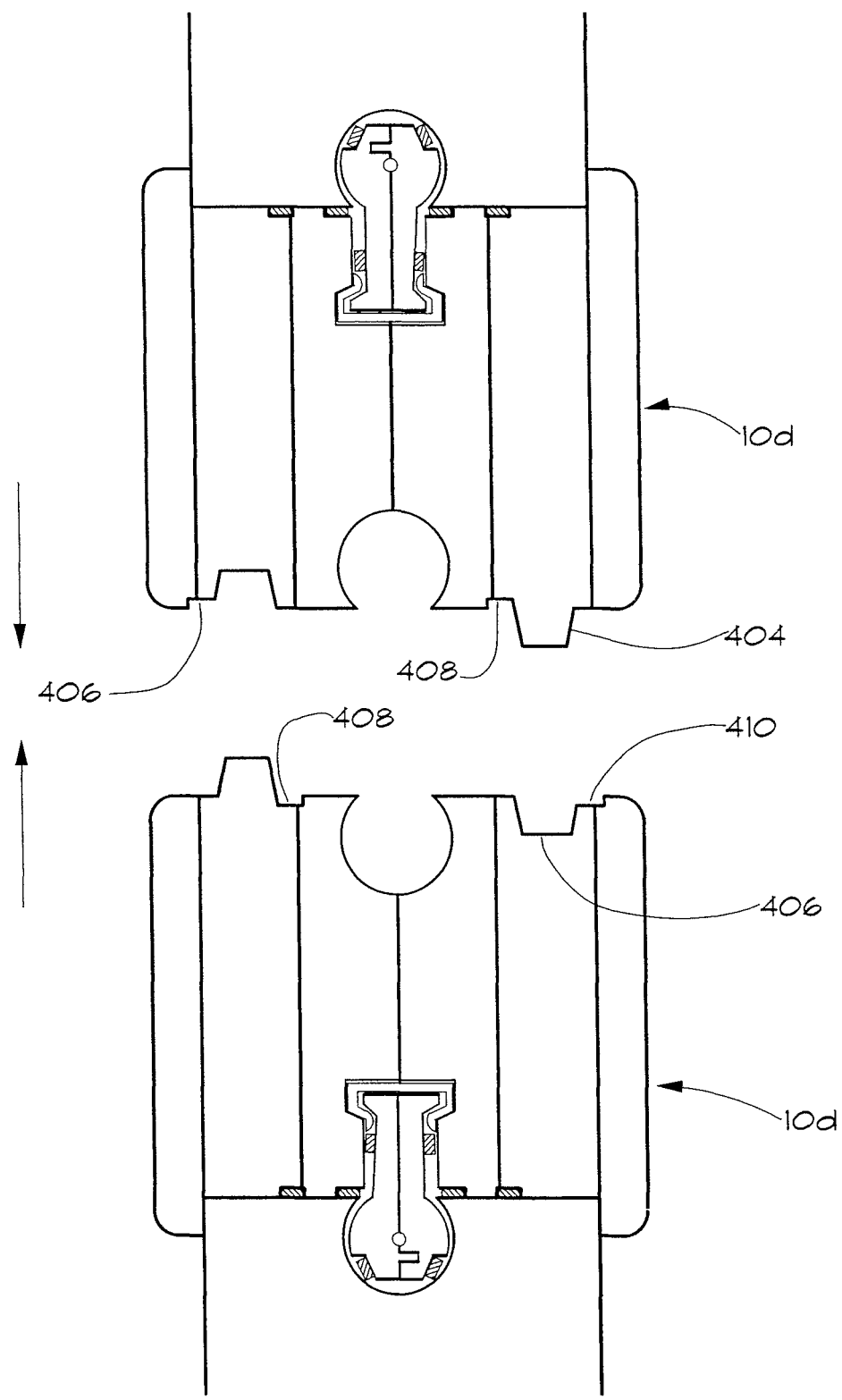
FIG. 30 is a plan view of a pair of wall structures utilizing the post of FIG. 28 being connected.
Figure 31:
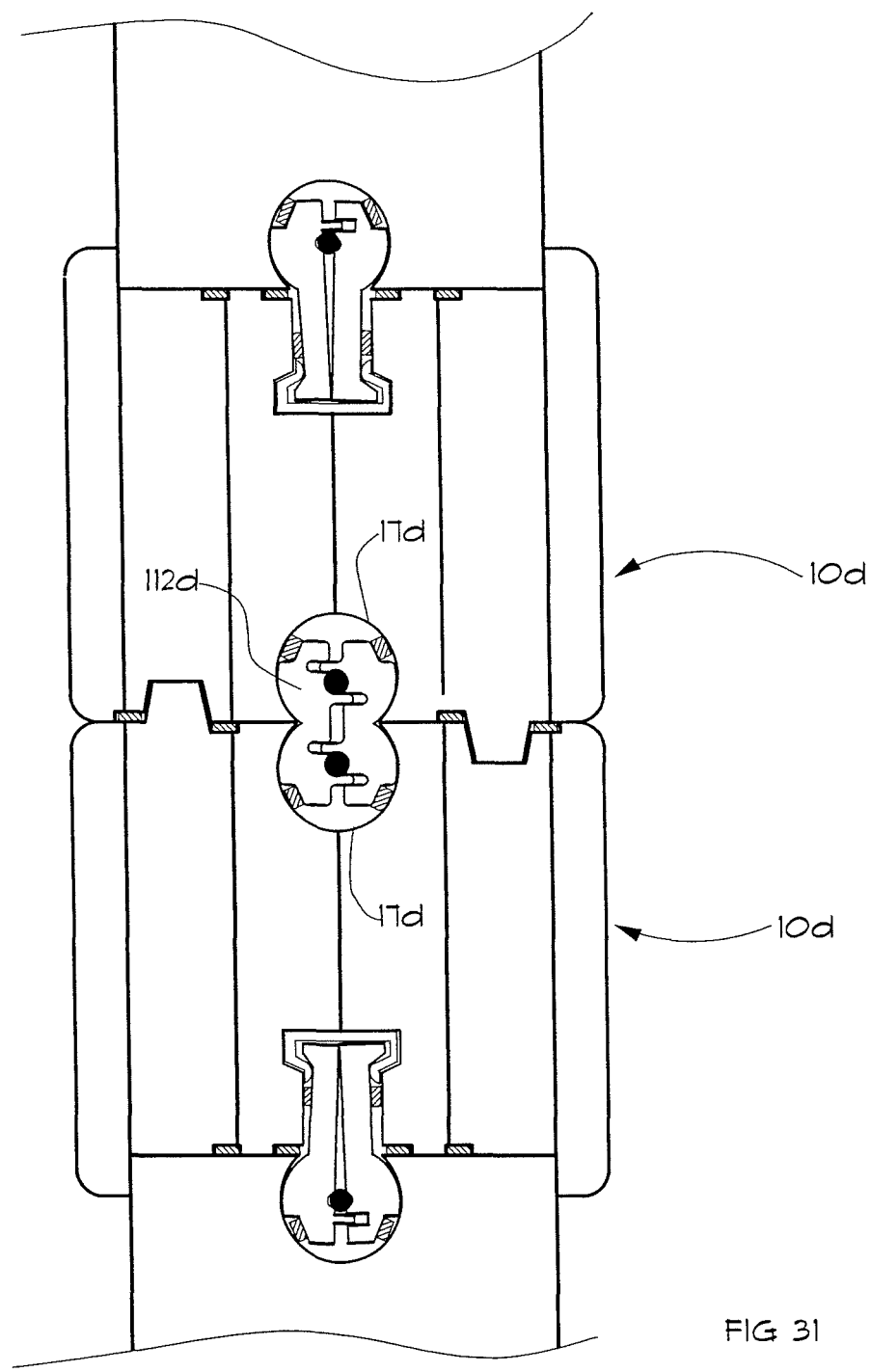
FIG. 31 is a plan view similar to FIG. 29 showing a further stage in the assembly of a building structure.

To assemble a pair of wall units 100*d*, the units are oriented such that the faces 14*d* are opposed. In this position, as can be seen in FIG. 30, the tongue 404 of one post 10*d* is aligned with the groove 406 of the opposed posts 10*d* and the recesses 17 are aligned. Sealing strips are located in the grooves 408, 410 and the post 10*d* brought into abutment as shown in FIG. 31.

With the post 10d abutting, an elongate "Figure of 8" shape key 112d is inserted to bridge the aligned recesses 17d. Any suitable form of key 112 may be used, such as one of the embodiments shown in FIGS. 17-21 and preferably is similar to that shown in FIG. 14 or 15 with notches for the spikes 88. The key 112d can then be expanded using spikes 88 as described above with respect to FIGS. 12 to 15. The key 112d may be either a single continuous extrusion extending the full length of the post 10d or may be individual shorter lengths of key, again as described above with respect to FIGS. 12 through 15.

Figure 32:
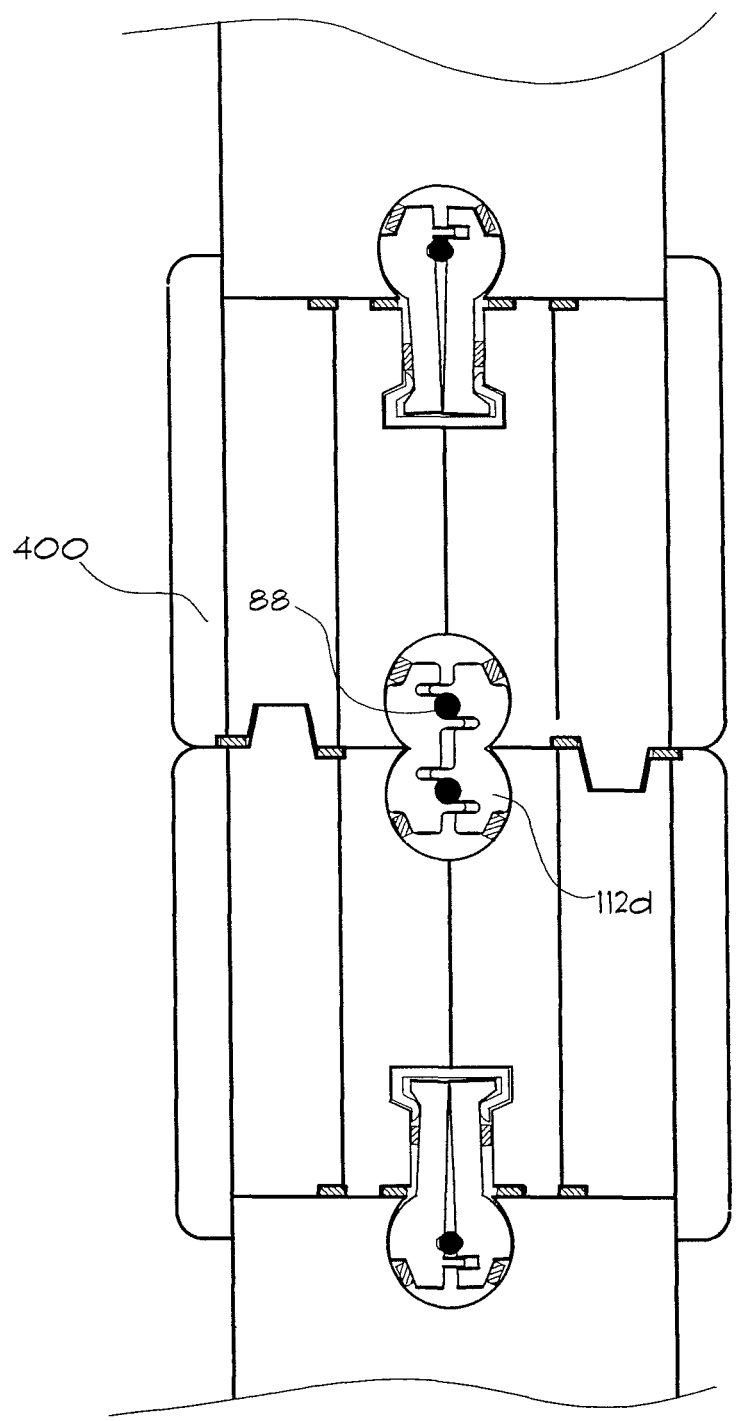
FIG. 32 is a plan view of the assembly of FIG. 31 in a further stage of assemble.

With the key 112d expanded as shown in FIG. 32 a secure connection is made between the wall sections 100. The engagement of tongue 404 and groove 406 locates the posts 10b in a lateral direction as well as providing a more tortuous path to inhibit air infiltration. The seals located in the grooves 408, 410 also enhance the air tightness of the connection between the walls.

It will be noted from FIG. 32 that with the posts 10d secured to one another, the outer laminations 400 cover the joint between the posts and thereby provide a continuous pleasing appearance to the exterior surface of the post.

Figure 33:
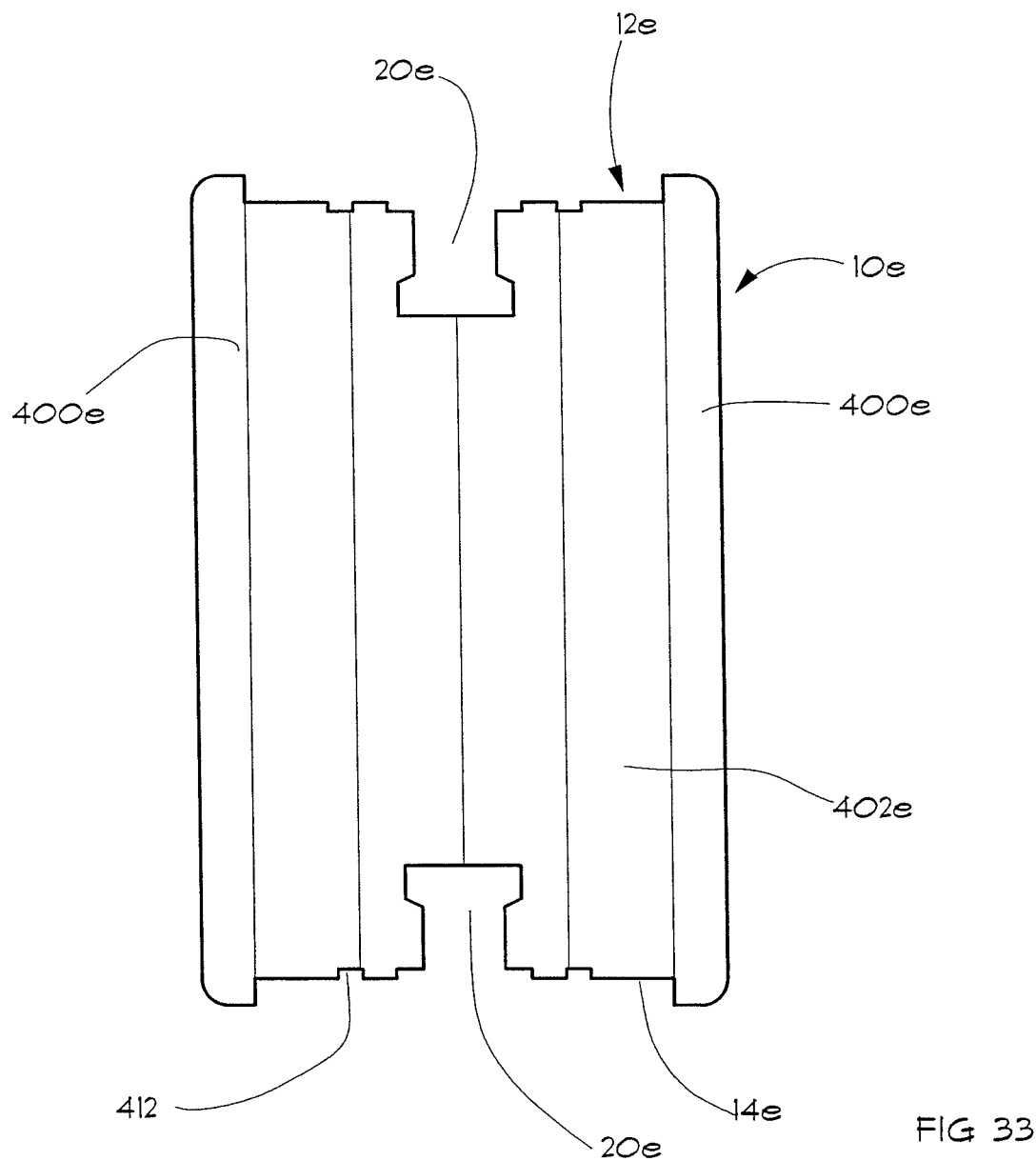
FIG. 33 is a section of a component used to manufacturer posts for use in the building structures shown in the proceeding embodiments.
Figure 34:
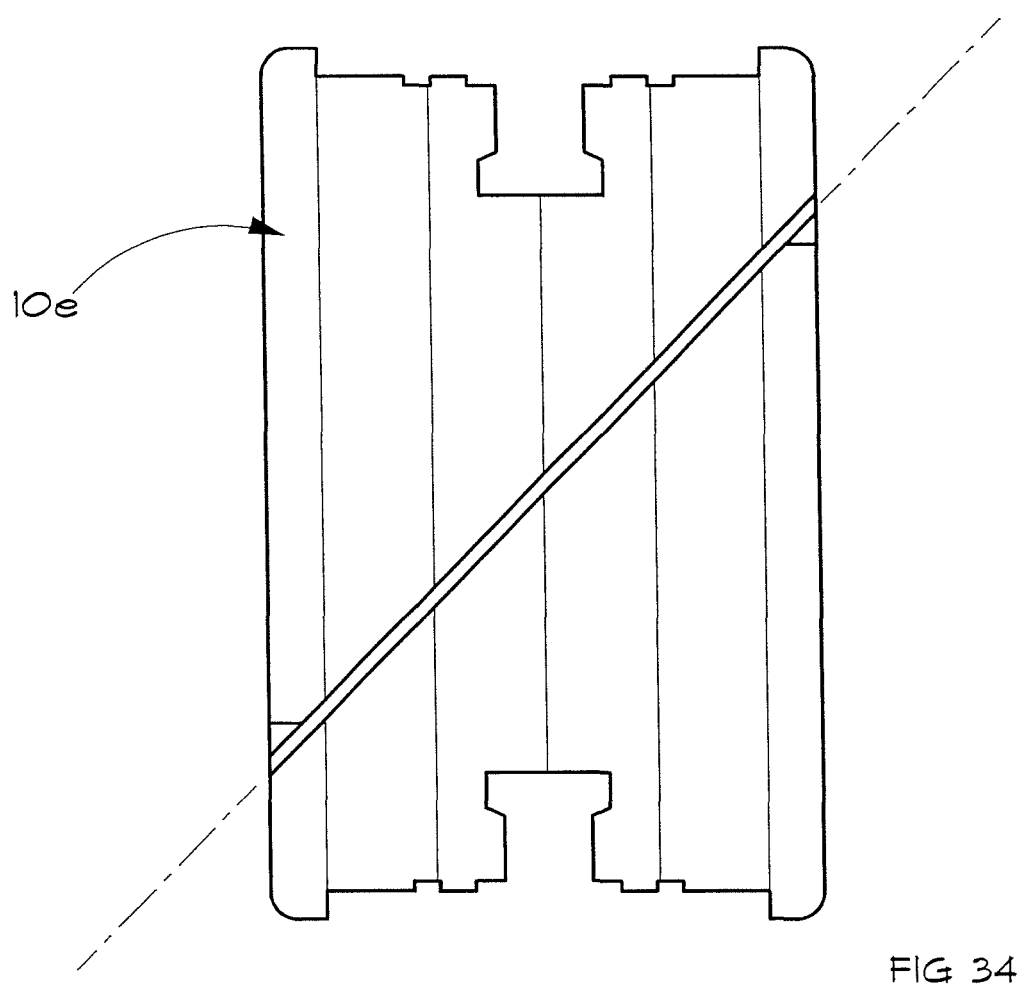
FIG. 34 is a view of the component of FIG. 33 in a first stage of manufacturer.

The manufacturer and use of the posts 10e used at the corners 6 may also be enhanced to facilitate the panelized construction of the building. As shown in FIG. 33, a post 10e is formed with undercut channels 20e on opposite faces. The post 10e is again laminated from exterior laminations 400e and internal laminations 402e as described above with respect to FIG. 28. Sealant grooves 412 are machined into the faces 12e, 14e to accommodate sealing strips upon further assembly.

Figure 35:
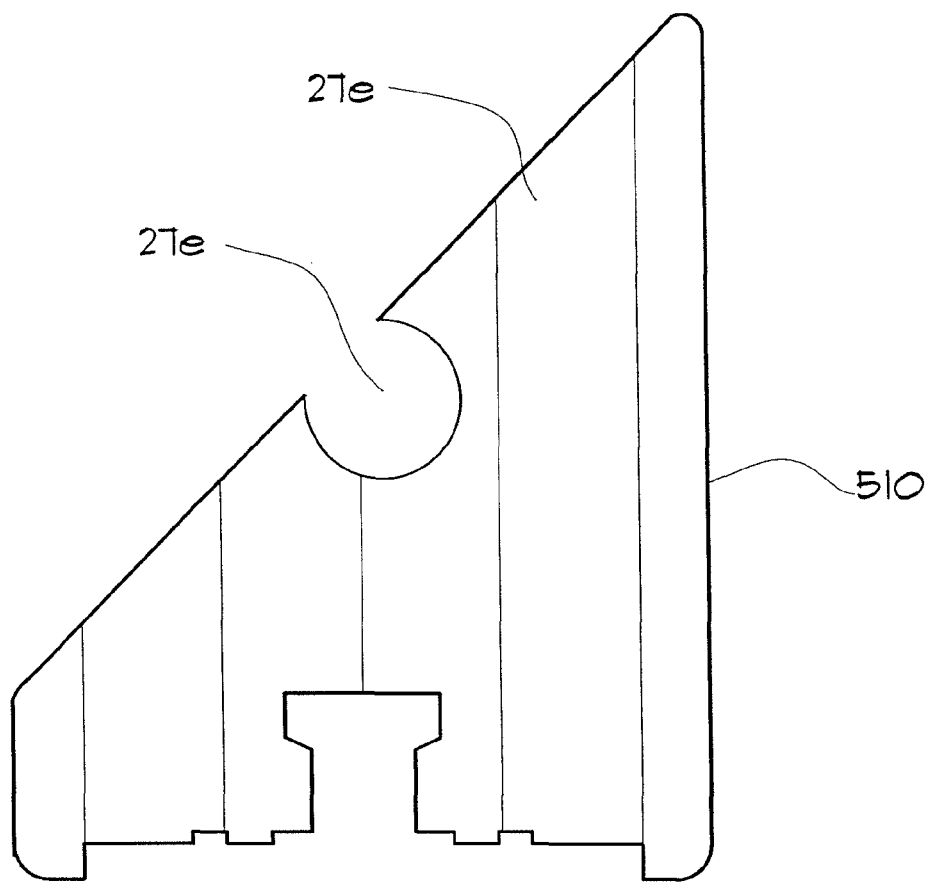
FIG. 35 is an end view of the components produced in FIG. 35 in a further stage of manufacturer.

The post 10e is then slit into two components 510 along a separation plane inclined at 45 degrees to the median plane of the post. The inclination of the cut will vary depending upon the included angle of the corner to be formed, but for a 90 degree corner, the 45 degree cut is required. After cutting, two corner posts 510 are formed that are identical in section. Inversion of one component end over end provides two components that when assembled with the cut faces in abutment, define a 90 degree corner post, as described below. A different angle of cut will of course provide a different inclined angle. As shown in FIG. 35, each has a part cylindrical re-entrant recess 17e machined along its cut face. This recess 17e may be machined using a cannon ball router bit with the recess 17e located at the mid point of the cut face 512. The corner post components 510 can be connected at opposite ends of logs 11e as shown in FIG. 36 using spline assemblies 30e installed as described above. The logs 11e and the post components 510 form a wall unit 100e that can be assembled with like wall units to form a corner. Again, the lowermost log is secured to the post component with screws to inhibit sliding movement and the tie bars used as hoist points.

Figure 37:
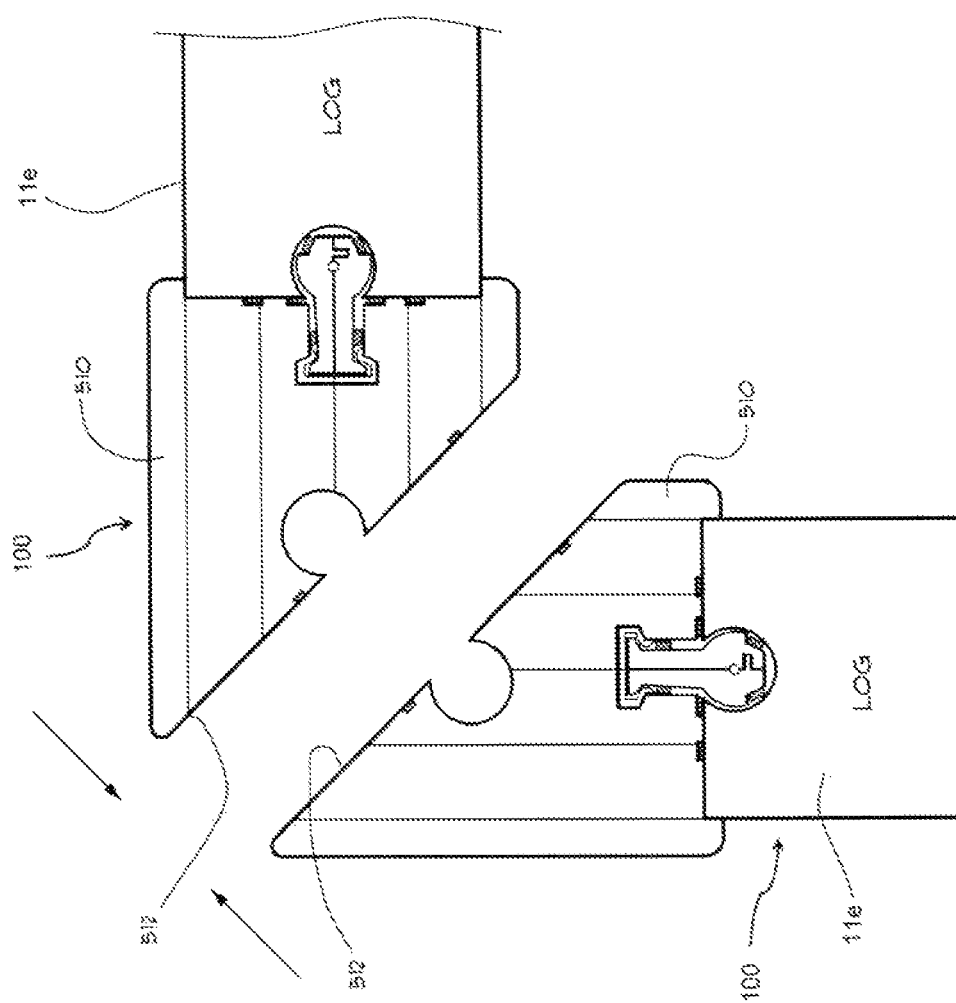
FIG. 37 is a plan view showing assembly of a pair of wall sections of FIG. 36.
Figure 38:
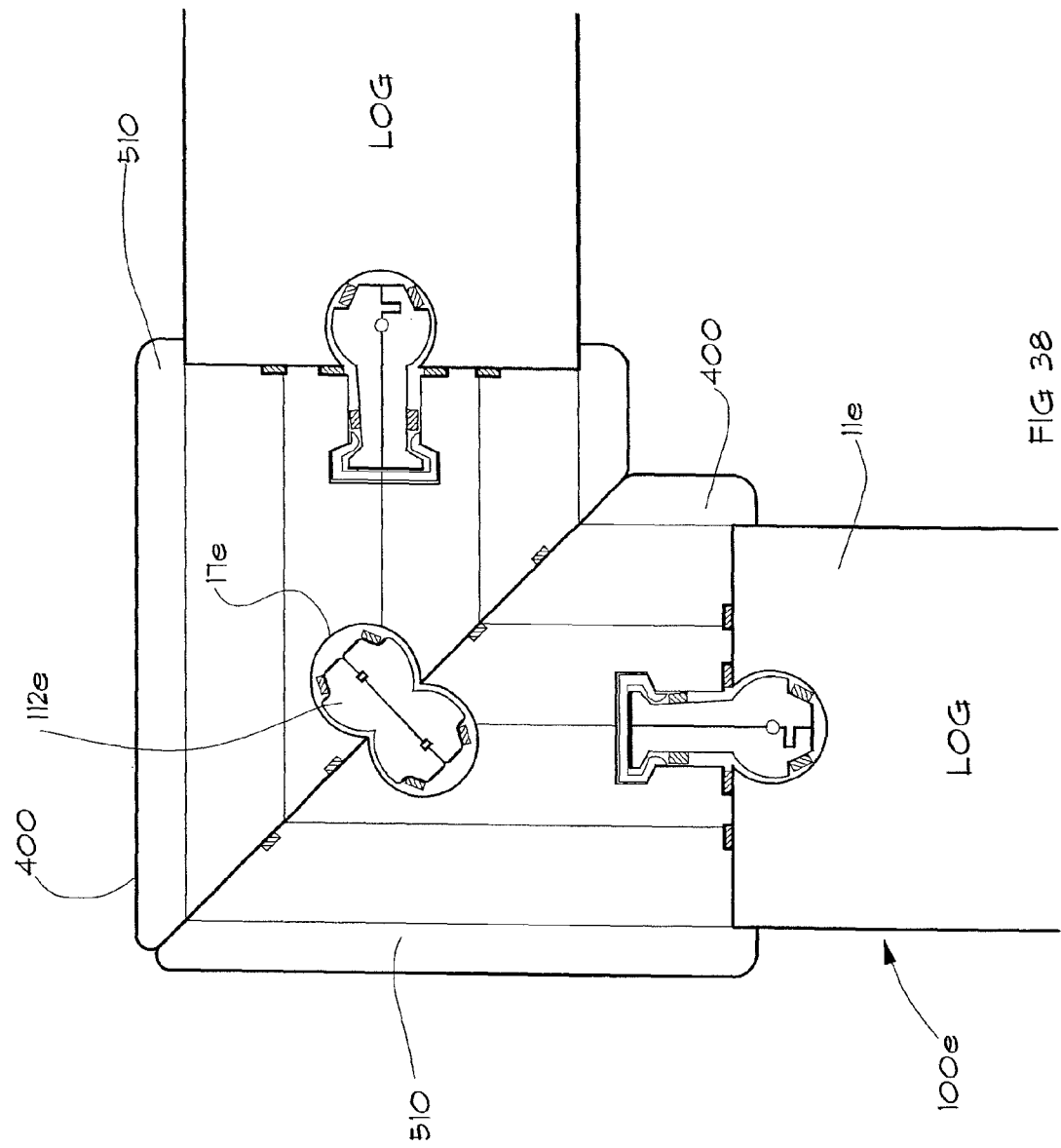
FIG. 38 is a plan view similar to FIG. 37 of a further stage in the assembly of the wall sections.

To form a corner 6, as shown in FIG. 37, a pair of wall units 100 each having a corner component 510 at one end are brought into alignment such that the cut faces 512 abut. Sealant grooves are machined into the cut face to receive sealant strips and are off set from adjacent strips so as to provide four separate seal locations along the cut face 512. With the corner units in abutment as shown in FIG. 38, a key 112e is inserted to bridge the aligned recesses 17e and connect the sections 100e at right angles to one another. Thereafter, spikes 88e may be inserted into the key 112e to expand the key and secure the corner components 510 into a unitary post 10e at a corner.

Figure 39:
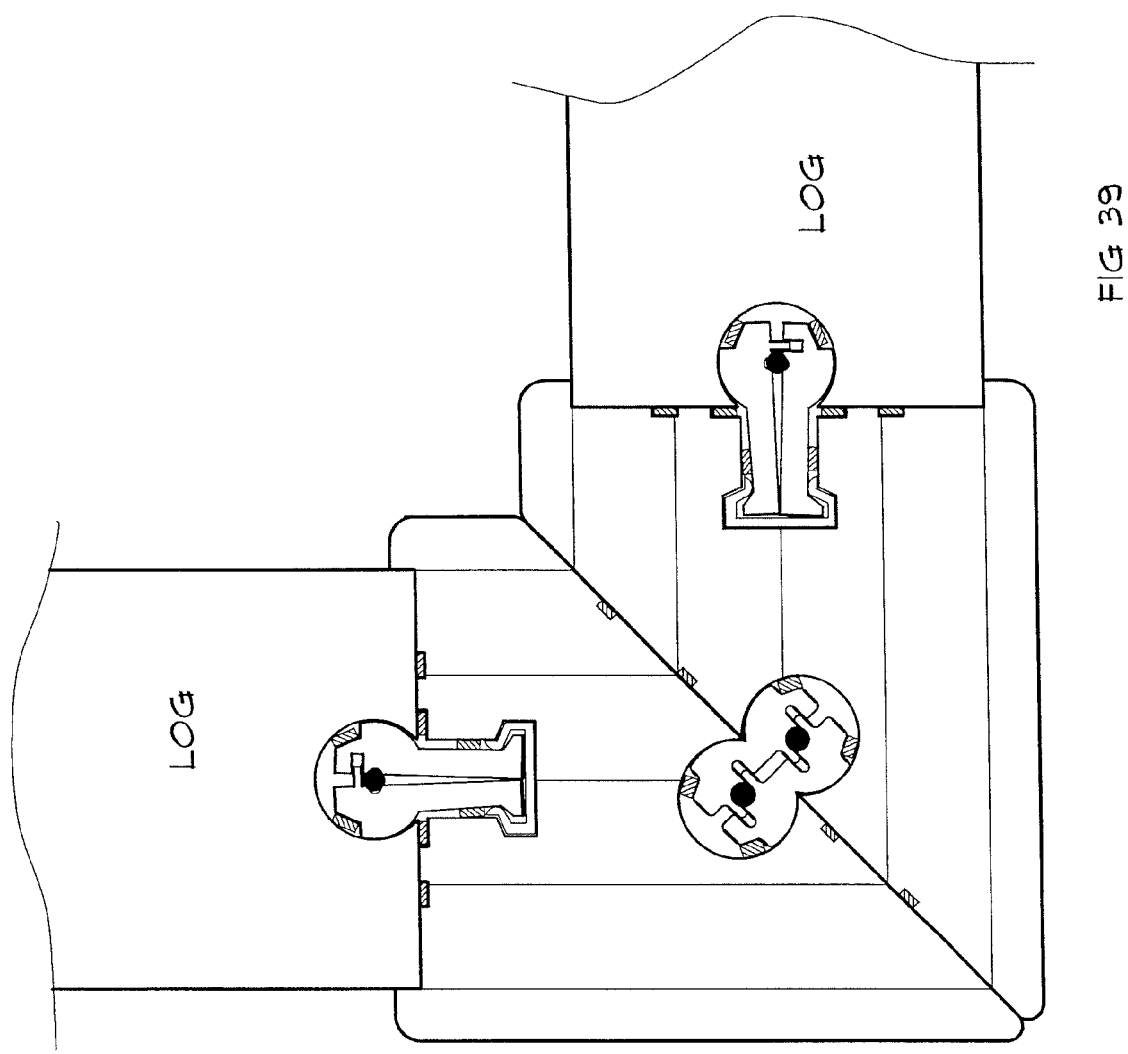
FIG. 39 is a view similar to FIG. 38 showing a further step in the assembly of wall sections.

It will be noted with respect to FIGS. 37 through 39 that the exterior laminations 400 extend around both exposed surfaces of the corner and thereby enhance the aesthetics. At the same time, it will be appreciated that the wall units 100 may be made as linear units for ease of transportation and subsequently assembled at corners by the insertion of the spikes 100.

Figure 40:
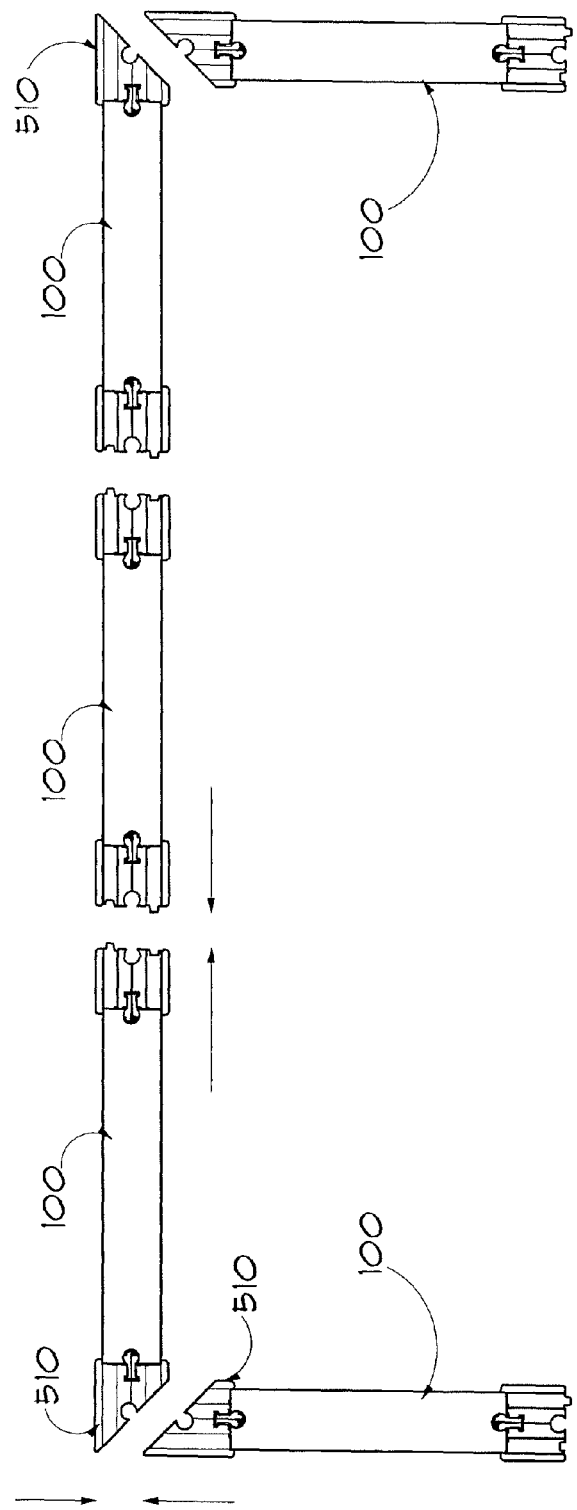
FIG. 40 is a view similar to FIG. 27 showing the assembly of a building using the post sections described with respect to FIGS. 28 through 39.
Figure 48:
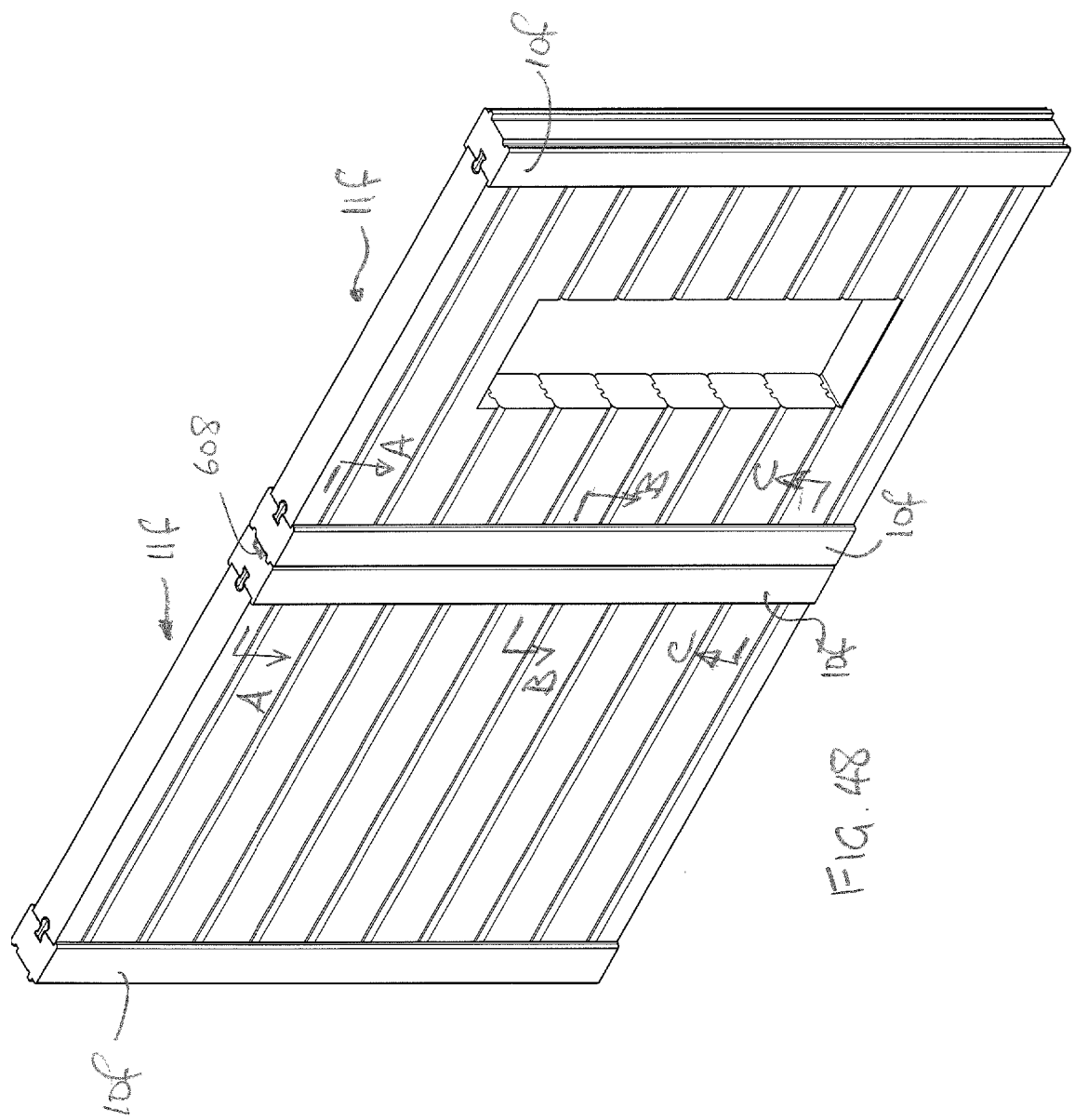
FIG. 48 is a perspective view of a pair of wall sections as shown in FIG. 41 joined end-to-end.

With the arrangement shown in FIGS. 28 through 39, it is apparent that a panelized structure may be assembled readily as shown schematically in FIG. 40. Each of the wall units is formed by a pair of posts 10 connected by logs 11 which extend between the faces of the posts directed toward one another. The formations provided on the other face facilitates connection to an adjacent post through the "figure of eight keys 112." The wall units 100 are therefore flat self contained units that are readily transported and assembled into the required configuration at the site.

In the above embodiments, the posts 10 of the wall sections 100 are interconnected by the keys 112 which are expanded within the part cylindrical slots 103. The expansion pulls the faces 14 of the posts in to engagement. An alternative arrangement for connecting the faces 14 of the post 10 is shown in FIGS. 41 through 53, in which like reference numerals will be used to denote like components with a suffix "f" added for clarity.

Referring therefore to FIG. 41, a wall section 100f includes a pair of posts 10f with logs 11f extending between them. The logs 11f are connected to the posts 10f using the key 32f as described above with respect to FIGS. 1 through 8.

As shown in FIG. 47, each of the posts 10f has an outwardly directed end face 14f with a tongue 404f and a complimentary groove 406f. A rabbet 600 is formed in the end face 14f of one of the posts 10f between the tongue 404f and the groove 406f.

The face 14f of the other of the posts 10f is planar between the tongue 404f and groove 406f with a pair of recess channels 602 to receive sealing strips.

A dovetail assembly 608 is located between the opposed faces 14f to secure the posts 10f to one another. The dovetail assembly 608 includes a pair of pins 610, which are located in spaced relationship within the rabbet 600. As can be seen in FIGS. 43 and 44, each of the pins 610 extends along the vertical extent of the post 10f and is secured to the post at spaced intervals by screws 622.

Each of the pins 610 has an inwardly directed inclined face 614 that, in combination with the adjacent pin 610, defines a re-entrant dovetail channel 616 (FIG. 47) within the rabbet 600.

Figure 49:
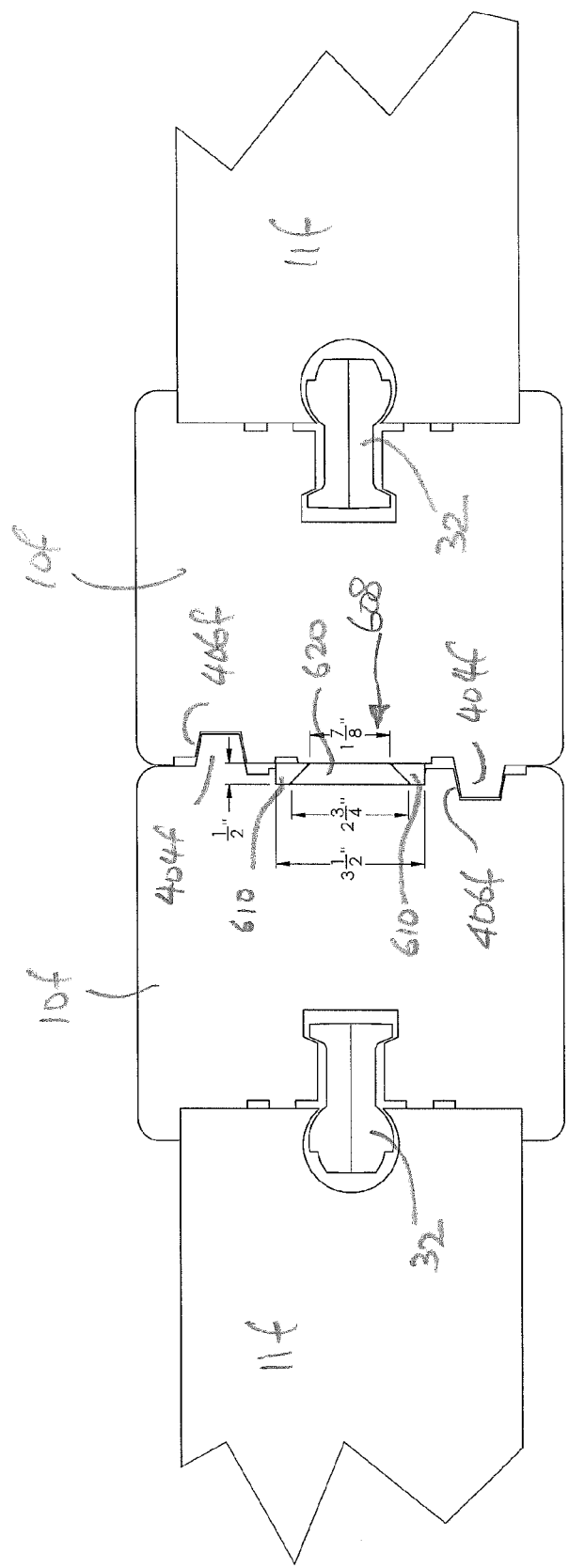
FIG. 49 is a section on the line AA of FIG. 48.

A comparison of FIGS. 49 to 51 shows that each of the pins 610 also tapers laterally from one end to the other so that a mouth 618 of the dovetail channel 616 narrows from the vertically upper end of the post 10f to the lower end of the post 10f.

A tail 620 is secured to the planar face 14f of the other of the posts 10f through screws 622. The tail 620 has a pair of convergent faces 624 directed toward the face 14f. The tail 620 is of complementary cross section to the channel 616 and so similarly tapers from one end to the other.

In a typical installation, the lateral dimension of the rabbet 600 is 3.5 inches with a depth of ½ an inch or ¾ inch. The maximum width of the mouth 618 is 1⅞ inches which progressively reduces along the vertical extent of the post 10f to a minimum of ⅞ of an inch.

Similarly, the tail 620 has a maximum width of 2¾ inches and a minimum width of 1⅜ inches. The inclination of the faces 614 to the plane of the face 14f is 45° and the included angle of the taper of the tail and pins is in the order of 0.25°.

The groove 616 and tails 620 are dimensioned relative to one another so that when the posts are abutting and aligned horizontally, the tail 620 is fully engaged with the pins 614.

In order to assemble a pair of adjacent wall sections 100f, sealing strips are inserted in the grooves 602 and the two wall sections brought in to alignment for assembly. One of the wall sections 100f is elevated so that its lower edge is aligned with the upper edge of the adjacent panel. In this position, the tail 620 may be inserted in to the dovetail channel 616.

With the tail 620 aligned with the recess 616, the elevated wall section 100f may be slid vertically. As can be seen in FIGS. 52 and 53, the mouth 618 is sufficiently narrow to inhibit separation of the sections 100f as they are slid, but at the same time, the taper of the tail and recess 616 allows relatively free sliding movement.

As the section 100f reaches the horizontal alignment with the other wall section 100f, the tail 620 is snugly received within the recess 616 and pulls the faces 14f in to abutment. The seals in the grooves 602 are compressed between the faces 14f and the tongue and grooves 404f, 406f engaged.

With the tail engaged within the recess 616, separation of the post is inhibited in the direction of the wall formed by the wall sections 100f.

The tail 620 and pins 614 may be made from a suitable material including metal or plastic mouldings having sufficient rigidly to pull the faces 14f in to engagement.

It will be apparent that the arrangement of tail and pins may be used in the different configurations of corner shown in the previous embodiments.

Figure 55:
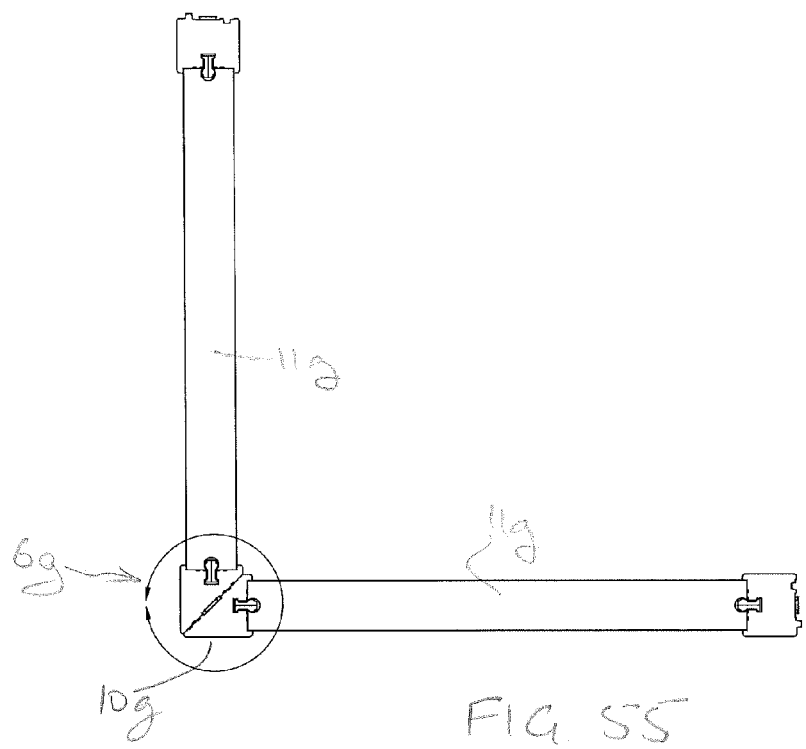
FIG. 55 is a plan view of the corner assembly of FIG. 54.
Figure 56:
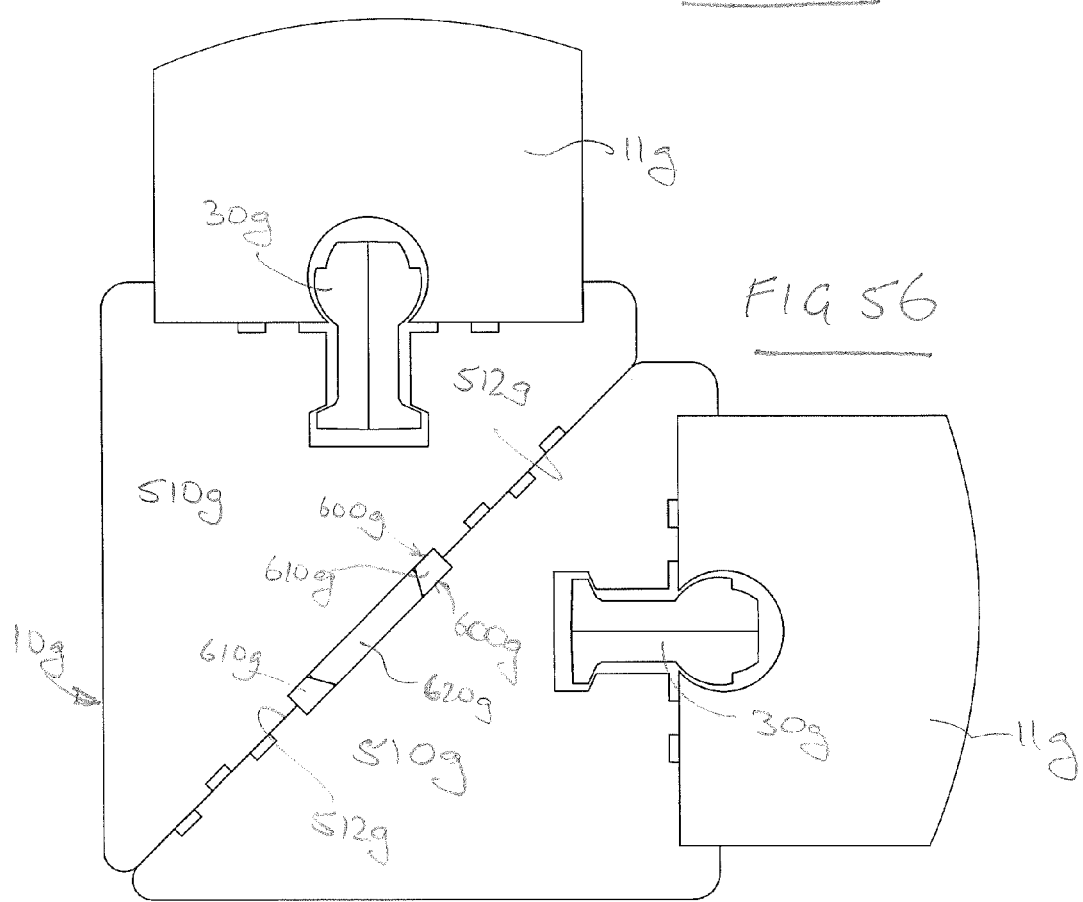
FIG. 56 is a detailed view of the corner assembly of FIG. 55.

An example of a corner construction as shown in FIG. 54 through 56 which is similar to the construction shown in FIGS. 33 through 39.

Referring therefore to FIG. 54, walls sections 100g consisting of logs 11g and posts 10g intersect at a corner 6g. The post 10g is formed from a pair of components 510g obtained by slitting a rectangular post 10g along a separation plane, as described above with respect to FIG. 33. Each of the components 510g has a cut face 512g that abut to define the required included angle for the post. The logs 11g are connected to the components 510g by the key assembly 30g, as described above.

To connect the faces 512g in abutment and provide a stable post 10g, a recess 600g is machined in the cut face 512g of each of the components.

A pair of pins 610g is secured within one of the recessess 600g and a tail 620g secured within the other of the recesses. The dimensioning and interaction of the tail and pins is described above with respect to FIGS. 41 through 53.

To assemble the walls 100g at the corner 6g, each wall unit 100g is assembled with the components 510g positioned adjacent to the corner. The wall unit to which the tail 620g is secured is elevated and slid in to the re-entrant channel provided by the pins 610g. As the wall is lowered, the tail 620g engages the pins 610g and pulls the faces 512g in to abutment and a stable connection. Sealing strips are of course provided between the faces, as described above, to ensure an air tight construction.

As shown in FIG. 56, the cut faces are disposed at a 45° angle relative to the exterior faces of each of the posts so that an included angle of 90° is provided at the post 10g. Other angles may be adopted to provide different included angles.

The connection of the logs 11 to the post 10 facilitates assembly of the walls 2 of the building, and also accommodates the relative movement between the logs and posts as the logs dry and shrink. Typically, clearance is left above windows and door openings to accommodate such shrinkage. In the arrangement shown in FIGS. 1 to 56, shrinkage of the logs will produce cause the upper end of the posts to project above the top course of logs. Accordingly, the structure above the wall, typically the roof trusses, must be supported on either the logs or the posts.

The arrangement of connection of the log to the posts provides an alternative configuration, as shown in FIGS. 57 to 59. Like components will utilize like reference numbers with a suffix "g" added for clarity.

Referring therefore to FIGS. 57 to 59, wall sections 2g are formed from logs 11g connected to posts 10g as described above. The posts 10g are connected to one another on their abutting faces, 14g, again as described above.

As shown in FIG. 58, the upper most log 11g is connected to the post 10g by lag screws 700, so that the upper log 11g is flush with the upper face of the post 10g. The lag screws 700 are located on either side of the dovetail connection 608 and typically will be 4 in number.

The length of post 10g is less than the height of the wall 2 so that the lower most log 11g extends below the post 10g. A seal 702 is located between the post 10g and the sub floor, on which the log rests.

The upper most log 11g is supported by the stacked logs below and the post 10g suspended from the upper most log. The balance of the logs are in sliding contact with post in the manner described above, so that as the logs shrink, the post move downwardly to compress the seal 702.

The connection of the post to the upper most log maintains alignment on the top edge, thereby allowing the structure to be supported on both the post and the log. A modular structure is thus provided with versatility in the placement of supported structure.

The invention claimed is:

1. A self contained wall unit for forming a wall section of a building said wall unit comprising a pair of posts each having a longitudinal axis, said posts being spaced apart and each having an abutment face directed toward the other of said posts, at least one log extending between each of said abutment faces and being secured thereto to form with said posts said self contained wall unit, at least one of said posts having an other face different to said abutment face and configured to abut an exposed face of an adjacent portion of said wallsection, said other face of said one of said posts having a formation thereon extending along said longitudinal axis to facilitate connection to said exposed face, said formation including a pair of laterally spaced convergent flanks, the lateral spacing between said flanks varying progressively along said longitudinal axis to provide a tapered formation of progressively reducing width.

2. A wall unit according to claim 1 wherein said formation is located in a recess extending along said other face.

3. A wall unit according to claim 1 wherein said other face lies in a plane inclined to said abutment face.

4. A wall unit according to claim 3 wherein said plane is at right angles to said abutment face.

5. A wall unit according to claim 1 wherein said log is secured to said post to permit relative sliding movement there between.

6. A wall unit according to claim 1 including a seal located on said other face and extending along said longitudinal axis.

7. A wall unit according to claim 6 wherein a seal is located on either side of said formation.

8. A wall unit according to claim 7 wherein a tongue is formed on said other face parallel to said longitudinal axis.

9. A wall unit according to claim 7 wherein a groove is formed on said other face parallel to said longitudinal axis.

10. A wall unit according to claim 1 wherein said flanks converge toward said other face.

11. A wall unit according to claim 10 wherein said flanks are planar.

12. A wall unit according to claim 1 wherein said flanks converge away from said other faces.

13. A wall unit according to claim 12 wherein said flanks are planar.

14. A wall unit according to claim 1 wherein both of said posts have an other face with formations thereon, said one of said posts having flanks that converge toward said other face of said one post and the other of said posts having flanks that converge away from said other face of the other of said posts.

15. A method of assembling a wall section of a building comprising the steps of forming a wall unit from a pair of posts that are spaced apart and each of which has an abutment face directed toward the other of said posts, locating at least one log to extend between each said abutment face, securing said log to said posts to form a self contained wall unit, providing a tapered formation on an other face different to said abutment face of at least one of said posts, said formation having a pair of laterally spaced convergent flanks whose lateral spacing varies along the longitudinal axis of said one of said posts, said formation facilitating connection to an exposed face of an adjacent portion of said wall section having a complementary formation formed on said exposed face thereof, positioning said wall unit with said other face directed to said exposed face and said formations offset along a longitudinal axis of said posts and connecting said unit to said portion by moving said one of said posts relative to said exposed face to engage said formations and move said other face and said exposed face toward one another as said formations engage.

16. A method according to claim 15 wherein a seal is placed between said other face and said one face.

17. A wall section of a building having a pair of self contained wall units connected to one another, each of said wall units comprising a pair of posts each having a longitudinal axis, said posts being spaced apart and each having an abutment face directed toward the other of said posts, at least one log extending between each of said abutment faces and being secured thereto to form with said posts said self contained wall unit, at least one of said posts of each of said wall units having an other face different to said abutment face and configured to abut an other face of an adjacent post of the other of said pair of wall units, said other face of each said posts having a formation thereon extending along said longitudinal axis to facilitate connection of said wall units, each of said formations including a pair of laterally spaced convergent flanks, the lateral spacing between said flanks varying progressively along said longitudinal axis to provide a tapered formation of progressively reducing width, said formation of one of said wall units being complimentary to said formation of the other wall unit to permit said formations to nest one within the other and to connect said wall units.

18. A wall section according to claim 17 wherein a seal is located between said other faces.

19. A wall section according to claim 18 wherein a further seal is located on either side of said formation.

20. A wall section according to claim 17 wherein a tongue is formed on one of said other faces parallel to said longitudinal axis and a groove is formed on the other of said other faces to receive said tongue.

21. A wall section according to claim 17 wherein said flanks on said formation on said one of said posts converge toward said other face of said one of said posts.

22. A wall unit according to claim 21 wherein said flanks are planar.

23. A wall section according to claim 17 wherein one of said formations is located in a recess formed in a respective one of said other faces.

24. A wall section according to claim 17 wherein said formations are formed as a tapering dovetail with a tail on one of said wall units and pins on the other of said wall units.

25. A wall section according to claim 24 wherein said tails and said pins are formed as separate components secured to respective ones of said posts.

\* \* \* \* \*